United States Patent
Hyde et al.

(10) Patent No.: US 9,748,006 B2
(45) Date of Patent: *Aug. 29, 2017

(54) SYSTEM AND METHOD FOR MAINTAINING AND ESTABLISHING OPERATIONAL READINESS IN A FUEL CELL BACKUP SYSTEM OF A NUCLEAR REACTOR SYSTEM

(75) Inventors: Roderick A. Hyde, Redmond, WA (US); Clarence T. Tegreene, Bellevue, WA (US); Joshua C. Walter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 696 days.

This patent is subject to a terminal disclaimer.

(21) Appl. No.: 12/924,753

(22) Filed: Oct. 4, 2010

(65) Prior Publication Data

US 2012/0082912 A1   Apr. 5, 2012

Related U.S. Application Data

(63) Continuation-in-part of application No. 12/924,704, filed on Oct. 1, 2010.

(51) Int. Cl.
*H01M 8/04* (2016.01)
*G21D 1/02* (2006.01)
(Continued)

(52) U.S. Cl.
CPC ............ *G21D 1/02* (2013.01); *G21D 3/04* (2013.01); *H01M 8/0494* (2013.01);
(Continued)

(58) Field of Classification Search
None
See application file for complete search history.

(56) References Cited

U.S. PATENT DOCUMENTS 3,416,966 A   12/1968 Oswin
4,378,329 A   3/1983 Uchikawa et al.
(Continued)

FOREIGN PATENT DOCUMENTS

WO   WO02/084670   10/2002

OTHER PUBLICATIONS

PCT International Search Report; International App. No. PCT/US11/01669; Jan. 17, 2012; pp. 1-2.
(Continued)

*Primary Examiner* — Barbara Gilliam
*Assistant Examiner* — Adam A Arciero

(57) ABSTRACT

A method and apparatus for maintaining or establishing a readiness state in a fuel cell backup system of a nuclear reactor system are disclosed. A method includes maintaining a readiness state of a fuel cell system within a set of readiness parameters, the readiness parameters a function of a characteristic of the nuclear reactor system. Another method includes monitoring a nuclear reactor system characteristic and, responsive to the monitored nuclear reactor system characteristic, establishing a readiness state of a fuel cell system. An apparatus includes a fuel cell system associated with a nuclear reactor system and a fuel cell control system configured to maintain a readiness state of the fuel cell system. Another apparatus includes a fuel cell system associated with a nuclear reactor system, a nuclear reactor characteristic monitoring system, and a fuel cell control system configured to establish a readiness state of the fuel cell system.

26 Claims, 42 Drawing Sheets

(51) Int. Cl.
  *H01M 8/04828* (2016.01)
  *H01M 8/04298* (2016.01)
  *H01M 8/04746* (2016.01)
  *G21D 3/04* (2006.01)

(52) U.S. Cl.
  CPC ... *H01M 8/04298* (2013.01); *H01M 8/04746* (2013.01); *H01M 8/04828* (2013.01); *H01M 2250/402* (2013.01); *Y02B 90/12* (2013.01); *Y02E 30/40* (2013.01)

(56) References Cited

U.S. PATENT DOCUMENTS

| | | |
|---|---|---|
| 5,069,987 A | 12/1991 | Gordon |
| 5,401,589 A | 3/1995 | Palmer et al. |
| 5,925,476 A | 7/1999 | Kawatsu |
| 5,952,116 A | 9/1999 | Blum et al. |
| 6,011,324 A | 1/2000 | Kohlstruck et al. |
| 6,759,156 B1 | 7/2004 | Wheat et al. |
| 6,764,782 B2 | 7/2004 | Raiser et al. |
| 6,934,350 B1 | 8/2005 | Challberg et al. |
| 7,250,231 B2 | 7/2007 | Edlund |
| 7,326,480 B2 | 2/2008 | Fuglevand |
| 7,359,790 B2 | 4/2008 | Gottwick et al. |
| 7,468,215 B2 | 12/2008 | Nielsen et al. |
| 2002/0110714 A1 | 8/2002 | Andrews et al. |
| 2002/0160238 A1* | 10/2002 | Labinov et al. ............. 429/12 |
| 2002/0160242 A1* | 10/2002 | Dagard ....................... 429/22 |
| 2002/0177015 A1 | 11/2002 | Fuglevand |
| 2003/0027026 A1 | 2/2003 | Bruck et al. |
| 2003/0118876 A1* | 6/2003 | Sugiura et al. ................ 429/9 |
| 2004/0016769 A1 | 1/2004 | Redmond |
| 2004/0247961 A1 | 12/2004 | Edlund |
| 2005/0112428 A1 | 5/2005 | Freeman et al. |
| 2005/0136312 A1* | 6/2005 | Bourgeois et al. ........... 429/32 |
| 2005/0287402 A1 | 12/2005 | Maly et al. |
| 2007/0119638 A1 | 5/2007 | Grieve |
| 2008/0123794 A1* | 5/2008 | Mertyurek ............... G21C 7/36 376/217 |
| 2008/0288121 A1 | 11/2008 | Fedosovskiy et al. |
| 2008/0299429 A1* | 12/2008 | Desrosiers et al. ........... 429/26 |
| 2010/0151344 A1 | 6/2010 | Otomaru et al. |
| 2010/0260309 A1 | 10/2010 | Hyde et al. |
| 2012/0082284 A1* | 4/2012 | Hyde .................... G21C 17/02 376/245 |
| 2012/0082912 A1 | 4/2012 | Hyde et al. |
| 2012/0082913 A1 | 4/2012 | Hyde et al. |

OTHER PUBLICATIONS

PCT International Search Report; International App. No. PCT/US11/01677; Jan. 18, 2012; pp. 1-2.

PCT International Search Report; International App. No. PCT/US11/01678; Jan. 18, 2012; pp. 1-3.

Rónaky, József; "Design Requirement for Nuclear Power Plant Electric, Instrumentation and Control Systems and Components"; Jul. 2006; pp. 1-55; Version 2; Hungarian Atomic Energy Authority Nuclear Safety Directorate; Budapest.

Hamelin, J., Agbossou, K., Laperriere, A., Laurencelle, F., Bose, T.K., Dynamic Behavior of a PEM Fuel Cell Stack for Stationary Applications, International Journal of Hydrogen Energy, Oct. 23, 2000, pp. 625-629, 2001-26, Published by Elsevier Science Ltd.

Lim, Ho-Gon, Yang, Joon-Eon, Hwang, Mee-Jeong, A Quantitative Analysis of a Risk Impact Due to a Starting Time Extension of the Emergency Diesel Generator in Optimized Power Reactor-1000, Reliability Engineering & System Safety, Sep. 7, 2006, pp. 961-970, 2007-92, Published by Elsevier Science Ltd.

PCT International Search Report; International App. No. PCT/US2011/001676; Jan. 11, 2012; pp. 1-2.

* cited by examiner

SYSTEM AND METHOD FOR MAINTAINING AND ESTABLISHING OPERATIONAL READINESS IN A FUEL CELL BACKUP SYSTEM OF A NUCLEAR REACTOR SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

For purposes of the USPTO extra-statutory requirements, the present application constitutes a continuation-in-part of United States Patent Application entitled SYSTEM AND METHOD FOR MAINTAINING AND ESTABLISHING OPERATIONAL READINESS IN A FUEL CELL BACKUP SYSTEM OF A NUCLEAR REACTOR SYSTEM, naming RODERICK A. HYDE, CLARENCE T. TEGREENE, AND JOSHUA C. WALTER as inventors, filed Oct. 1, 2010, application ser. no. 12/924,704, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure generally relates to the implementation of a fuel cell backup system in a nuclear reactor system and, more particularly, to maintaining or establishing a state of operational readiness in a fuel cell backup system of a nuclear reactor system.

SUMMARY

In one aspect, a method includes but is not limited to maintaining a readiness state of a fuel cell system associated with a nuclear reactor system within a set of readiness parameters, the readiness parameters a function of a characteristic of the nuclear reactor system. In another aspect, a method includes but is not limited to monitoring a characteristic of a nuclear reactor system, and, responsive to the monitored characteristic of the nuclear reactor system, establishing a readiness state of a fuel cell system associated with the nuclear reactor system within a set of readiness parameters, the readiness parameters a function of the characteristic of the nuclear reactor system. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein—referenced method aspects depending upon the design choices of the system designer.

In one aspect, an apparatus includes but is not limited to a fuel cell system associated with a nuclear reactor system, and a fuel cell control system configured to maintain a readiness state of the fuel cell system within a set of readiness parameters, the readiness parameters a function of a characteristic of the nuclear reactor system. In another aspect, an apparatus includes but is not limited to a fuel cell system associated with a nuclear reactor system, a monitoring system configured to monitor a characteristic of the nuclear reactor system, and a fuel cell control system configured to establish a readiness state of the fuel cell system within a set of readiness parameters in response to the monitored characteristic of the nuclear reactor system, the readiness parameters a function of the characteristic of the nuclear reactor system. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1O is a block diagram illustrating an output modification system suitable for modifying the electrical output of the fuel cell system;

DETAILED DESCRIPTION

Figure 1A:
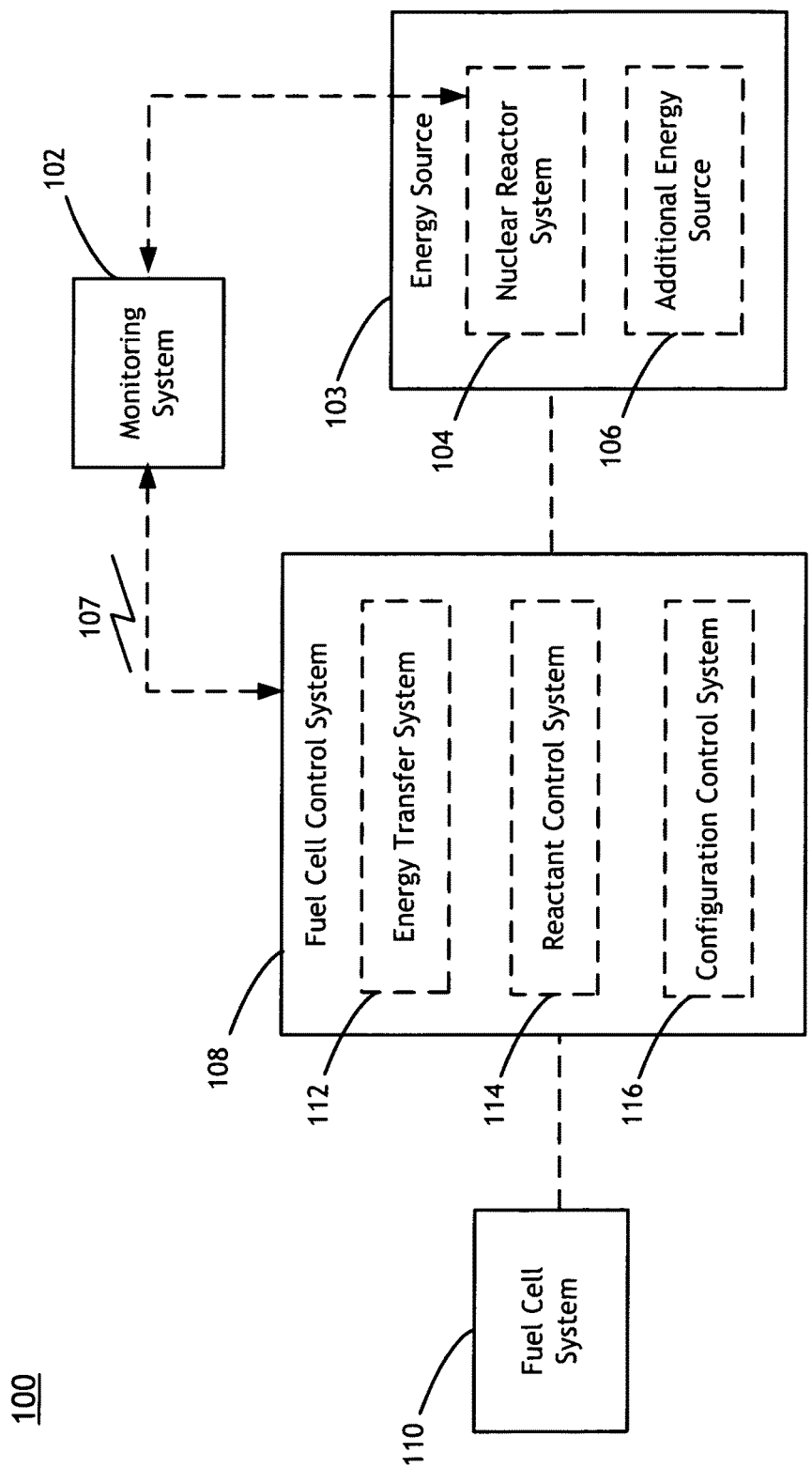
FIG. 1A is a block diagram illustrating a system for establishing or maintaining a readiness state in a fuel cell system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 1O, a system 100 for maintaining or establishing a readiness state in a fuel cell backup system of a nuclear reactor system is described in accordance with the present disclosure. One or more monitoring systems 102 may monitor one or more characteristics, such as an operational characteristic or a design characteristic, of a nuclear reactor system 104. Then, the monitoring system may transmit a signal 107 indicative of the one or more monitored characteristics of the nuclear reactor system 104 to a fuel cell control system 108. In response to the signal 107 transmitted by the monitoring system, a fuel cell control system 108 (e.g., a fuel cell control module 109, energy transfer system 112, reactant control system 114, or configuration control system 116) may maintain or establish a readiness state (e.g., electrical output state, temperature state, humidity state, or pressure state) of a fuel cell system 110. An acceptable readiness state may be defined by a set of readiness parameters which are a function (e.g., a variable function) of one or more of the monitored characteristics of the nuclear reactor system 104 measured by the monitoring system 102.

While the preceding description refers to a system 100 for maintaining or establishing a readiness state in a fuel cell system 110, hereinafter the system 100 will be described in terms of establishing a readiness state in a fuel cell system 110. This should not, however, be interpreted as a limitation as the remainder of the description should be construed as describing the system 100 and its various embodiments for establishing or maintaining a readiness sate in a fuel cell system 110.

In some embodiments, the readiness state established by the fuel cell control system 108 may include, but is not limited to, a readiness state of one or more of the fuel cells of the fuel cell system. For example, the fuel cell control system 108 may establish a temperature, a pressure state, a humidity level or an electrical output level within a portion of one or more of the fuel cells of the fuel cell system. For instance, a monitoring system 102 may monitor a characteristic of the nuclear reactor system 104. Then, the monitoring system may transmit a signal indicative of the monitored characteristic of the nuclear reactor system 104 to a fuel cell control system 108. In response to the transmitted signal from the monitoring system 102, the fuel cell control system 108 may establish a temperature level in one or more of the fuel cells of the fuel cell system 110, wherein the established temperature level is specified by the value of the measured characteristic of the nuclear reactor system 104. For instance, the monitoring system 102 may measure an elevated temperature in the nuclear reactor core of the nuclear reactor system 104. In response to that elevated temperature measurement, the fuel cell control system 108 may establish a temperature level in one or more fuel cells of the fuel cell system 110 in order to increase the response time of the fuel cell system in the event of nuclear reactor system malfunction. It is further recognized that the choice of temperature level may be determined by a computer programmed algorithm of the fuel cell control system 108 which relates a monitored characteristic of the nuclear reactor system to an appropriate temperature level in one or more of the fuel cells of the fuel cell system.

By way of another example, a monitoring system 102 may monitor a characteristic of the nuclear reactor system 104. Then, the monitoring system may transmit a signal indicative of the monitored characteristic of the nuclear reactor system 104 to a fuel cell control system 108. In response to the transmitted signal from the monitoring system 102, the fuel cell control system 108 may establish an electrical output level (e.g., current output level or voltage output level) in one or more of the fuel cells of the fuel cell system 110, wherein the established electrical output level is specified by the value of the measured characteristic of the nuclear reactor system. For example, the monitoring system 102 may measure an elevated temperature in the nuclear reactor core of the nuclear reactor system 104. In response to that elevated temperature measurement, the fuel cell control system 108 may establish an electrical output level in one or more fuel cells of the fuel cell system 110 in order to increase the response time of the fuel cell system 110 in the event of nuclear reactor system malfunction. It is further recognized that the choice of the electrical output level may be determined by a computer programmed algorithm of the fuel cell control system 108 which relates a monitored characteristic of the nuclear reactor system to an appropriate electrical output level in one or more of the fuel cells of the fuel cell system.

In other embodiments, the readiness state established by the fuel cell control system 108 may include, but is not limited to, a readiness state of one or more of the reactant gases of the fuel cell system 110. For example, the fuel cell control system 108 may establish a temperature, a pressure, a humidity level, or a flow rate in the fuel stream or oxidant stream (e.g., air or reservoir supplied oxidant) of the fuel cell system 110. For instance, a monitoring system 102 may monitor a characteristic of the nuclear reactor system 104. Then, the monitoring system may transmit a signal indicative of the monitored characteristic of the nuclear reactor system 104 to a fuel cell control system 108. In response to the transmitted signal from the monitoring system 102, the fuel cell control system 108 may establish a temperature level in one or both of the reactant gases of the fuel cell system 110, wherein the established temperature level is specified by the value of the measured characteristic of the nuclear reactor system. For example, the monitoring system 102 may measure an elevated temperature in the nuclear reactor core of the nuclear reactor system 104. In response to that elevated temperature measurement, the fuel cell control system 108 may establish a temperature level in one or both of the reactant gases of the fuel cell system 110 in order to increase the response time of the fuel cell system in the event of nuclear reactor system malfunction. It is further recognized that the choice of temperature level may be determined by a computer programmed algorithm of the fuel cell control system 108 which relates a monitored characteristic of the nuclear reactor system to an appropriate temperature level in one or both of the reactant gases of the fuel cell system 110.

In another instance, a monitoring system 102 may monitor a characteristic of the nuclear reactor system 104. Then, the monitoring system may transmit a signal indicative of the monitored characteristic of the nuclear reactor system 104 to a fuel cell control system 108. In response to the transmitted signal from the monitoring system 102, the fuel cell control system 108 may establish a flow rate in one or both of the reactant gases of the fuel cell system 110, wherein the established flow rate is specified by the value of the measured characteristic of the nuclear reactor system. For example, the monitoring system 102 may measure an elevated temperature in the nuclear reactor core of the nuclear reactor system 104. In response to that elevated temperature measurement, the fuel cell control system 108 may establish a flow rate in one or both of the reactant gases of the fuel cell system 110 in order to increase the response time of the fuel cell system 110 in the event of nuclear reactor system malfunction. It is further recognized that the choice of the flow rate in either the oxidant gas or fuel gas may be determined by a computer programmed algorithm of the fuel cell control system 108 which relates a monitored characteristic of the nuclear reactor system to an appropriate electrical output level in one or more of the fuel cells of the fuel cell system.

Figure 1B:
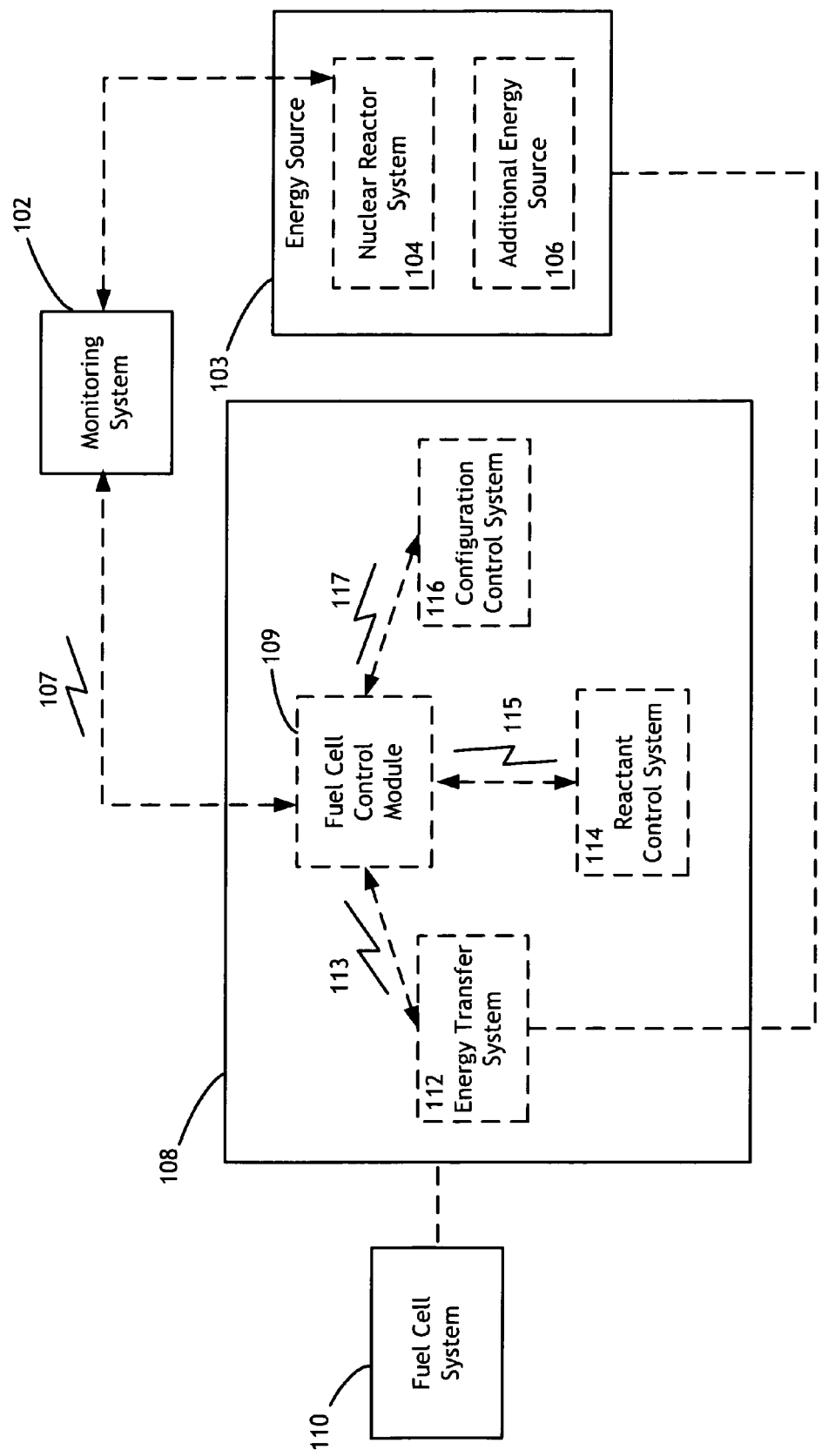
FIG. 1B is a block diagram illustrating a system for establishing or maintaining a readiness state in a fuel cell system.

Referring now to FIG. 1B, the fuel cell control system 108 may include a fuel cell control module 109 communicatively coupled to one or more subsystems (e.g., energy transfer system 114, reactant control system 116, or configuration control system 118) of the fuel cell control system 108. For example, the fuel cell control system 108 may include a fuel cell control module 109 (e.g., computer controlled data management system) communicatively coupled to an energy transfer system 112 of the fuel cell control system 108 by the transmission of a digital or analog signal 113. For instance, the fuel cell control module 109 may be communicatively coupled to an energy transfer control module 145 of energy transfer system 112. In another example, the fuel cell control system 108 may include a fuel cell control module 109 communicatively coupled to a reactant control system 114 of the fuel cell control system 108 by the transmission of a digital or analog signal 115. For instance, the fuel cell control module 109 may be communicatively coupled to a reactant control module 155 of the reactant control system 114. By way of an additional example, the fuel cell control system 108 may include a fuel cell control module 109 communicatively coupled to a configuration control system 116 of the fuel cell control system 108 by the transmission of a digital or analog signal 117. For instance, the fuel cell control system 108 may include a fuel cell control module 109 communicatively coupled to a configuration control module 167 of the configuration control system 116 of the fuel cell control system 108 by the transmission of a digital or analog signal 117

Further, the fuel cell control module 109 may include a fuel cell control module configured to receive an instruction signal 107 from the monitoring system 102. For instance, a monitoring system 102 may monitor one or more characteristics of a nuclear reactor system 104. Then, the monitoring system 102 may transmit an instruction signal 107 indicative of the one or more monitored characteristics of the nuclear reactor system 104 to a fuel cell control module 109 of the fuel cell control system 108. In response to the transmitted signal 107 from the monitoring system, the fuel cell control module 109 may transmit an instruction signal 113 to an energy transfer system 112 (e.g., energy transfer system control module 145) of the fuel cell control system 108 in order to establish a readiness state in the fuel cell system 110. In another instance, a monitoring system 102 may monitor one or more characteristics of a nuclear reactor system 104. Then, the monitoring system 102 may transmit a signal 107 indicative of the one or more monitored characteristics of the nuclear reactor system 104 to a fuel cell control module 109 of a fuel cell control system 108. In response to the transmitted signal 107 from the monitoring system, the fuel cell control module 109 may transmit an instruction signal 115 to a reactant control system 114 of the fuel cell control system 108 in order to establish a readiness state in the fuel cell system 110. Further, a monitoring system 102 may monitor one or more characteristics of a nuclear reactor system 104. Then, the monitoring system may transmit a signal 107 indicative of the one or more monitored characteristics of the nuclear reactor system 104 to a fuel cell control module 109 of a fuel cell control system 108. In response to the transmitted signal 107 from the monitoring system, the fuel cell control module 109 may transmit an instruction signal 117 to a configuration control system 116 of the fuel cell control system 108 in order to establish a readiness state in the fuel cell system 110.

It will be appreciated by those skilled in the art that the fuel cell control module 109 may include signal processing and computer data management hardware and/or software configured to receive a signal transmitted from monitoring system 102 and, based upon that signal, determine appropriate instructions (e.g., via a preprogrammed computer algorithm) for the various subsystems. Then, the fuel cell control module 109 may transmit those appropriate instructions to the required fuel cell control subsystems, such as the energy transfer system 112 (e.g., energy transfer control module 145), the reactant control system 114 (e.g., the reactant control module 155), or the configuration control system 116 (e.g., the configuration control module 167).

It will be appreciated by those skilled in the art that the communicative coupling between the fuel cell control module 109 and the fuel cell control subsystems 112-116 and the communicative coupling the between fuel cell control module 109 and the monitoring system 102 may be achieved in various manners. For example, the described components may be communicatively coupled via a digital or analog signal transmitted along a transmission line (e.g., copper wire, coaxial cable, or fiber optic cable) or via a digital or analog wireless signal (e.g., radio frequency signal). It should also be appreciated that the communicative coupling may be achieved via a network connection, wherein the fuel cell control module 109, the monitoring system 102, and the various subsystem control modules (i.e., energy transfer control module 145, reactant control module 155 and configuration control module 167) of the fuel cell control system 108 are connected to a common digital network.

It should be recognized that communicative coupling described in the preceding description does not represent a limitation, but rather an illustration as one skilled in the art will appreciate that the communicative coupling between the monitoring system 102 and the fuel cell control module 109 and the communicative coupling between the fuel cell control module 109 and the various subsystems of the fuel cell control system 108 may be achieved through a variety of configurations.

Figure 1C:
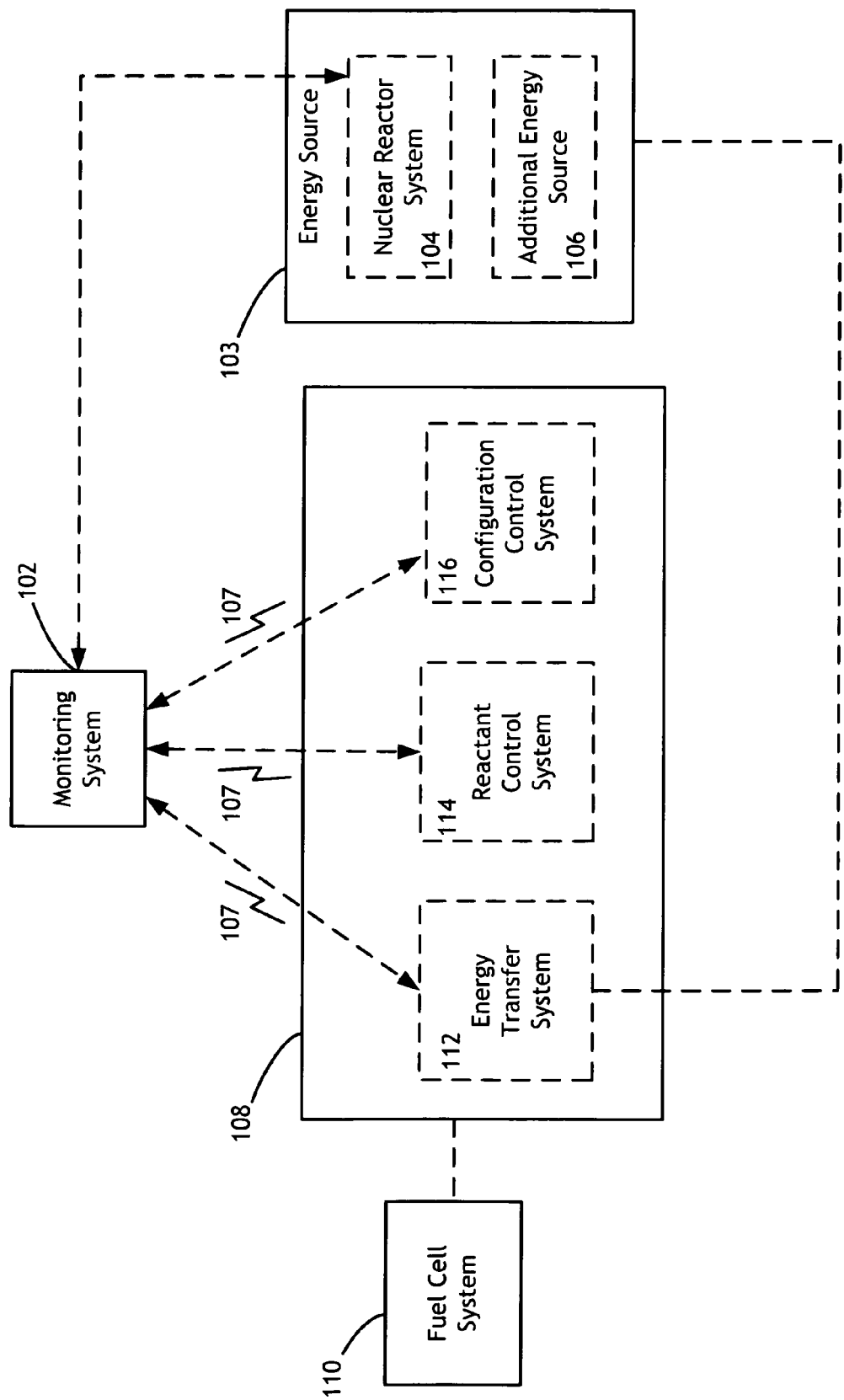
FIG. 1C is a block diagram illustrating a system for establishing or maintaining a readiness state in a fuel cell system.

Referring now to FIG. 1C, the monitoring system 102 may be directly communicatively coupled to a subsystem (e.g. energy transfer system 112, reactant control system 114 or configuration control system 116) of the fuel cell control system 108. For example, a monitoring system 102 may monitor one or more characteristics of a nuclear reactor system 104. Then, the monitoring system 102 may transmit a signal 107 indicative of the one or more monitored characteristics of the nuclear reactor system 104 directly to an energy transfer system 112 (e.g., energy transfer control module 145) of the fuel cell control system 108. In response to the transmitted signal 107 from the monitoring system, the energy transfer system may transfer energy from an energy source to a portion of the fuel cell system 110 in order to establish a readiness state in the fuel cell system 110. In another example, a monitoring system 102 may monitor one or more characteristics of a nuclear reactor system 104. Then, the monitoring system 102 may transmit a signal 107 indicative of the one or more monitored characteristics of the nuclear reactor system 104 to a reactant control system 114 (e.g., reactant control module 155) of the fuel cell control system 108. In response to the transmitted signal 107 from the monitoring system 102, the reactant control system 114 may adjust conditions of the reactants of the fuel cell system 110 in order to establish a readiness state in the fuel cell system 110. By way of an additional example, a monitoring system 102 may monitor one or more characteristics of a nuclear reactor system 104. Then, the monitoring system 102 may transmit a signal 107 indicative of the one or more monitored characteristics of the nuclear reactor system 104 to a configuration control system 116 (e.g., configuration control module 167) of the fuel cell control system 108. In response to the transmitted signal 107 from the monitoring system, the configuration control system 116 may adjust the configuration of the fuel cells of the fuel cell system 110 in order to establish a readiness state in the fuel cell system 110.

It should also be appreciated that the communicative coupling may be achieved via a network connection, wherein the monitoring system 102, and the various subsystem control modules (i.e., energy transfer control module 145, reactant control module 155 and configuration control module 167) of the fuel cell control system 108 are connected to a common network. It should be recognized that communicative coupling described in the preceding description does not represent a limitation, but rather an illustration as one skilled in the art will appreciate that the communicative coupling between the monitoring system 102 and the various subsystems of the fuel cell control system 108 may be achieved through a variety of configurations.

Referring now to FIG. 1A through 1H, the fuel cell control system 108 may include an energy transfer system 112 configured to transfer energy from one or more energy sources 103 to a portion of the fuel cell system 110. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the fuel cell control system 108 using an energy transfer system 112 configured to transfer energy from an energy source 103 to a portion of the fuel cell system 110 may establish a readiness state in the fuel cell system 110 by transferring energy (e.g., thermal energy or electrical energy) from an energy source 103 (e.g., portion of the nuclear reactor system 104 or an additional energy source 106) to a portion (e.g., a conditioning system 140 or portion of the fuel cell system block 130) of the fuel cell system 110.

Figure 1D:
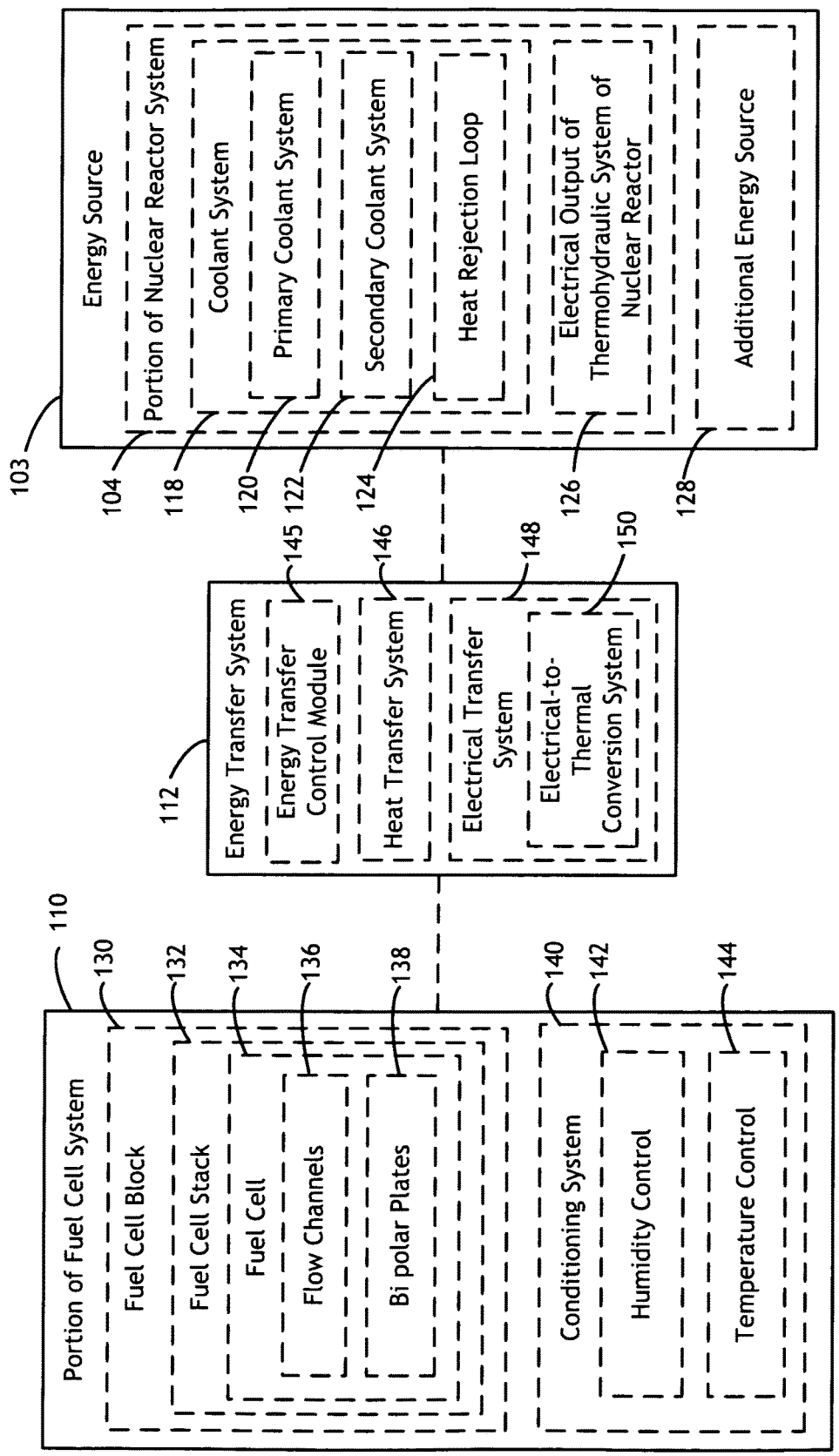
FIG. 1D is a block diagram illustrating types of energy transfer systems suitable for transferring energy from an energy source to a fuel cell system.

Referring now to FIG. 1D, the energy source 103 may include, but is not limited to, a portion of the nuclear reactor system 104 associated with the fuel cell system 110. For example, in response to the signal 107 transmitted by the monitoring system 102, the energy transfer system 112 of the fuel cell control system 108 may transfer energy from a portion of the nuclear reactor system 104 to a portion of the fuel cell system 110 in order to establish a readiness state in the fuel cell system 110.

In a further embodiment, the portion of the nuclear reactor system 104 may include, but is not limited to, a portion of a coolant system 118 of the nuclear reactor system 104. For example, in response to the transmitted signal 107 from the monitoring system 102, energy transfer system 112 of the fuel cell control system 108 may transfer energy from a portion of the coolant system 118 of the nuclear reactor system 104 to a portion of the fuel cell system 110 in order to establish a readiness state in the fuel cell system 110.

In some embodiments, the coolant system may include a primary coolant system 120 of the nuclear reactor system 104. For instance, in response to the transmitted signal 107 from the monitoring system 102, the energy transfer system 112 may transfer thermal energy from a portion of the primary coolant system 120 (e.g., primary coolant loop), of the nuclear reactor system 104 to a portion of the fuel cell system 110 in order to establish a readiness state in the fuel cell system 110.

In another embodiment, the coolant system 118 may include a secondary coolant system 122 of the nuclear reactor system 104. For instance, in response to the transmitted signal 107 from the monitoring system 102, the energy transfer system 112 of the fuel cell control system 108 may transfer thermal energy from a portion of the secondary coolant system 122 (e.g., secondary coolant loop) of the nuclear reactor system 104 to a portion of the fuel cell system 110 in order to establish a readiness state in the fuel cell system 110.

In another embodiment, the coolant system 118 may include a waste heat rejection loop 124 of the nuclear reactor system. For instance, a monitoring system 102 may monitor one or more characteristics of a nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the energy transfer system 112 of the fuel cell control system 108 may transfer thermal energy from a portion of the waste heat rejection loop 124 (e.g., waste heat rejection loop transferring heat to cooling towers of the nuclear reactor system 104) of the nuclear reactor system 104 to a portion of the fuel cell system 110 in order to establish a readiness state in the fuel cell system 110.

In a further embodiment, the portion of the nuclear reactor may include, but is not limited to, an electrical output of a thermohydraulic system 126 of the nuclear reactor system 104. For example, in response to the transmitted signal 107 from the monitoring system 102, the energy transfer system 112 of the fuel cell control system 108 may transfer electrical energy from an electrical output of a thermohydraulic system 126 (e.g., electrical output of a generator coupled to a turbine of the nuclear reactor system) of the nuclear reactor system 104 to a portion of the fuel cell system 110 in order to establish a readiness state in the fuel cell system 110. It will be appreciated by those skilled in the art that electricity supplied from an external electrical power 'grid' to a portion of the fuel cell system 110 in fact represents electricity supplied, in part, by a turbine-generator system of the nuclear reactor system 104 in situations where the nuclear reactor system 104 supplies electricity to the external power grid. Therefore, supplemental electrical power (e.g., power used to maintain or establish temperature in the fuel cell system 110) that is transferred from the external electrical grid to a portion of the fuel cell system 110 (e.g., temperature control system) is in fact, at least in part, supplied by the nuclear reactor system 104.

In another embodiment, the energy source 103 may include, but is not limited to, an additional energy source 128. For example, in response to the transmitted signal 107 from the monitoring system 102, the energy transfer system 112 of the fuel cell control system 108 may transfer energy from a portion of an additional non-nuclear energy source 128 to a portion of the fuel cell system 110 in order to establish a readiness state in the fuel cell system 110.

In a further embodiment, the additional energy source 128 may include, but is not limited to, a non-nuclear thermohydraulic electrical generator system. For example, in response to the transmitted signal 107 from the monitoring system 102, the energy transfer system 112 of the fuel cell control system 108 may transfer electrical energy from an electrical output of a non-nuclear powered electrical generator (e.g., diesel powered generator or coal powered generator) to a portion of the fuel cell system 110 in order to establish a readiness state in the fuel cell system 110.

In another embodiment, the additional energy source 128 may include, but is not limited to, an energy storage system. For example, a monitoring system 102 may monitor one or more characteristics of a nuclear reactor system 104. Then, the monitoring system 102 may transmit a signal 107 indicative of the one or more monitored characteristics of the nuclear reactor system 104 to the fuel cell control system 108. In response to the transmitted signal 107 from the monitoring system 102, the energy transfer system 112 of the fuel cell control system 108 may transfer energy from an energy storage system (e.g., electrical battery, electrical capacitor, or thermal storage system) to a portion of the fuel cell system 110 in order to establish a readiness state in the fuel cell system 110.

Referring again to FIG. 1D, the portion of the fuel cell system 110 may include the fuel cell block 130 of the fuel cell system. For example, a monitoring system 102 may monitor one or more characteristics of a nuclear reactor system 104. Then, the monitoring system 102 may transmit a signal 107 indicative of the one or more monitored characteristics of the nuclear reactor system 104 to the fuel cell control system 108. In response to the transmitted signal 107 from the monitoring system 102, the energy transfer system 112 of the fuel cell control system 108 may transfer energy from an energy source 103 to a portion of the fuel cell block 130 of the fuel cell system 110 in order to establish a readiness state in the fuel cell system 110. For instance, energy may be transferred from a portion of the nuclear reactor system 104 to the fuel cell block 130 of the fuel cell system 110 in order to establish a desired operating temperature of the fuel cell system 110.

In a further embodiment, the portion of the fuel cell block 130 may include one or more fuel cell stacks 132 of the fuel cell system 110. For example, in response to the transmitted signal 107 from the monitoring system 102, the energy transfer system 112 of the fuel cell control system 108 may transfer energy from an energy source to one or more fuel cell stacks 130 of the fuel cell system 110 in order to establish a readiness state in the fuel cell system 110. For instance, energy may be transferred from a portion of the nuclear reactor system 104 to individual fuel cell stacks 130 of the fuel cell system 108 in order to establish a desired operating temperature of the fuel cell system.

In further embodiment, the portion of the fuel cell block 130 may include one or more individual fuel cells of one or more fuel cell stacks of the fuel cell block. For example, in response to the transmitted signal 107 from the monitoring system 102, the energy transfer system 112 of the fuel cell control system 108 may transfer energy from an energy source 103 to an individual fuel cell 134 of a fuel cell stack 132 of the fuel cell system 110 in order to establish a readiness state in the fuel cell system 110. For instance, energy may be transferred from a portion of the nuclear reactor system 104 to the individual fuel cells 134 of the fuel cell stacks 130 of the fuel cell system 110 in order to establish a desired operating temperature of the fuel cell system. It will be recognized by those skilled in the art that heating individual fuel cell stacks and individual fuel cells allows for more precise control of local thermal conditions within the fuel cell system 110 than a global heating system.

In a further embodiment, the portion of a fuel cell 134 may include, but is not limited to, the bipolar plates 136 of a fuel cell 134 of a fuel cell system 110. For example, in response to the transmitted signal 107 from the monitoring system 102, the energy transfer system 112 of the fuel cell control system 108 may transfer thermal energy from an energy source 103 to the bipolar plates of one or more fuel cells 134 of the fuel cell system 110 in order to establish a readiness state in the fuel cell system 110. For instance, thermal energy may be transferred from a portion of the heat rejection loop 124 of the nuclear reactor system 104 to the bipolar plates 136 of one or more fuel cells 134 of the fuel cell system 110 in order to establish a desired operating temperature of the fuel cell system. In another instance, thermal energy may be transferred from a portion of primary coolant system 120 of the nuclear reactor system 104 to the bipolar plates 136 of one or more fuel cells 134 of the fuel cell system 110 in order to establish a desired operating temperature of the fuel cell system.

Further, the energy transfer system 112 of the fuel cell control system 108 may transfer thermal energy from an energy source 103 to the flow channels 138 of the bipolar plates 136 of one of more fuel cells 134 of the fuel cell system 110 in order to establish a readiness state in the fuel cell system 110. For instance, thermal energy may be transferred from a portion of the heat rejection loop 124 of the nuclear reactor system 104 to the flow channels 138 of the bipolar plates 136 of one or more fuel cells 134 of the fuel cell system 110 in order to establish a desired operating temperature of the fuel cell system 110.

It will be appreciate by those skilled in the art that energy may be transferred from an energy source 130 to the fuel cell system 110 in various ways. For instance, electrical energy from an electrical output of the reactor-generator system may be transferred to an electrical heater in thermal communication with a portion of the fuel cell system 110 in order to establish a desired fuel cell operating temperature. In another instance, a heat transfer system may transfer thermal energy directly from a portion of the nuclear reactor system 104 to a portion of the fuel cell system 110 in order to establish a desired fuel cell operating temperature. The preceding description is not to be construed as a limitation but rather merely an illustration as it is recognized that the preferred mechanism for energy transfer is dependent upon the specific context the present invention is implemented.

In another embodiment, the portion of the fuel cell system 110 may include a conditioning system 140 of the fuel cell system 110. For example, a monitoring system 102 may monitor one or more characteristics of a nuclear reactor system 104. Then, the monitoring system 102 may transmit a signal 107 indicative of the one or more monitored characteristics of the nuclear reactor system 104 to the fuel cell control system 108. In response to the transmitted signal 107 from the monitoring system 102, the energy transfer system 112 of the fuel cell control system 108 may transfer energy from an energy source 103 to one or more conditioning systems 140 of the fuel cell system 110 in order to establish a readiness state in the fuel cell system 110. For instance, the conditioning system 140 may use the thermal or electrical energy transferred from the energy source 103 to adjust the conditions of the fuel cell system 110 so as to establish a readiness state within the readiness parameters defined by the measured conditions of the nuclear reactor system 104.

In a further embodiment, the condition system 140 may include a humidity control system 142 of the fuel cell system 110. For example, in response to the signal 107 transmitted from the monitoring system 102, the energy transfer system 112 of the fuel cell control system 108 may transfer thermal energy from a portion of the nuclear reactor system 104 to a humidity control system 142 of the fuel cell system 110 in order to establish a desired humidity level in the reactant gas streams or the fuel cell membrane of the fuel cell system 110. For instance, the humidity control system 142 (e.g., humidifier) may use the thermal energy transferred from the energy source 103 to adjust the humidity level in the reactant gas (e.g., fuel or oxidant) in order to establish a readiness state within the readiness parameters defined by the measured conditions of the nuclear reactor system 104. In another instance, the humidity control system 142 may use the thermal energy transferred from the energy source 103 to adjust the humidity level in the fuel cell membrane of the fuel cell system 110 in order to establish a readiness state within the readiness parameters defined by the measured conditions of the nuclear reactor system 104.

In another embodiment, the conditioning system 140 may include a temperature control system 142 of the fuel cell system 110. For example, in response to the signal 107 transmitted from the monitoring system 102, the energy transfer system 112 of the fuel cell control system 108 may transfer thermal energy from a portion of the nuclear reactor system 104 to a temperature control system 144 of the fuel cell system 110 in order to establish a desired operating temperature of the fuel cell system 110. For instance, the temperature control system 144 (e.g., temperature control feedback system) may use the energy transferred from the energy source 103 to adjust the temperature of a portion (e.g., reactant gas, bipolar plates, or fuel cell membrane) of the fuel cell system 110 in order to establish a readiness state within the readiness parameters defined by the measured conditions of the nuclear reactor system 104.

Referring again to FIG. 1D, the energy transfer system 112 of the fuel cell control system 108 may include a heat transfer system 146 configured to transfer thermal energy from one or more energy sources 103 to a portion of the fuel cell system 110. For example, a monitoring system 102 may monitor one or more characteristics of the nuclear reactor system 104. Then, the monitoring system 102 may transmit a signal 107 indicative of the one or more monitored characteristics of the nuclear reactor system 104 to the fuel cell control system 108. In response to the signal 107 transmitted from the monitoring system 102, the heat transfer system 146 configured to transfer thermal energy from one or more energy sources 103 to a portion of the fuel cell system 110 may establish a readiness state in the fuel cell system 110 by transferring thermal energy from a portion of the nuclear reactor system 104 (e.g., heat rejection loop, portion of the primary coolant system or portion, of secondary coolant system) to a portion of the fuel cell system 110, such as the bipolar plates 138 of one or more of fuel cells 134, the flow channels 136 of one or more fuel cells 134, or one or more conditioning systems 140 (e.g., humidity control system 142 or temperature control system 144).

Further, the heat transfer system 146 of the fuel cell control system 108 may be configured to transfer thermal energy from an energy source 103 to a portion of the fuel cell system 110 via thermal convection (e.g., natural convection or forced convection via fluid pumps(s)). Additionally, the heat transfer system 146 of the fuel cell control system 108 may be configured to transfer thermal energy from an energy source 103 to a portion of the fuel cell system 110 via thermal conduction. It will be appreciated by those skilled in the art that the heat transfer system 146 may be configured to transfer thermal energy from a portion of an energy source 103 to the fuel cell system 110 using both thermal conduction and thermal convection.

Figure 1E:
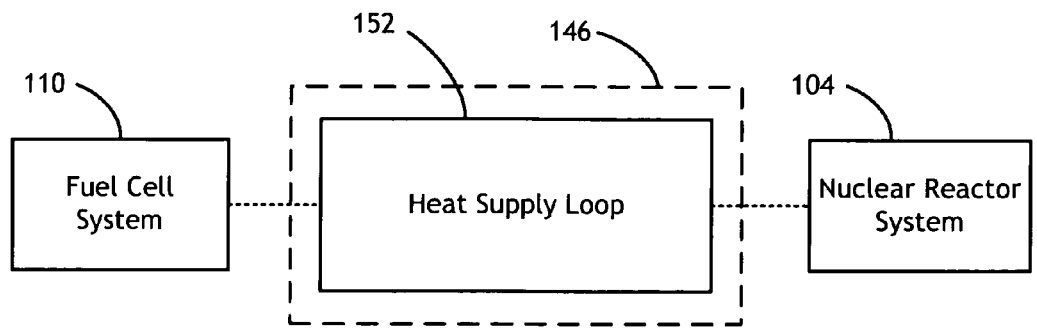
FIG. 1E is a block diagram illustrating a heat transfer system for transferring thermal energy from a nuclear reactor system to a fuel cell system.

Referring now to FIGS. 1D through 1H, the heat transfer system 146 may include a heat supply loop 152. For example, in response to a signal 107 transmitted by the monitoring system 102, the heat transfer system 146 of the fuel cell control system 108 may establish a readiness state in the fuel cell system 110 by transferring thermal energy from an energy source 103 to a portion of the fuel cell system 110 using one or more heat supply loops 152. For instance, as illustrated in FIG. 1E, in response to a signal 107 transmitted by the monitoring system 102, the heat transfer system 146 of the fuel cell control system 108 may establish a readiness state in the fuel cell system 110 by transferring thermal energy from a portion of the nuclear reactor system 104 (e.g., waste heat rejection loop 124, primary coolant system 120 or secondary coolant system 122) to a portion of the fuel cell system 110 (e.g., conditioning system 140 or bipolar plates 136 of a fuel cell) using one or more heat supply loops 152.

In a further embodiment, illustrated in FIG. 1E, the heat supply loop 152 may comprise a heat supply loop having a first portion in thermal communication with a portion of the nuclear reactor system 104 (e.g., primary coolant loop, secondary coolant loop, or a heat rejection loop) and a second portion in thermal communication with a portion of the fuel cell system 110 (e.g., condition system 140 or portion of fuel cell block 130). For instance, in response to a signal 107 transmitted by the monitoring system 102, the heat transfer system 146 of the fuel cell control system 108 may establish a readiness state in the fuel cell system 110 by transferring thermal energy from a portion of the nuclear reactor system 104 to a portion of the fuel cell system 110 using one or more heat supply loops 152 having a first portion in thermal communication with a heat rejection loop 124 of the nuclear reactor system 104 and a second portion in thermal communication with the bipolar plates 136 of one or more fuel cells 134 of the fuel cell system 110. In another instance, in response to a signal 107 transmitted by the monitoring system 102, the heat transfer system 146 of the fuel cell control system 108 may establish a readiness state in the fuel cell system 110 by transferring thermal energy from a portion of the nuclear reactor system 104 to a portion of the fuel cell system 110 using one or more heat supply loops 152 having a first portion in thermal communication with a heat rejection loop 124 of the nuclear reactor system 104 and a second portion in thermal communication with a conditioning system 140 of the fuel cell system 110.

Figure 1F:
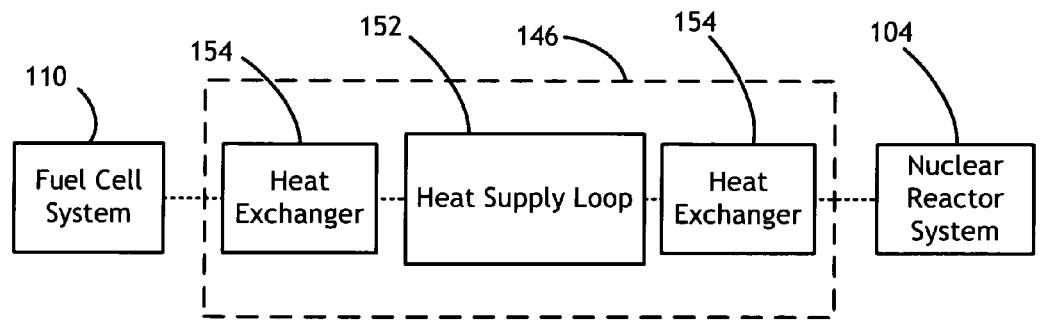
FIG. 1F is a block diagram illustrating a heat transfer system for transferring thermal energy from a nuclear reactor system to a fuel cell system.

In another embodiment, illustrated in FIG. 1F, the heat transfer system 146 may include one or more heat exchangers 154. For example, in response to the signal 107 transmitted by monitoring system 102, the heat transfer system 146 of the fuel cell control system 108 may establish a readiness state in the fuel cell system 112 by transferring thermal energy from a portion of the nuclear reactor system 104 to a portion of the fuel cell system 110 using one or more heat exchangers 154. For instance, the heat exchanger 154 may comprise a heat exchanger having a first portion in thermal communication with a portion of the nuclear reactor system 104 (e.g., primary coolant loop) and a second portion in thermal communication with a portion of the fuel cell system 110 (e.g., flow channels 138 of one or more fuel cells 134).

In a further embodiment, the heat transfer system 146 of the fuel cell control system 108 may include a combination of one or more heat exchange loops 152 and one or more heat exchangers 154. For example, as illustrated in FIG. 1F, a first portion of a first heat exchanger 154 may be in thermal communication with a portion of the nuclear reactor system 104, while a second portion of the first heat exchanger 154 may be in thermal communication with the heat supply loop 152. Further, a first portion of a second heat exchanger 154 may be in thermal communication with a portion of the fuel cell system 110, while a second portion of the second heat exchanger 154 may be in thermal communication with the heat supply loop 152. Collectively, the first heat exchanger-heat supply loop-second heat exchanger system acts to transfer thermal energy from a portion of the nuclear reactor system 104 to a portion of the fuel cell system 110 in order to establish a readiness state in the fuel cell system 110 in response to a signal 107 transmitted from the monitoring system 102 to the fuel cell control system 108.

Figure 1G:
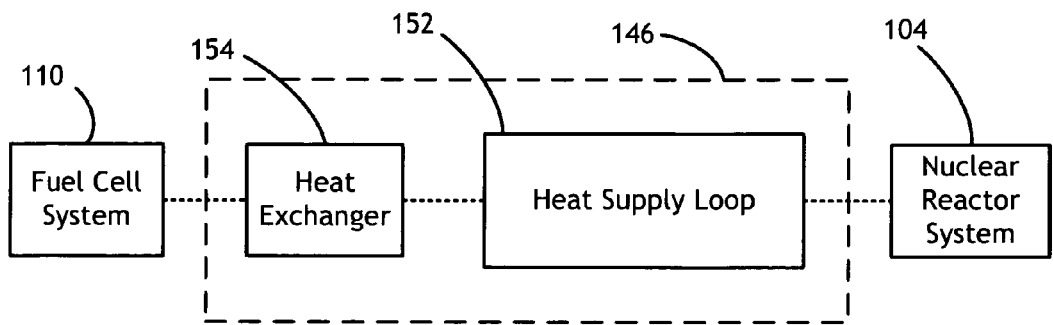
FIG. 1G is a block diagram illustrating a heat transfer system for transferring thermal energy from a nuclear reactor system to a fuel cell system.

By way of another example, illustrated in FIG. 1G, a first portion of a heat exchanger 154 may be in thermal communication with a portion of the nuclear reactor system 104, while a second portion of the heat exchanger 154 may be in thermal communication with a first portion of the heat supply loop 152. In addition, a second portion of the heat supply loop 152 may be in direct thermal communication with a portion of the fuel cell system 110 with no interposed heat exchanger. For instance, the second portion of the heat supply loop 152 may be coupled to a portion of the fuel cell system 110 so that the heat supply loop fluid may be in direct thermal communication (i.e., heat supply fluid is allowed to flow through a portion of the fuel cell system) with a portion of the fuel cell system 110, thus transferring thermal energy directly from the fluid circulated in the heat supply loop to the fuel cell system 110.

Figure 1H:
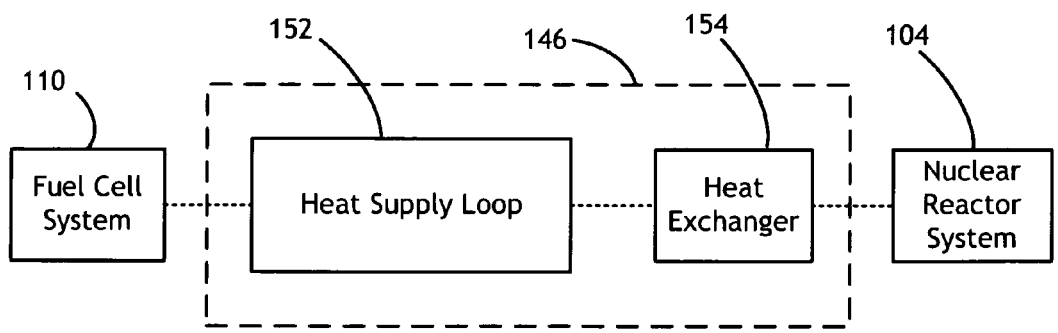
FIG. 1H is a block diagram illustrating a heat transfer system for transferring thermal energy from a nuclear reactor system to a fuel cell system.

In an additional example, illustrated in FIG. 1H, a first portion of the heat supply loop 152 may be in direct thermal communication with a portion of the nuclear reactor system 104. Further, a first portion of a heat exchanger 154 may be in thermal communication with a second portion of the heat supply loop 152, while a second portion of the heat exchanger 154 is in thermal communication with a portion of the fuel cell system 110. For instance, the first portion of heat supply loop 152 may be coupled to a heat rejection loop 124 of the nuclear reactor system 104 so that a portion of the fluid (e.g., water) transferred in the heat rejection loop 124 is allowed to flow through the heat supply loop 152. Thermal energy may then be transferred from the heat rejection loop fluid diverted through the heat supply loop 153 to a portion of the fuel cell system 110 via the heat exchanger 154 connected between the second portion of the heat supply loop 152 and the portion of the fuel cell system 110.

In another embodiment, the heat transfer system 146 may include a direct fluid exchange system. For example, the heat transfer system 146 may include a heat supply loop 152 configured to transfer fluid from a portion of the nuclear reactor system 104 (e.g., heat rejection loop 124) to a portion of the fuel cell system 110. For instance, a first portion of a heat supply loop 152 may be operably coupled to a heat rejection loop 124 of the nuclear reactor system 104 so that a portion of the heat rejection fluid (e.g., water) is allowed to flow through the heat supply loop 152. Additionally, a second portion of the heat supply loop 152 may be coupled to a portion of the fuel cell system 110 so that the heat rejection fluid may be circulated through a portion of the fuel cell system 110 via the heat supply loop 152. As a result, thermal energy from the fluid circulated in the heat rejection loop 124 may be transferred from the heat rejection fluid to a portion of the fuel cell system 110.

It is further contemplated that in order to achieve effective thermal energy transfer via the heat supply loop 152 one or more fluid pumps and one or more valve systems may be utilized in order to circulate the heat rejection fluid through the nuclear reactor system-heat supply loop-fuel cell system circuit. For instance, a fluid carrying heat supply loop 152 may couple a portion of the nuclear reactor system 104 and a portion of the fuel cell system 110, allowing the heat rejection liquid to flow through a portion of the fuel cell system 110. The rate of fluid flow may be controlled by the heat transfer system 146 of the fuel cell control system 108. For instance, a valve system and/or fluid pumps (e.g., mechanical pumps) may be controlled to volumetrically limit the flow through the heat supply circuit It is further contemplated that the fuel cell control module 109 of the fuel cell control system 108 may transmit an instruction signal to the heat transfer system 146 (e.g. via the energy transfer module 145).

In addition, it is further recognized that polymer electrolyte membrane (PEM) fuel cells are particularly useful in implementing the present invention as PEM fuel cells have been shown to have an optimal operating temperature (approximately 60 to 160° C.) near the waste heat temperatures of a variety of nuclear reactor systems (e.g., PWR system or BWR system). It is further contemplated that solid oxide fuel cells, which have an optimal operating temperature (approximately 600 to 1000° C.) much higher than PEM fuel cells, may be implemented in the context of a high temperature gas reactor, wherein the heat rejection occurs at a higher temperature than in PWR and BWR reactor systems.

Referring again to FIG. 1D, the energy transfer system 112 configured to transfer energy from one or more energy sources 103 to a portion of the fuel cell system 110 may include an electrical transfer system 148 configured to transfer electrical energy form one or more energy sources 103 to a portion of the fuel cell system 110. For example, a monitoring system 102 may monitor one or more characteristics of the nuclear reactor system 104. Then, the monitoring system 102 may transmit a signal 107 indicative of the one or more monitored characteristics of the nuclear reactor system 104 to the fuel cell control system 108. In response to the signal 107 transmitted from the monitoring system 102 the electrical transfer system 148 configured to transfer electrical energy from one or more energy sources 103 to a portion of the fuel cell system 110 may establish a readiness state in the fuel cell system 110 by transferring electrical energy from a portion of the nuclear reactor system 104 (e.g., electrical output of reactor thermohydraulic system) to a portion of the fuel cell system 110, such as a conditioning system 140 (e.g., temperature control system 144 or humidity control system 142) of the fuel cell system 110.

In a further embodiment, the electrical transfer system 148 configured to transfer electrical energy form one or more energy sources 103 to a portion of the fuel cell system 110 may include an electrical energy-to-thermal energy conversion system 150. For example, the electrical energy-to-thermal energy conversion system 150 may include, but not limited to, a resistive heating coil or a thermoelectric device configured to convert a portion of the electrical energy produced by the reactor thermohydraulic system to thermal energy. For instance, in response to the signal 107 transmitted by the monitoring system 102, the electrical-to-thermal conversion system 150 of the fuel cell control system 108 may establish a readiness state in the fuel cell system 110 by converting electrical energy from the electrical output of a thermohydraulic system to thermal energy using a resistive heating coil and transferring that thermal energy to a portion of the fuel cell system 110.

It will be recognized by those skilled in the art that electrical energy may be used to supplement the heating of a given fuel cell system in instances where the employed fuel cells of the fuel cell system have an optimal operating temperature above the waste heat temperature of the associated nuclear reactor system 104. For example, in a molten carbonate fuel cell (MCFC) system associated with a light water reactor having a heat rejection temperature of 80° C., additional energy must be supplied to the MCFC system in order to reach the system's optimal operating temperature (approximately 600 to 700° C.). It is contemplated that electrical energy may be transferred from an electrical output of a thermohydraulic system of the associated nuclear reactor system 104 to a portion of the MCFC system in order to provide supplemental energy to the MCFC system so that the MCFC system's optimal operating temperature may be achieved and maintained. It should be recognized that the preceding description is not a limitation but merely an illustration as a variety of fuel cell types and nuclear reactor types may be implemented in the context of the present of invention.

Figure 1I:
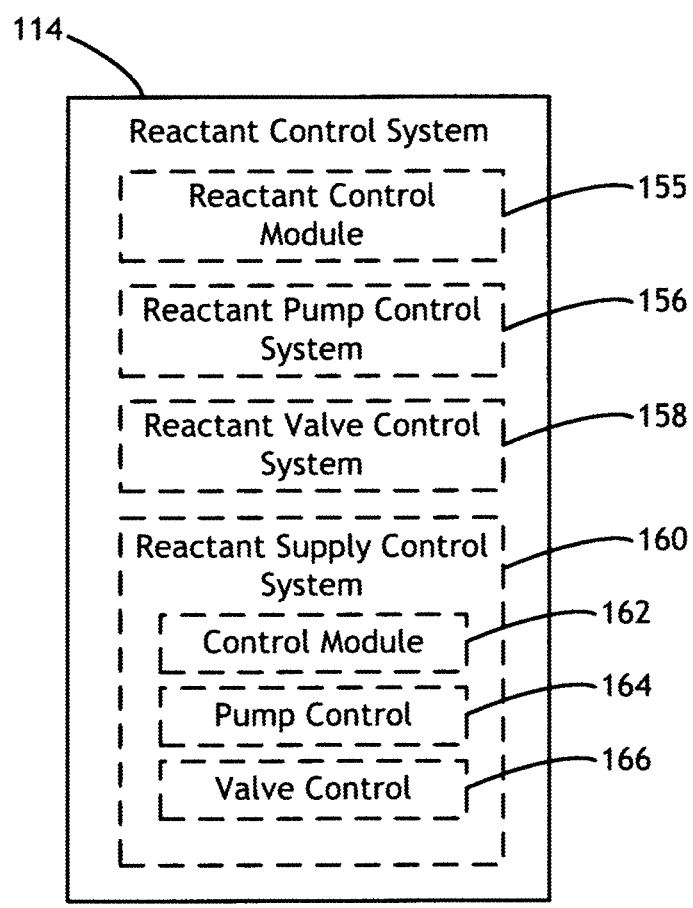
FIG. 1I is a block diagram illustrating a reactant control system suitable for establishing or maintaining a readiness state in a fuel cell system.

Referring now to FIG. 1I, the fuel cell control system 108 may include a reactant control system 114 configured to adjust one or more conditions of one or more of the reactant gases of the fuel cell system 110. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the fuel cell control system 108 using a reactant control system 114 configured to adjust a condition (e.g., mass flow rate or pressure) of one or more of the reactant gases (e.g., fuel or oxidant) of the fuel cell system 110 may establish a readiness state in the fuel cell system 110.

In a further embodiment, the reactant control system 114 may include, but is not limited to, a reactant pump control system 156 or a reactant valve control system 158. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, a reactant pump control system 156 of the fuel cell control system 108 may establish a readiness state in the fuel cell system by adjusting a condition (e.g., mass flow rate or pressure) of one or more of the reactant gases (e.g., fuel or oxidant) of the fuel cell system 110. For instance, in response to a signal 107 transmitted from the monitoring system 102, a reactant pump control system 156 of the reactant control system 114 of the fuel cell control system 108 may adjust (e.g., increase or decrease) the pumping rate of the reactant pumps of the fuel cell system 110. In another instance, in response to a signal 107 transmitted from the monitoring system 102, a reactant pump control system 156 of the reactant control system 114 of the fuel cell control system 108 may activate or deactivate one or more of the reactant pumps of the fuel cell system 110.

By way of another example, in response to the signal 107 transmitted by the monitoring system 102, a reactant valve control system 158 of the fuel cell control system 108 may establish a readiness state in the fuel cell system 110 by adjusting a condition (e.g., mass flow rate or pressure) of one or more of the reactant gases (e.g., fuel or oxidant) of the fuel cell system 110. For instance, in response to a signal 107 transmitted by the monitoring system 102, a reactant valve control system 158 of the reactant control system 114 of the fuel cell control system 108 may adjust the flow rate of one or more of the reactant gases by controlling one or more reactant valves of the fuel cell control system 110.

It will be recognized by those skilled in the art that reactant pump control system 156 and the reactant valve control system 158 may be used independently or in conjunction with one another to adjust the flow rate or pressure of the fuel gas or oxidant gas of the fuel cell system 110. In addition, it should be recognized that by adjusting the pressure or flow rate of the reactant gases a fuel cell control system 108 may establish a readiness state within the readiness parameters. For example, the voltage and current output levels of a given fuel cell system 110 may be adjusted by increasing or decreasing the reactant pressure in one or more fuel cells of the fuel cell system 110. By way of another example, the temperature of one or more fuel cells may be adjusted by changing the flow rate of the reactant gases. For instance, given a reactant gas held at ambient temperatures, the fuel cell control system 108 may decrease the temperature of a fuel cell membrane of one or more fuel cells at elevated temperatures by increasing the flow rate of the reactant gases being fed into the fuel cell. By way of an additional example, the humidity level of one or more fuel cells may be adjusted by changing the flow rate of the reactant gases. For instance, given a reactant having a first humidity level, the fuel cell control system 108 may decrease or increase the humidity level in a fuel cell membrane by increasing or decreasing the flow rate of the reactant gas being fed into the fuel cell. The preceding description should not be interpreted as a limitation but rather an illustration as it is contemplated that a number of other implementations of the present invention may be applicable in related contexts.

In another embodiment, the reactant control system 114 of the fuel cell control system 108 may be used to pre-load a reactant into one or more fuel cells of the fuel cell system 110. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, a reactant control system 114 of the fuel cell control system 108 may establish a readiness state in the fuel cell system by pre-loading a reactant into the fuel cell system 110. For instance, a monitoring system 102 may monitor a heightened temperature level in the core of the nuclear reactor system 104. In response, to that temperature level measurement, the reactant control system 114 may pre-load fuel into the fuel cells of the fuel cell system 110. By pre-loading fuel into the fuel cell system 110 the response time required for the fuel cell system 110 to respond to a nuclear reactor malfunction may be shortened.

In another embodiment, the reactant control system 114 of the fuel cell control system 108 may be used to unload a reactant from one or more fuel cells of the fuel cell system 110. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, a reactant control system 114 of the fuel cell control system 108 may establish a readiness state in the fuel cell system by unloading a reactant from the fuel cell system 110. For instance, a monitoring system 102 may monitor a lowered temperature level in the core of the nuclear reactor system 104. The response time required for a given fuel cell system at lower nuclear reactor core temperatures is smaller than the response time required for the fuel cell system at higher temperature. In response to a lowered nuclear reactor core temperature level measurement, the reactant control system 114 may unload fuel from the fuel cells of the fuel cell system 110.

In another embodiment, the reactant control system 114 of the fuel cell control system 108 may include a reactant supply control system 160 configured to adjust one or more supply conditions of one or more of the reactant gases of the fuel cell system 110. For example, a reactant supply control system 160 may include a reactant supply control system configured to control the number of reactant supply tanks supplying reactant gas to the fuel cell system. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the reactant supply control system 160 of the fuel cell control system 108 may establish a readiness state in the fuel cell system 110 by increasing or decreasing the number of reactant reservoir tanks supplying reactant gas to the fuel cells of the fuel cell system.

It is further contemplated that the reactant control system 114 may include a reactant control module 155 suitable for controlling the subsystems of the reactant control system (e.g., reactant pump control system 156, reactant valve control system 158 or reactant supply control system 160) in response to a signal transmitted from a fuel cell control module 109 or the monitoring system 102. The reactant control module 155 may include a computer data processing system equipped with signal processing and transmission hardware and software configured to receive a signal transmitted by the fuel cell control module 109 or the monitoring system 102.

It is also contemplated that the reactant supply control system 160 may include pump 164 and valve 166 control subsystems that are controlled by a reactant supply control module 162 configured to respond to a signal transmitted from the reactant control module 155, the fuel cell control module 109, or the monitoring system 102. The reactant supply control module 162 may include a computer data processing system equipped with signal processing and transmission hardware and software configured to receive a signal transmitted by the reactant control module 155, the fuel cell control module 109 or the monitoring system 102.

Figure 1J:
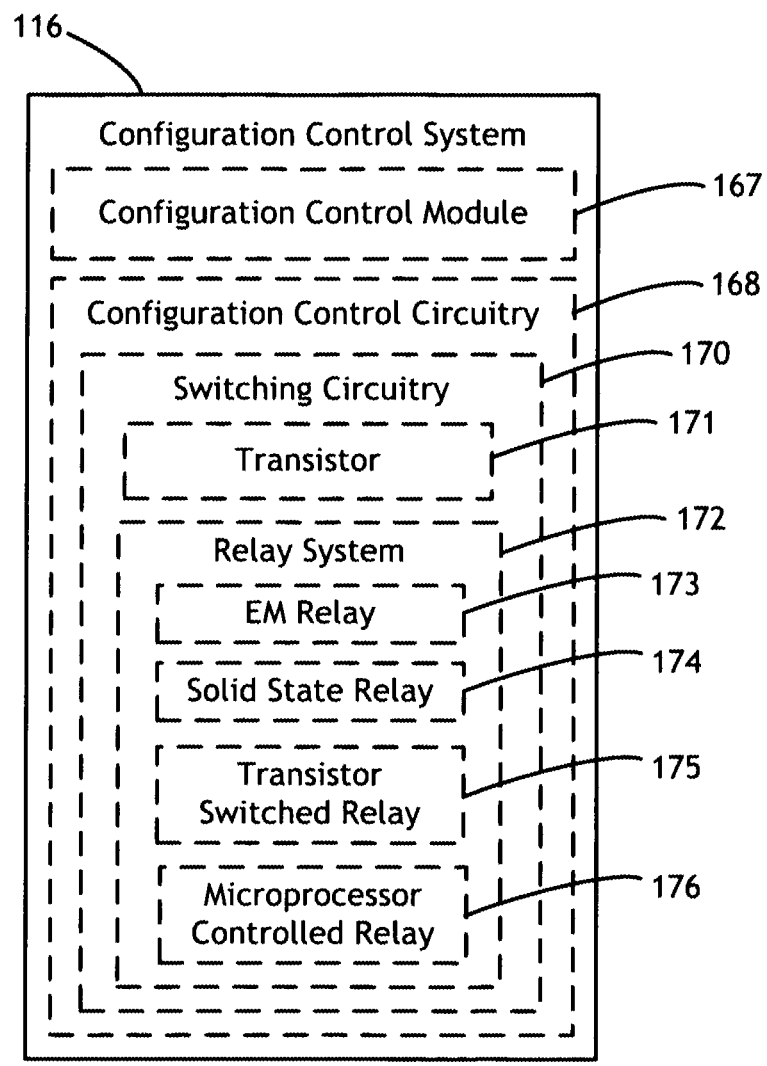
FIG. 1J is a block diagram illustrating a configuration control system suitable for establishing or maintaining a readiness state in a fuel cell system.

Referring now to FIG. 1J, the fuel cell control system 108 may include a configuration control system 116 configured to adjust (i.e., reconfigure) an electrical coupling configuration of two or more of the fuel cells of the fuel cell system 110. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the configuration control system 116 of the fuel cell control system 108 may establish a readiness state in the fuel cell system 110 by adjusting the electrical coupling configuration (e.g., adjusting the electrical circuit arrangement) of two or more of the fuel cells of the fuel cell system 110. For example, the configuration control system may be used to switch the electrical configuration of the fuel cell system 110 from a first configuration to a second configuration in order to adjust the electrical output characteristics (e.g., output current level or voltage level) of the fuel cell control system 110.

In a further embodiment, the configuration control system 116 may include configuration control circuitry 168. For example, the configuration control circuitry may include, but is not limited to, switching circuitry 170. For example, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the configuration control system 116 of the fuel cell control system 108 may establish a readiness state in the fuel cell system 110 by adjusting the electrical coupling configuration of two or more of the fuel cells of the fuel cell system 110 using switching circuitry 170.

Further, the switching circuitry 170 may include, but is not limited to, one or more transistors 171 (e.g., NPN transistor or PNP transistor) or one or more relay systems. For example, the relay system 172 may include, but is not limited to, an electromagnetic relay system 173 (e.g., a solenoid based relay system), a solid state relay system 174, a transistor switched electromagnetic relay system 175, or a microprocessor controlled relay system 176. For instance, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the configuration control system 116 of the fuel cell control system 108 may establish a readiness state in the fuel cell system 110 by adjusting the electrical coupling configuration of two or more of the fuel cells of the fuel cell system 110 using a transistor switched relay system 175.

It is further contemplated that the configuration control system 116 may include a configuration control module 167 suitable for controlling the configuration circuitry 168 in response to a signal transmitted from a fuel cell control module 109 or directly from the monitoring system 102. The configuration control module 167 may include a computer data processing system equipped with signal processing and transmission hardware and software configured to receive a signal transmitted by the fuel cell control module 109 or the monitoring system 102.

By way of an additional example, the microprocessor controlled relay system, may include, but is not limited to a microprocessor controlled relay system programmed to respond to one or more conditions 174 (e.g., a signal transmitted from fuel cell control module 109 or a signal transmitted directly from the monitoring system 102). For instance, a monitoring system 102 may monitor one or more characteristics of the nuclear reactor system 104. Then, the monitoring system 102 may transmit a signal indicative of the one or more monitored characteristics of the nuclear reactor system 104 to the fuel cell control system 108. In response to the signal 107 transmitted from the monitoring system 102, the configuration control system 116 of the fuel cell control system 108 may establish a readiness state in the fuel cell system 110 by adjusting the electrical coupling configuration of two or more of the fuel cells of the fuel cell system 110 using a microprocessor controlled relay system programmed to respond to a signal transmitted from the configuration control module 167, fuel cell control module 109, or the monitoring system 102.

By way of another example, the switching circuitry 170 may adjust the electrical coupling configuration of two or more of the fuel cells of the fuel cell system 110 by switching a parallel configuration of two or more fuel cells (or fuel cell stacks or fuel cell modules) to a series configuration. Conversely, the switching circuitry 170 may adjust the electrical coupling configuration of two or more of the fuel cells of the fuel cell system 110 by switching a series configuration of two or more fuel cells (or fuel cell stacks or fuel cell modules) to a parallel configuration. It should be appreciated that the switching circuitry 170 may include a number of switching circuitry components which can be controlled independently such that a portion of the switching circuitry components can used to adjust the overall fuel cell system 110 electrical coupling configuration by adjusting the electrical configuration of fuel cells (or fuel cell stacks or fuel cell modules) on an individual basis. In addition, the configuration control circuitry 168 may adjust the electrical configuration of the fuel cell system 110 by adjusting the quantity of fuel cells operating within the fuel cell system 110. For example, the configuration circuitry may be used to couple additional fuel cells (or fuel cell stacks or fuel cell modules) to the fuel cell system 110. Conversely, the configuration circuitry 168 may be used to disconnect fuel cells (or fuel cell stacks or fuel cell modules) from the fuel cell system 110.

Figure 1K:
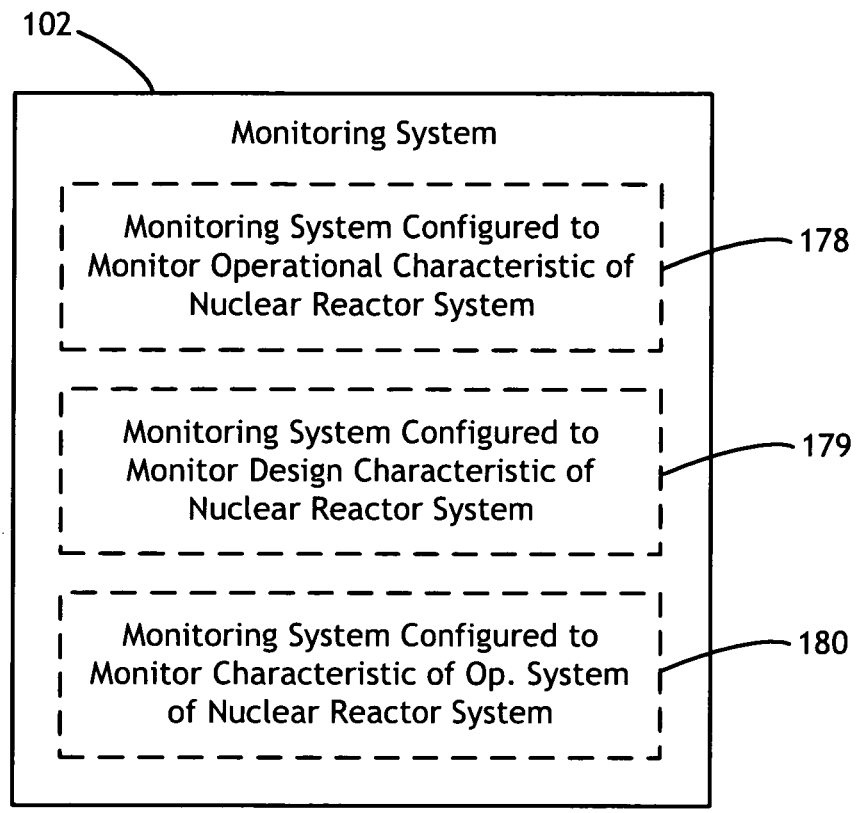
FIG. 1K is a block diagram illustrating types of monitoring systems suitable for monitoring a characteristic of a nuclear reactor system.

Referring now to FIG. 1K, the one or characteristics of the nuclear reactor system 104 monitored by the monitoring system may include, but are not limited to, operational characteristics, design characteristics, or nuclear reactor operation system characteristics. For example, the monitoring system 102 may include a monitoring system 178 configured to monitor an operational characteristic of the nuclear reactor system 104. For instance, a monitoring system 178 configured to monitor an operational characteristic of the nuclear reactor system may monitor one or more operational characteristics of the nuclear reactor system 104. Then, the monitoring system 178 configured to monitor an operational characteristic may transmit a signal indicative of the monitored operational characteristic of the nuclear reactor system 104 to the fuel cell control system 108. In response to the signal 107 transmitted from the monitoring system 178 configured to monitor an operational characteristic, the fuel cell control system 108 may establish a readiness state in the fuel cell system 110, where the readiness state is within a set of readiness parameters defined by the operational characteristic of the nuclear reactor system 104.

In a further embodiment, the monitoring system 178 configured to monitor an operation characteristic of the nuclear reactor system 104 may monitor one or more characteristics of the nuclear reactor core. For example, an operational characteristic of the nuclear reactor core may include, but is not limited to, thermal characteristics, such as core temperature or the rate of change of the core temperature (e.g., local or average). In another example, the operational characteristic of the nuclear reactor core may include, but is not limited to, the power level of the nuclear reactor core or the reactivity of the nuclear reactor core. Additionally, the operational characteristic of the nuclear reactor core may include, but is not limited to, the pressure in the nuclear reactor core or the rate of change of the pressure in the nuclear reactor core. In a further example, the operational characteristic of the nuclear reactor core may include, but is not limited to, the void fraction in the nuclear reactor. For instance, the monitoring system 178 configured to monitor an operation characteristic of the nuclear reactor system 104 may monitor the void fraction of the nuclear reactor by measuring the coolant flow through the nuclear reactor core. In another instance, the monitoring system 178 configured to monitor an operation characteristic of the nuclear reactor system 104 may monitor the void fraction of the nuclear reactor by measuring a pressure drop in the nuclear reactor core. In an additional instance, the monitoring system 178 configured to monitor an operation characteristic of the nuclear reactor system 104 may monitor the void fraction of the nuclear reactor by measuring the heat output of the nuclear reactor core. In another instance, the monitoring system 178 configured to monitor an operation characteristic of the nuclear reactor system 104 may monitor the void fraction of the nuclear reactor by measuring a pressure drop in the nuclear reactor core. In another instance, the monitoring system 178 configured to monitor an operation characteristic of the nuclear reactor system 104 may monitor the projected afterheat in the nuclear reactor core.

In another embodiment, the monitoring system 102 may include a monitoring system 179 configured to monitor a design characteristic of the nuclear reactor system 104. For instance, a monitoring system 179 configured to monitor a design characteristic of the nuclear reactor system may monitor one or more design characteristics of the nuclear reactor system 104. Then, the monitoring system 179 configured to monitor a design characteristic may transmit a signal indicative of the monitored design characteristic of the nuclear reactor system 104 to the fuel cell control system 108. In response to the signal 107 transmitted from the monitoring system 179 configured to monitor a design characteristic, the fuel cell control system 108 may establish a readiness state in the fuel cell system 110, where the readiness state is within a set of readiness parameters defined by the design characteristic of the nuclear reactor system 104.

In a further embodiment, the monitoring system 179 configured to monitor a design characteristic of the nuclear reactor system 104 may monitor one or more characteristics of the nuclear reactor core. For example, a design characteristic of the nuclear reactor core may include, but is not limited to, the responsiveness of a safety system of the nuclear reactor system to a design basis accident. A design basis accident may include, but is not limited to, loss of off-site power, reactivity initiated events (e.g., rod withdrawal), loss of flow transients (e.g., pump malfunction), or loss of coolant (e.g., guillotine break or blowdown malfunction). Further, the monitoring system 179 configured to monitor a design characteristic of the nuclear reactor system 104 may monitor the safety system's ability to reestablish coolant flow in the event of a coolant flow loss or the time necessary for the safety system to shut down the nuclear reactor core.

By way of another example, a design characteristic of the nuclear reactor core may include, but is not limited to, the time required for a fuel element of the nuclear reactor system to reach a specified temperature upon loss of coolant flow. For instance, the monitoring system 179 configured to monitor a design characteristic of the nuclear reactor system 104 may monitor the time necessary for a portion of a fuel pin assembly to heat to a specified temperature in the event of fuel pump malfunction. Further, the monitoring system 179 configured to monitor a design characteristic of the nuclear reactor system 104 may monitor the time necessary for a a collection of fuel pin assemblies to heat to a specified temperature in the event of fuel pump malfunction.

In another embodiment, the monitoring system 102 may include a monitoring system 180 configured to monitor a characteristic of an operation system of the nuclear reactor system 104. For instance, a monitoring system 180 configured to monitor a characteristic of an operation system of the nuclear reactor system may monitor one or more characteristics of an operation system of the nuclear reactor system 104. Then, the monitoring system 180 configured to monitor a a characteristic of an operation system of the nuclear reactor system 104 may transmit a signal indicative of the monitored characteristic of an operation system of the nuclear reactor system 104 to the fuel cell control system 108. In response to the signal 107 transmitted from the monitoring system 180 configured to monitor a characteristic of an operation system of the nuclear reactor system 104, the fuel cell control system 108 may establish a readiness state in the fuel cell system 110, where the readiness state is within a set of readiness parameters defined by the characteristic of the operation system of the nuclear reactor system 104.

In a further embodiment, the monitoring system 180 configured to monitor a characteristic of an operation system of the nuclear reactor system 104 may monitor one or more characteristics of a control system of the nuclear reactor system, a coolant system of the nuclear reactor system, a shutdown system of the nuclear reactor system, a monitoring system of the nuclear reactor system, or a safety system of the nuclear reactor. Further, the monitoring system 180 configured to monitor a characteristic of an operation system of the nuclear reactor system 104 may be responsive to a signal transmitted by an operation system of the nuclear reactor system 104. For instance, the monitoring system 180 configured to monitor a characteristic of an operation system of the nuclear reactor system 104 may receive a signal transmitted from the safety system of the nuclear reactor system 104. Then, in response to the signal transmitted from the safety system of the nuclear reactor system 104 the monitoring system 102 may in turn transmit an instruction signal 107 to the fuel cell control system 108.

Figure 1L:
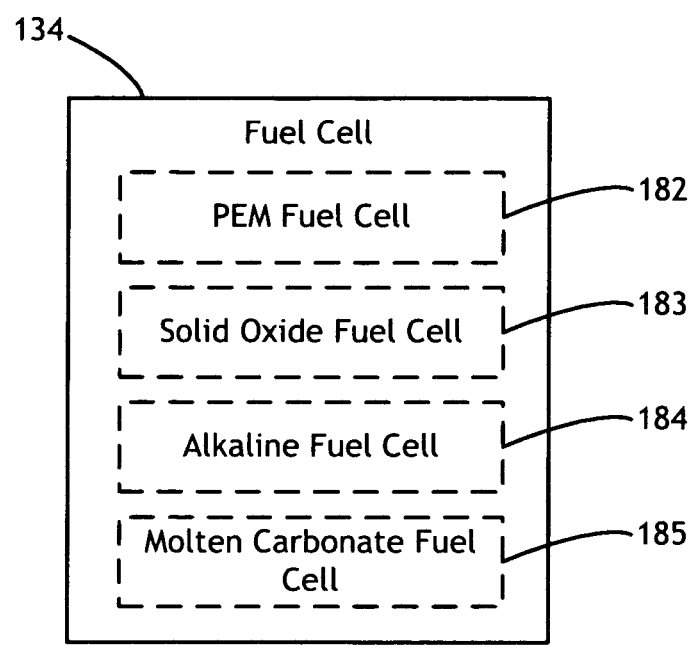
FIG. 1L is a block diagram illustrating types of fuel cells suitable for implementation in the present invention.

Referring now to FIG. 1L, one or more of the fuel cells 134 of the fuel cell system 110, may include, but are not limited to, a polymer electrolyte fuel cell 182, a solid oxide fuel cell 183, an alkaline fuel cell 184, or a molten carbonate fuel cell 185. For example, one or more monitoring systems 102 may monitor one or more characteristics of a nuclear reactor system 104. Then, the monitoring system may transmit a signal indicative of the one or more monitored characteristics of the nuclear reactor system 104 to a fuel cell control system 108. In response to the transmitted signal from the monitoring system, a fuel cell control system 108 may establish a readiness state in a fuel cell system 110 having one or more polymer electrolyte fuel cells 182. By way of another example, one or more monitoring systems 102 may monitor one or more characteristics of a nuclear reactor system 104. Then, the monitoring system may transmit a signal indicative of the one or more monitored characteristics of the nuclear reactor system 104 to a fuel cell control system 108. In response to the transmitted signal from the monitoring system, a fuel cell control system 108 may establish a readiness state in a fuel cell system 110 having one or more solid oxide fuel cells 183.

Figure 1M:
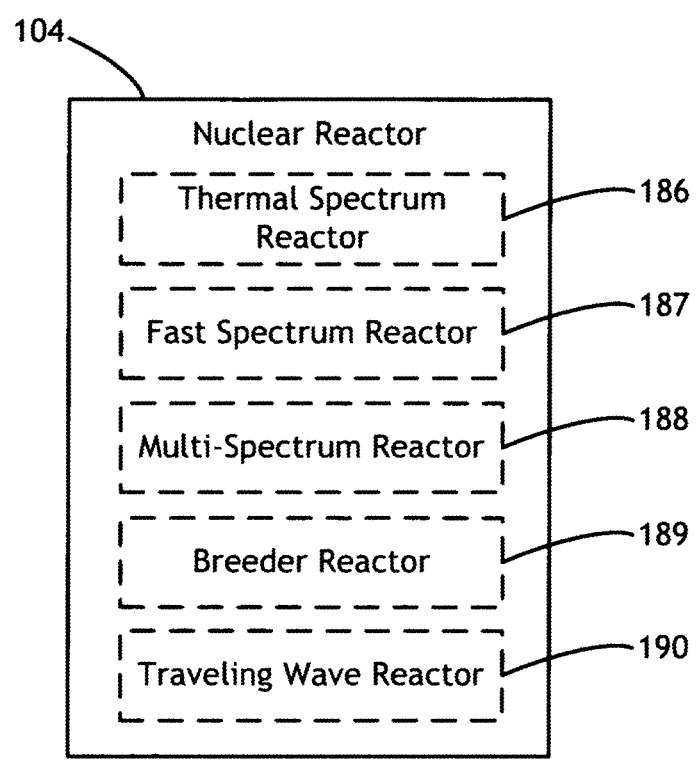
FIG. 1M is a block diagram illustrating types of nuclear reactors suitable for implementation in the present invention.

Referring now to FIG. 1M, the nuclear reactor of the nuclear reactor system 104, may include, but is not limited to, a thermal spectrum nuclear reactor 186, a fast spectrum nuclear reactor 187, a multi-spectrum nuclear reactor 18S, a breeder nuclear reactor 189, or a traveling wave reactor 190. For example, one or more monitoring systems 102 may monitor one or more characteristics of a thermal spectrum nuclear reactor system 186. Then, the monitoring system may transmit a signal indicative of the one or more monitored characteristics of the thermal spectrum nuclear reactor system 186 to a fuel cell control system 108. In response to the transmitted signal 107 from the monitoring system 102, a fuel cell control system 108 may establish a readiness state in the fuel cell system 110. By way of another example, one or more monitoring systems 102 may monitor one or more characteristics of a traveling wave nuclear reactor system 190. Then, the monitoring system may transmit a signal indicative of the one or more monitored characteristics of the traveling wave nuclear reactor system 190 to a fuel cell control system 108. In response to the transmitted signal 107 from the monitoring system 102, a fuel cell control system 108 may establish a readiness state in the fuel cell system 110.

Figure 1N:
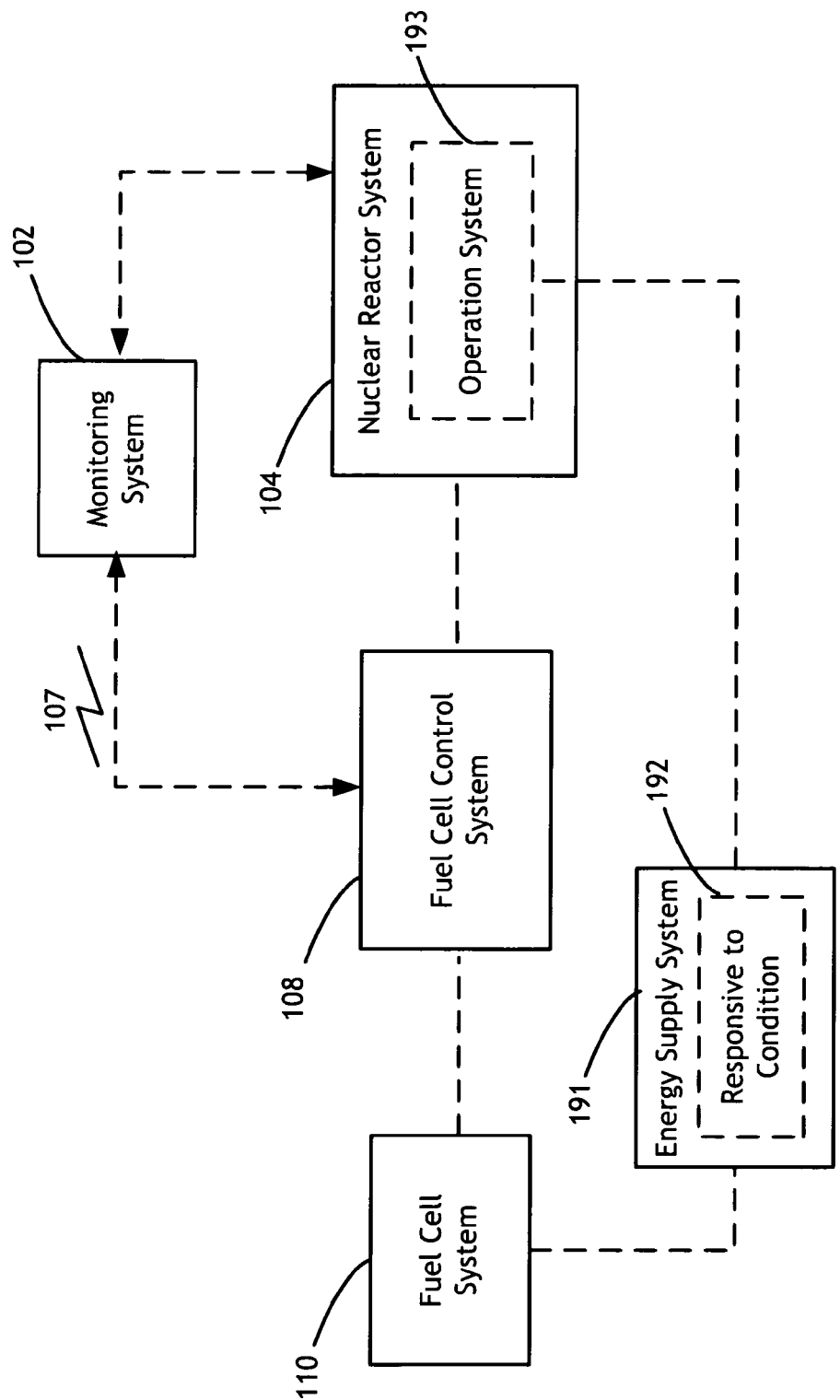
FIG. 1N is a block diagram illustrating an energy supply system suitable for supplying energy to an operation system of a nuclear reactor system.

Referring now to FIG. 1N, an energy supply system 191 may transfer electrical energy from the electrical output of the fuel cell system 110 to one or more operation systems of the nuclear reactor system 104. For example, the energy supply system 191 may transfer electrical energy from the electrical output of the fuel cell system 110 to a portion of a coolant system (e.g., coolant pump) of the nuclear reactor system. By way of another example, the energy supply system 191 may transfer electrical energy from the electrical output of the fuel cell system 110 to a portion of a shutdown system of the nuclear reactor system 104. It will be recognized by those skilled in the art that the electrical output of the fuel cell system 110 may be used to supplement or augment one or more operation systems of the nuclear reactor system 104 in the event of total or partial malfunction of the nuclear reactor system 104. The operation systems 193 driven or partially driven by the electrical energy transferred from the output of the fuel cell system 110 may include, but are not limited to, a control system, a monitoring system, a warning system, a shutdown system, or a coolant system (e.g., primary coolant system or secondary coolant system).

In a further embodiment, the energy supply system 191 may include an energy supply system 192 configured to supply electrical energy to an operation system 193 of the nuclear reactor system 104 in response to a condition. For example, the condition may include, but is not limited to, a signal transmitted by the fuel cell control system 108, a signal from an operation system 193 of the nuclear reactor system 104, a signal from an operator of the nuclear reactor system 104, or a shutdown event of the nuclear reactor system 104. For instance, in response to a signal transmitted from the fuel cell control system 108, the energy supply system 191 may initiate transfer of electrical energy from the output of the fuel cell system 110 to an operation system of the nuclear reactor system. In another instance, in response to a signal transmitted from a safety system of the nuclear reactor system 104, the energy supply system 191 may initiate transfer of electrical energy from the output of the fuel cell system 110 to an operation system of the nuclear reactor system. I should be appreciated by those skilled in the art that the energy supply system 192 may include condition response circuitry configured to initiate transfer of electrical energy from the fuel cell system 110 to an operation system of the nuclear reactor system in response to a condition. For example, the condition response circuitry may include, but is not limited to, one or more transistors (e.g., NPN transistor or PNP transistor) or one or more relay systems. Further, the relay system may include, but is not limited to, an electromagnetic relay system (e.g., a solenoid based relay system), a solid state relay system, a transistor switched electromagnetic relay system, or a microprocessor controlled relay system.

Referring now to FIG. 1O, an electrical output of the fuel cell system 110 may be modified using an output modification system 194. For example, the output modification system 194 may include, but is not limited to, power management circuitry 195. For instance, the power management circuitry 195 used to modify the electrical output of the fuel cell system 110 may include, but is not limited to, a power converter, voltage converter (e.g., a DC-DC converter or a DC-AC inverter), or voltage regulation circuitry. Further, the voltage regulation circuitry used to modify the electrical output of the fuel cell system 110 may include, but is not limited to, a Zener diode, a series voltage regulator, a shunt regulator, a fixed voltage regulator or an adjustable voltage regulator.

In a further embodiment, the output modification system 194 may include, but is not limited to, control circuitry 196. For instance, the control circuitry 194 may include control circuitry configured to modify the electrical output of the fuel cell system 110 by adjusting the electrical output of the fuel cell system. For example, the control circuitry may be configured to simulate an A.C. electrical output of the fuel cell system 110 by sequentially staging the D.C. outputs of at least two fuel cells of the fuel cell system 110. For instance, the control circuitry may include a plurality of solid state switching devices suitable for sequentially staging the D.C. outputs of two or more fuel cells of the fuel cell system in order to simulate an A.C. signal from the electrical output of the fuel cell system 110.

Figure 2:
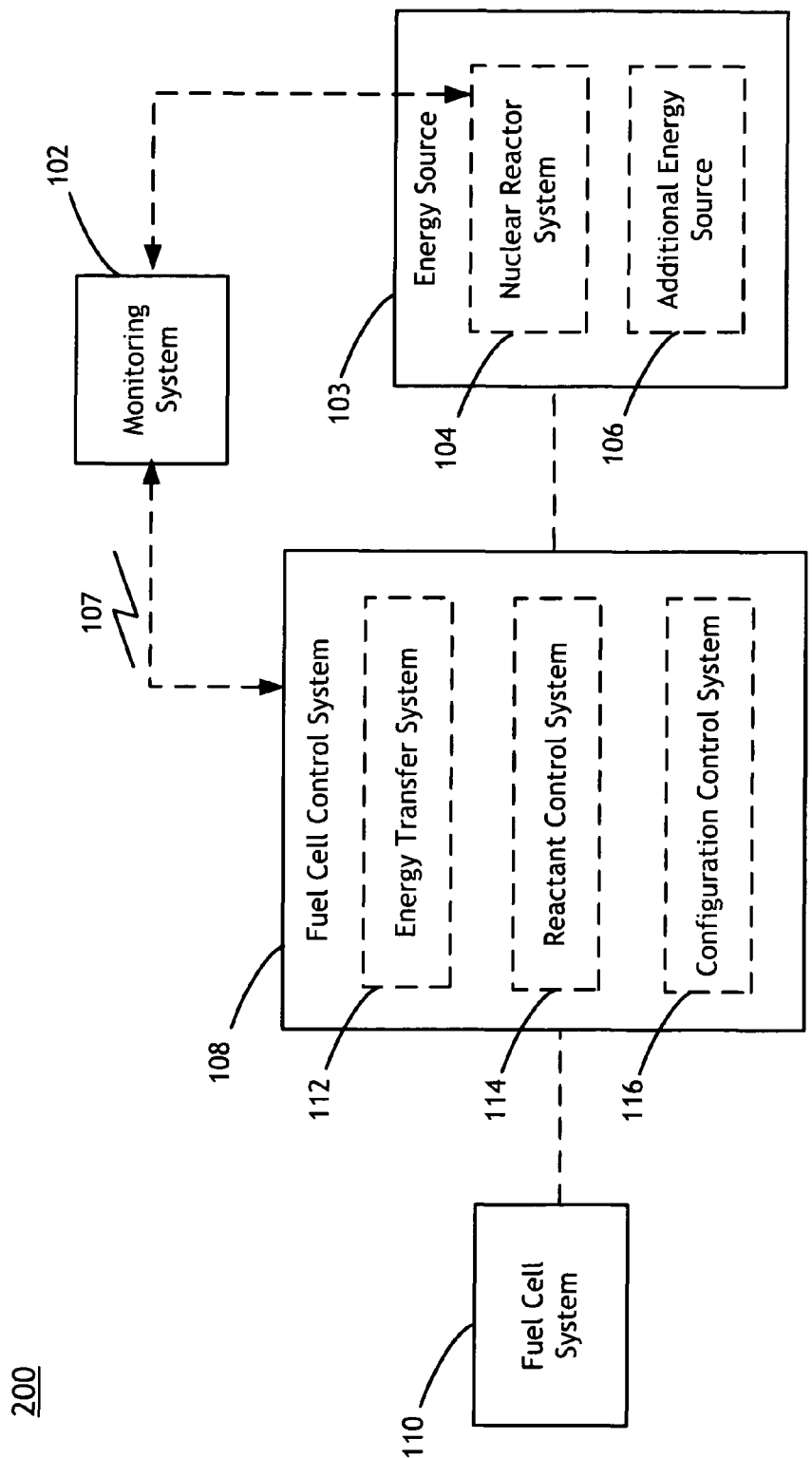
FIG. 2 is a block diagram illustrating a system for maintaining a readiness state in a fuel cell system.

Referring generally to FIG. 2, a system 200 for maintaining a readiness state in a fuel cell backup system of a nuclear reactor system is described in accordance with the present disclosure. One or more monitoring systems 102 may monitor one or more characteristics of a nuclear reactor system 104. Then, the monitoring system 102 may transmit a signal indicative of the one or more monitored characteristics of the nuclear reactor system 104 to a fuel cell control system 108 configured to maintain a readiness state in a fuel cell system 110. In response to the transmitted signal 107 from the monitoring system 102, the fuel cell control system 108 (e.g., a fuel cell control module 109, energy transfer system 112, reactant control system 114, or configuration control system 116) may maintain a readiness state (e.g., electrical output state, temperature state, humidity state, or pressure state) in the fuel cell system 110. For instance, the fuel cell control system 108 may transfer energy from an energy source 103 (e.g., portion of the nuclear reactor system 104 or an additional energy source 112) to a portion of the fuel cell system 110 in order to maintain a readiness state of the fuel cell system 110. An acceptable readiness state is defined by a set of readiness parameters which are a function of one or more of the monitored characteristics of the nuclear reactor system 104 measured by the monitoring system 102.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3:
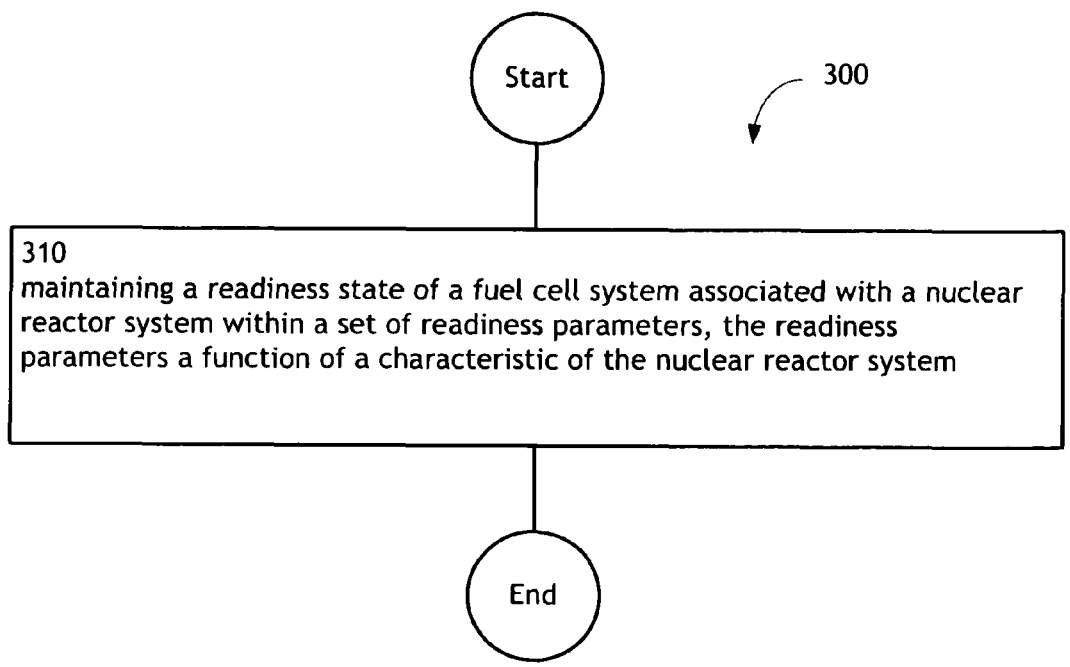
FIG. 3 is a high-level flowchart of a method for maintaining a readiness state in a fuel cell backup system of a nuclear reactor system.

FIG. 3 illustrates an operational flow 300 representing example operations related to maintaining a readiness state in a fuel cell backup system of a nuclear reactor system. In FIG. 3 and in following figures that include various examples of operational flows, discussion and explanation may be provided with respect to the above-described examples of FIGS. 1A through 2, and/or with respect to other examples and contexts. However, it should be understood that the operational flows may be executed in a number of other environments and contexts, and/or in modified versions of FIGS. 1A through 2. Also, although the various operational flows are presented in the sequence(s) illustrated, it should be understood that the various operations may be performed in other orders than those which are illustrated, or may be performed concurrently.

After a start operation, the operational flow 300 moves to a maintaining operation 310. The maintaining operation 310 depicts maintaining a readiness state of a fuel cell system associated with a nuclear reactor system within a set of readiness parameters, the readiness parameters a function of a characteristic of the nuclear reactor system. For example, as shown in FIGS. 1A through 2, a fuel cell control system 108 (e.g., energy transfer system 112, reactant control system 114, or configuration control system 116) may maintain a readiness state of a fuel cell system 110 within a set of readiness parameters, wherein the readiness parameters are a function of one or more characteristics of the nuclear reactor system 104. By way of another example, a fuel cell module 109 of a fuel cell control system 108 may transmit an instruction signal 113 to an energy transfer system 112 of the fuel cell control system 108 in order to maintain a readiness state of a fuel cell system 110 within a set of readiness parameters.

Figure 4A:
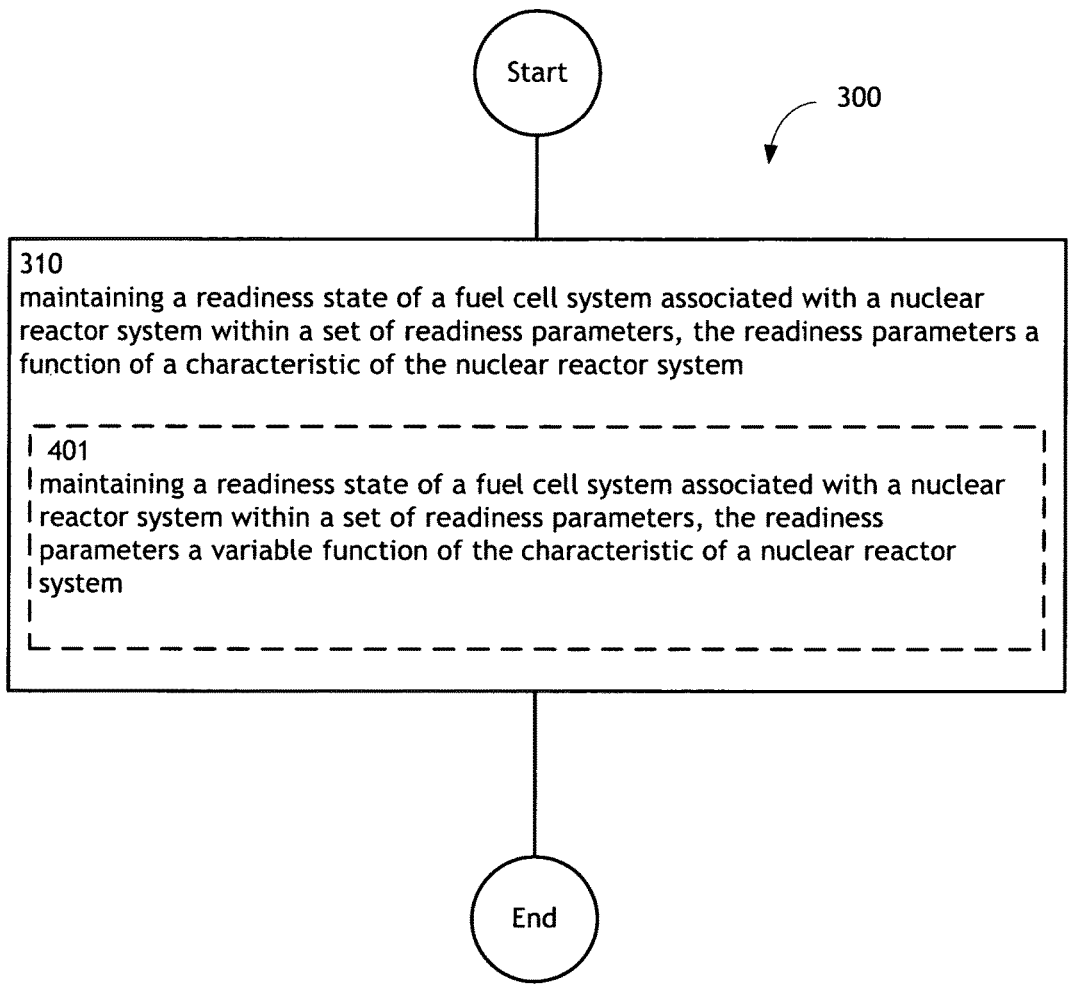

FIG. 4A illustrates alternative embodiments of the example operational flow 300 of FIG. 3. FIG. 4A illustrates example embodiments where the maintaining operation 310 may include at least one additional operation. Additional operations may include an operation 401.

The operation 401 illustrates maintaining a readiness state of a fuel cell system associated with a nuclear reactor system within a set of readiness parameters, the readiness parameters a variable function of the characteristic of a nuclear reactor system. For example, as shown in FIGS. 1A through 2, a fuel cell control system 108 may maintain a readiness state within a set of readiness parameters which are a variable function of a characteristic of the nuclear reactor system 104.

Figure 4B:
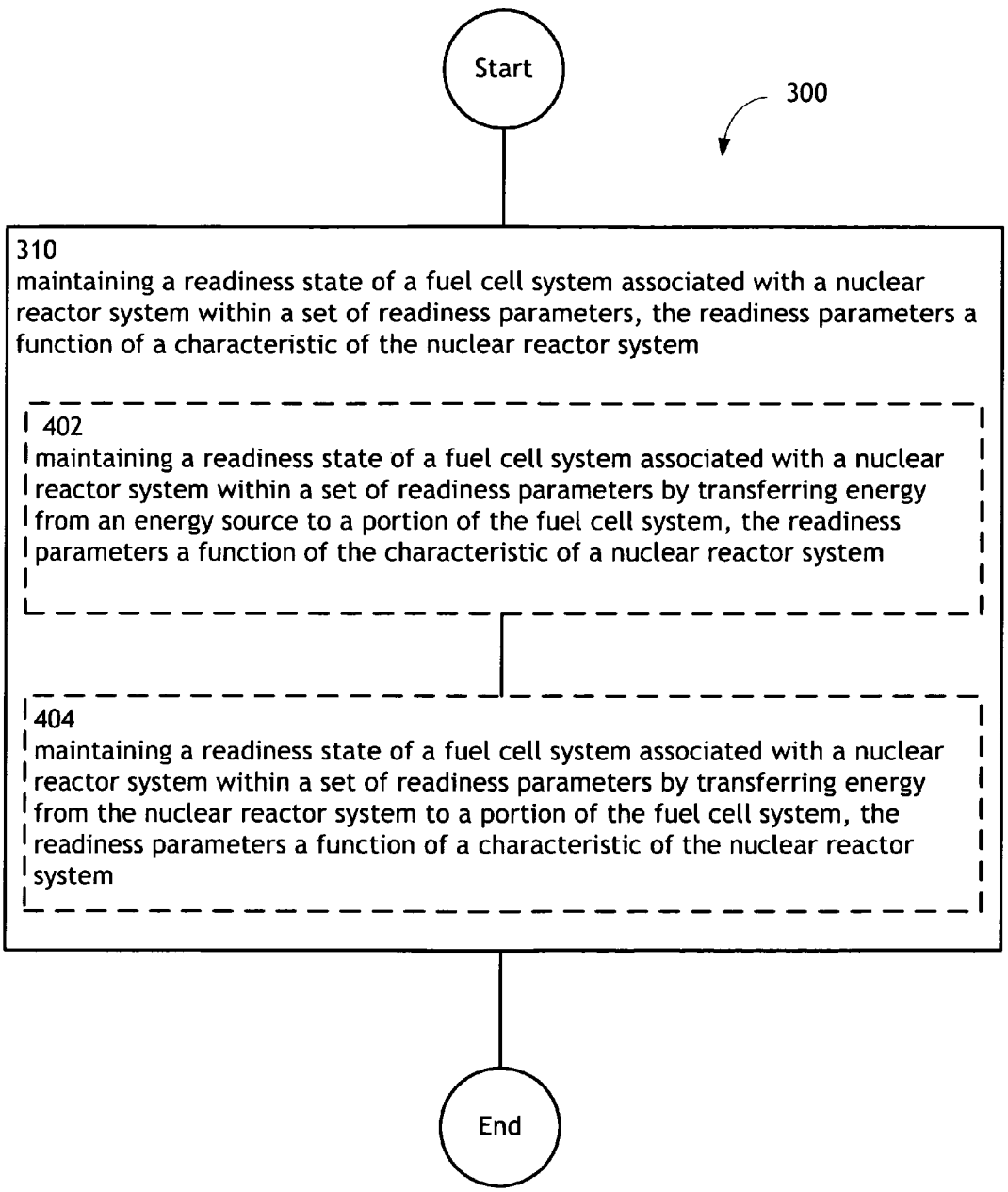

FIG. 4B illustrates alternative embodiments of the example operational flow 300 of FIG. 3. FIG. 4B illustrates example embodiments where the maintaining operation 310 may include at least one additional operation. Additional operations may include an operation 402, and/or an operation 404.

The operation 402 illustrates maintaining a readiness state of a fuel cell system associated with a nuclear reactor system within a set of readiness parameters by transferring energy from an energy source to a portion of the fuel cell system, the readiness parameters a function of the characteristic of a nuclear reactor system. For example, as shown in FIGS. 1A through 2, an energy transfer system 112 of a fuel cell control system 108 may maintain a readiness state within a set of readiness parameters by transferring energy (e.g., thermal or electrical) from an energy source 103 to a portion of the fuel cell system 110.

Further, the operation 404 illustrates maintaining a readiness state of a fuel cell system associated with a nuclear reactor system within a set of readiness parameters by transferring energy from the nuclear reactor system to a portion of the fuel cell system, the readiness parameters a function of a characteristic of the nuclear reactor system. For example, as shown in FIGS. 1A through 2, an energy transfer system 112 of a fuel cell control system 108 may maintain a readiness state within a set of readiness parameters by transferring energy (e.g., thermal or electrical) from a portion of the nuclear reactor system 104 to a portion of the fuel cell system 110.

Figure 5:
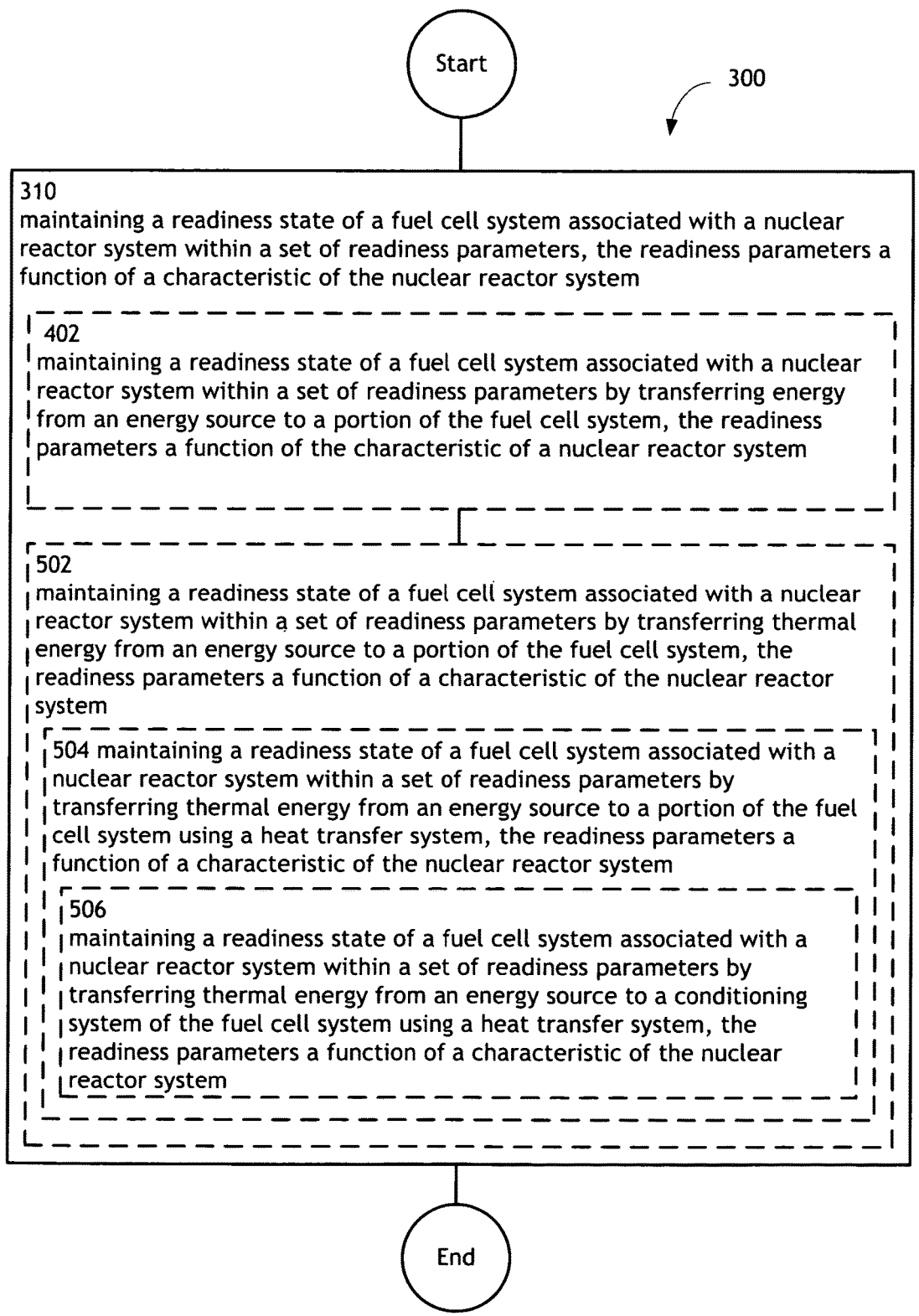

FIG. 5 illustrates alternative embodiments of the example operational flow 300 of FIG. 3. FIG. 5 illustrates example embodiments where the maintaining operation 310 may include at least one additional operation. Additional operations may include an operation 502, an operation 504, and/or an operation 506.

Further, the operation 502 illustrates maintaining a readiness state of a fuel cell system associated with a nuclear reactor system within a set of readiness parameters by transferring thermal energy from an energy source to a portion of the fuel cell system, the readiness parameters a function of a characteristic of the nuclear reactor system. For example, as shown in FIGS. 1A through 2, a energy transfer system 112 of a fuel cell control system 108 may maintain a readiness state within a set of readiness parameters by transferring thermal energy from an energy source 103 to a portion of the fuel cell system 110 (e.g., bipolar plates of one or more fuel cells).

Further, the operation 504 illustrates maintaining a readiness state of a fuel cell system associated with a nuclear reactor system within a set of readiness parameters by transferring thermal energy from an energy source to a portion of the fuel cell system using a heat transfer system, the readiness parameters a function of a characteristic of the nuclear reactor system. For example, as shown in FIGS. 1A through 2, a heat transfer system 146 of a fuel cell control system 108 may maintain a readiness state within a set of readiness parameters by transferring thermal energy from an energy source 103 to a portion of the fuel cell system 110 (e.g., condition system).

Further, the operation 506 illustrates maintaining a readiness state of a fuel cell system associated with a nuclear reactor system within a set of readiness parameters by transferring thermal energy from an energy source to a conditioning system of the fuel cell system using a heat transfer system, the readiness parameters a function of a characteristic of the nuclear reactor system. For example, as shown in FIGS. 1A through 2, a heat transfer system 146 of a fuel cell control system 108 may maintain a readiness state within a set of readiness parameters by transferring thermal energy from an energy source 103 to a humidity control system 142 of the fuel cell system 110.

Figure 6:
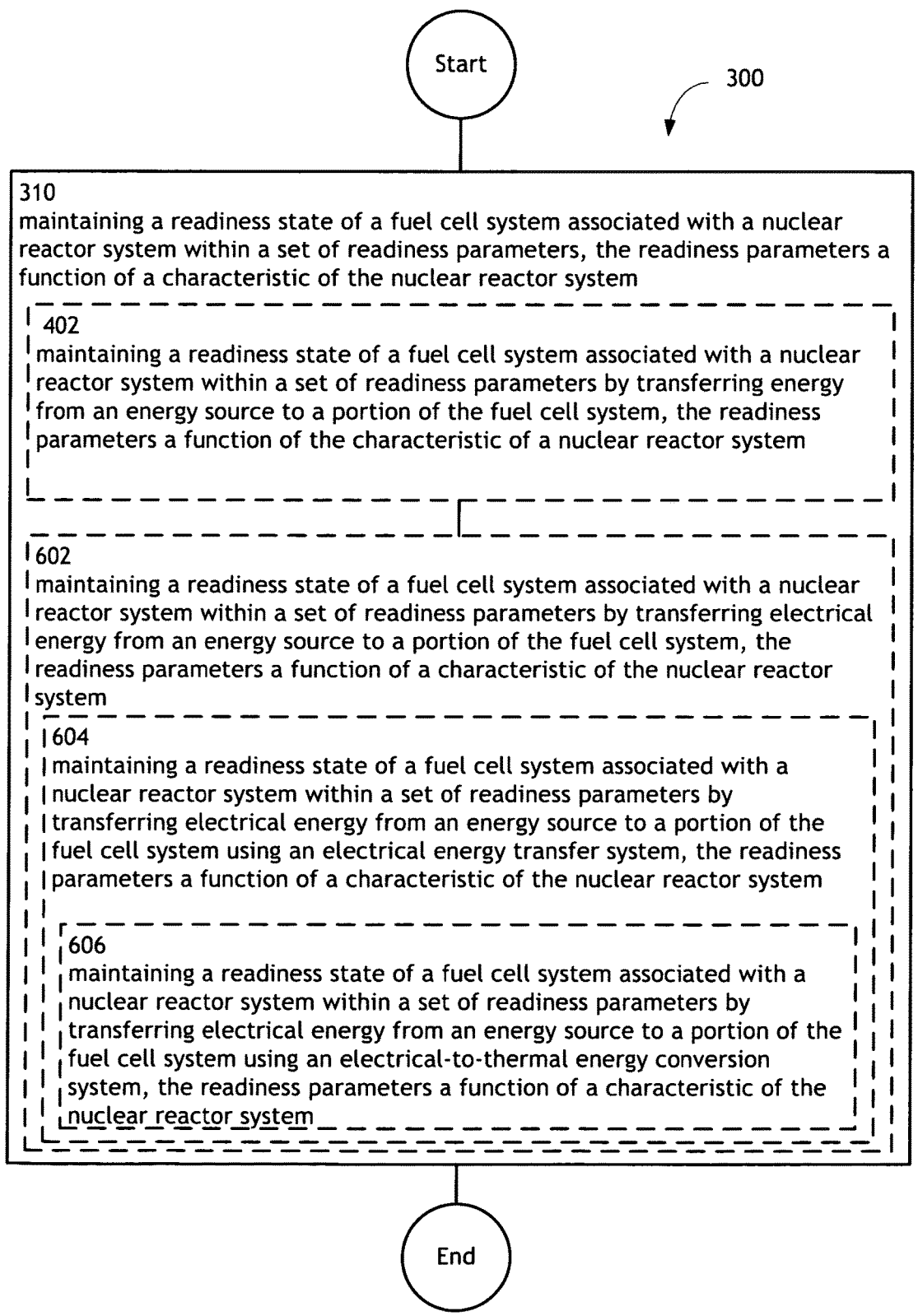

FIG. 6 illustrates alternative embodiments of the example operational flow 300 of FIG. 3. FIG. 6 illustrates example embodiments where the maintaining operation 310 may include at least one additional operation. Additional operations may include an operation 602, an operation 604, and/or an operation 606.

Further, the operation 602 illustrates maintaining a readiness state of a fuel cell system associated with a nuclear reactor system within a set of readiness parameters by transferring electrical energy from an energy source to a portion of the fuel cell system, the readiness parameters a function of a characteristic of the nuclear reactor system. For example, as shown in FIGS. 1A through 2, an energy transfer system 112 of a fuel cell control system 108 may maintain a readiness state within a set of readiness parameters by transferring electrical energy from an energy source 103 to a temperature control system 144 of the fuel cell system 110.

Further, the operation 604 illustrates maintaining a readiness state of a fuel cell system associated with a nuclear reactor system within a set of readiness parameters by transferring electrical energy from an energy source to a portion of the fuel cell system using an electrical energy transfer system, the readiness parameters a function of a characteristic of the nuclear reactor system. For example, as shown in FIGS. 1A through 2, an electrical energy transfer system 148 of a fuel cell control system 108 may maintain a readiness state within a set of readiness parameters by transferring electrical energy from an energy source 103 to a temperature control system 144 of the fuel cell system 110.

Further, the operation 606 illustrates maintaining a readiness state of a fuel cell system associated with a nuclear reactor system within a set of readiness parameters by transferring electrical energy from an energy source to a portion of the fuel cell system using an electrical-to-thermal energy conversion system, the readiness parameters a function of a characteristic of the nuclear reactor system. For example, as shown in FIGS. 1A through 2, an electrical-to-thermal conversion system 150 of a fuel cell control system 108 may maintain a readiness state within a set of readiness parameters by transferring electrical energy from an energy source 103 to a portion (e.g., one or more fuel cells) of the fuel cell system 110.

Figure 7:
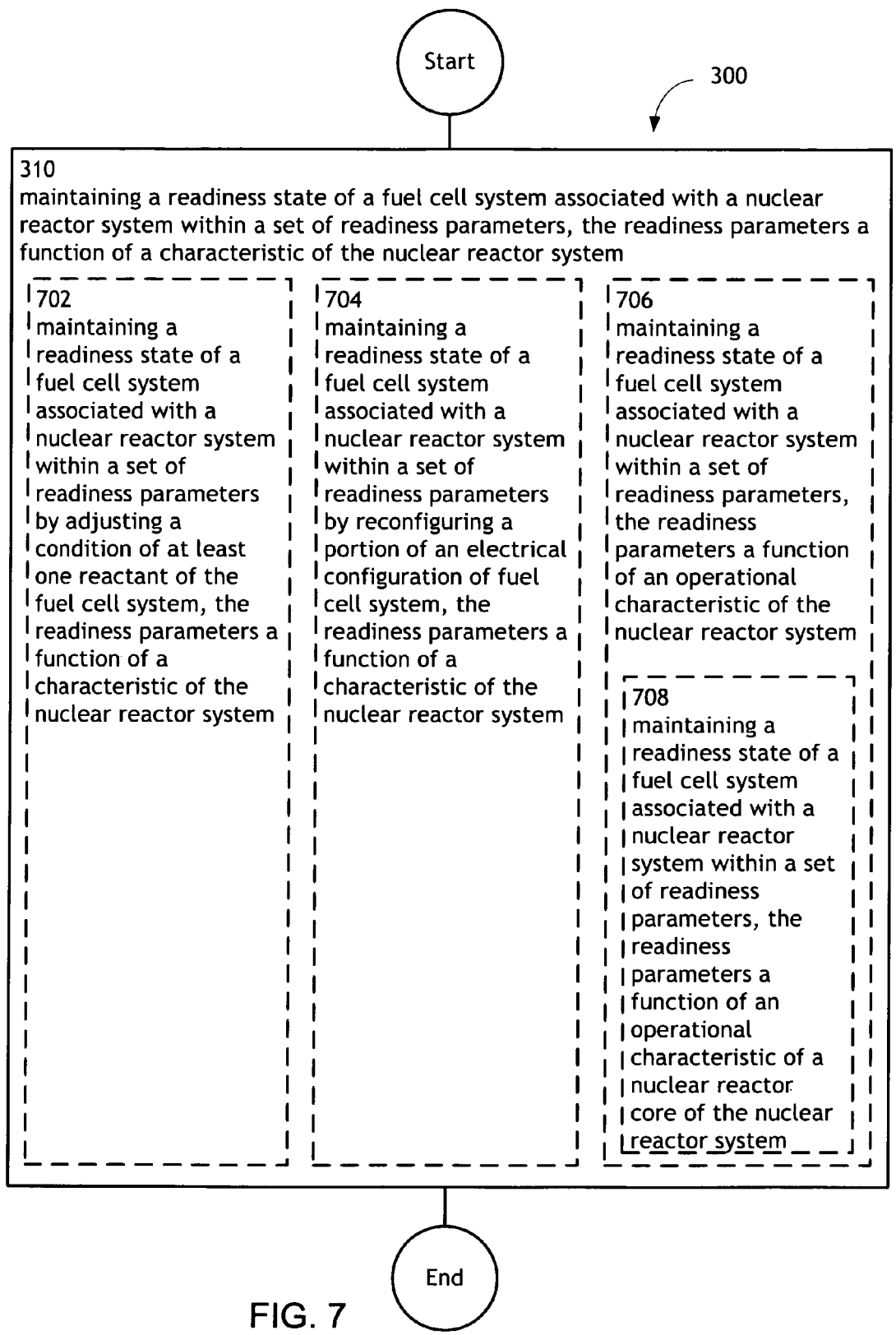

FIG. 7 illustrates alternative embodiments of the example operational flow 300 of FIG. 3. FIG. 7 illustrates example embodiments where the maintaining operation 310 may include at least one additional operation. Additional operations may include an operation 702, an operation 704, an operation 706, and/or an operation 708.

The operation 702 illustrates maintaining a readiness state of a fuel cell system associated with a nuclear reactor system within a set of readiness parameters by adjusting a condition of at least one reactant of the fuel cell system, the readiness parameters a function of a characteristic of the nuclear reactor system. For example, as shown in FIGS. 1A through 2, the reactant control system 114 of the fuel cell control system 108 may maintain a readiness state of a fuel cell system associated with a nuclear reactor system within a set of readiness parameters by adjusting a condition (e.g., pressure of reactant gas or flow rate of reactant gas) of at least one reactant of the fuel cell system. Further, the reactant pump control system 156 of the reactant control system 114 of the fuel cell control system 108 may maintain a readiness state of a fuel cell system 110 associated with a nuclear reactor system 104 within a set of readiness parameters by adjusting a condition of at least one reactant of the fuel cell system.

The operation 704 illustrates maintaining a readiness state of a fuel cell system associated with a nuclear reactor system within a set of readiness parameters by reconfiguring a portion of an electrical configuration of the fuel cell system, the readiness parameters a function of a characteristic of the nuclear reactor system. For example, as shown in FIGS. 1A through 2, the configuration control system 116 (e.g., switching circuitry) of the fuel cell control system 108 may maintain a readiness state of a fuel cell system 110 associated with a nuclear reactor system 104 within a set of readiness parameters by reconfiguring an electrical configuration (e.g., circuit arrangement) of the fuel cell system 110.

The operation 706 illustrates maintaining a readiness state of a fuel cell system associated with a nuclear reactor system within a set of readiness parameters, the readiness parameters a function of an operational characteristic of the nuclear reactor system. For example, as shown in FIGS. 1A through 2, the fuel cell control system 108 may maintain a readiness state of a fuel cell system 110 associated with a nuclear reactor system 104 within a set of readiness parameters, the readiness parameters a function of an operational characteristic of the nuclear reactor system (e.g., thermal characteristics).

Further, the operation 708 illustrates maintaining a readiness state of a fuel cell system associated with a nuclear reactor system within a set of readiness parameters, the readiness parameters a function of an operational characteristic of a nuclear reactor core of the nuclear reactor system. For example, as shown in FIGS. 1A through 2, the fuel cell control system 108 may maintain a readiness state of a fuel cell system 110 associated with a nuclear reactor system 104 within a set of readiness parameters, the readiness parameters a function of an operational characteristic of the nuclear reactor core (e.g., temperature, power level, pressure, or void fraction).

Figure 8:
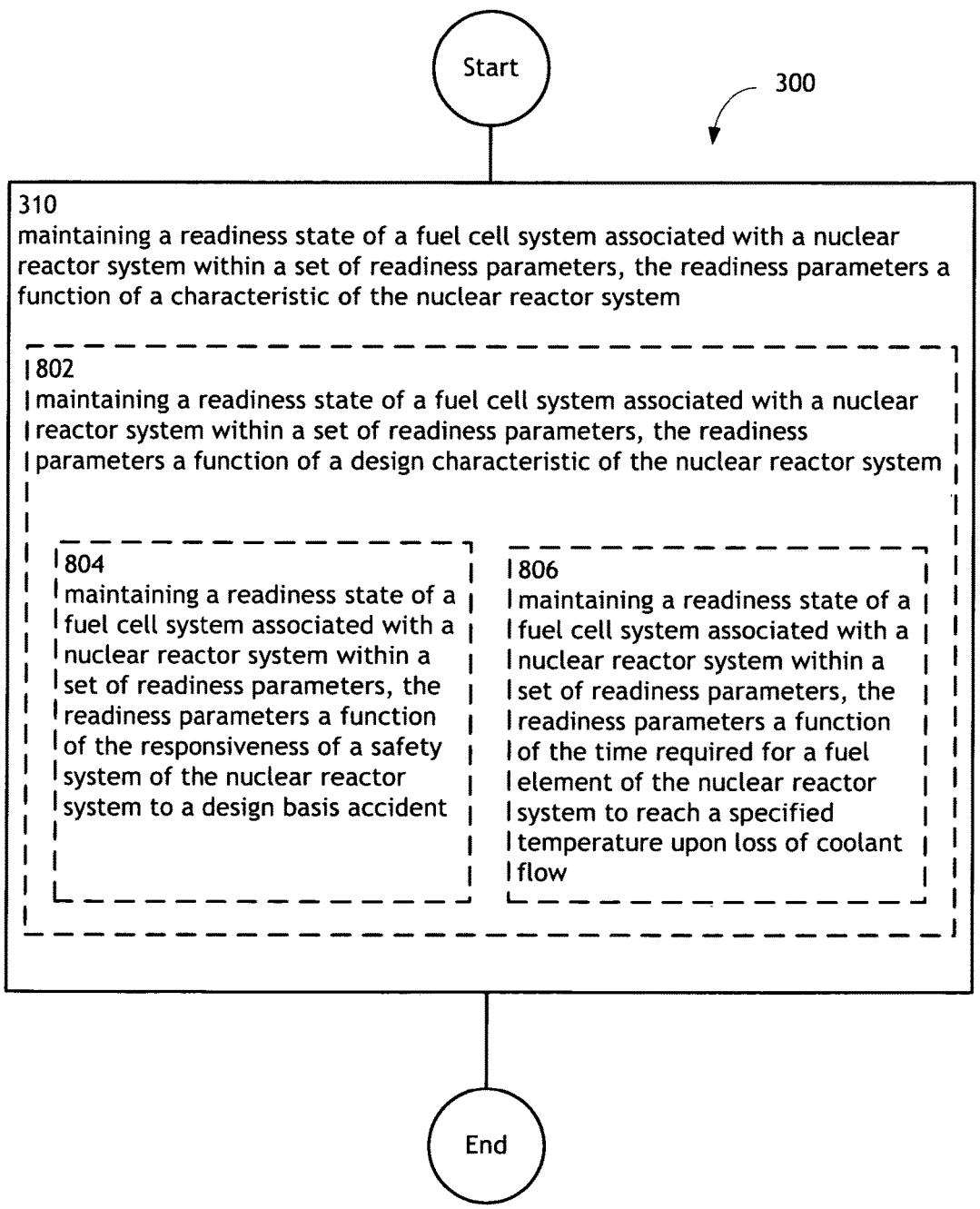

FIG. 8 illustrates alternative embodiments of the example operational flow 300 of FIG. 3. FIG. 8 illustrates example embodiments where the maintaining operation 310 may include at least one additional operation. Additional operations may include an operation 802, an operation 804, and/or an operation 806.

The operation 802 illustrates maintaining a readiness state of a fuel cell system associated with a nuclear reactor system within a set of readiness parameters, the readiness parameters a function of a design characteristic of the nuclear reactor system. For example, as shown in FIGS. 1A through 2, the fuel cell control system 108 may maintain a readiness state of a fuel cell system 110 associated with a nuclear reactor system 104 within a set of readiness parameters, the readiness parameters a function of a design characteristic of the nuclear reactor system.

Further, the operation 804 illustrates maintaining a readiness state of a fuel cell system associated with a nuclear reactor system within a set of readiness parameters, the readiness parameters a function of the responsiveness of a safety system of the nuclear reactor system to a design basis accident. For example, as shown in FIGS. 1A through 2, the fuel cell control system 108 may maintain a readiness state of a fuel cell system 110 associated with a nuclear reactor system 104 within a set of readiness parameters, the readiness parameters a function of the responsiveness of a safety system of the nuclear reactor system to a design basis accident (e.g., guillotine break).

Further, the operation 806 illustrates maintaining a readiness state of a fuel cell system associated with a nuclear reactor system within a set of readiness parameters, the readiness parameters a function of the time required for a fuel element of the nuclear reactor system to reach a specified temperature upon loss of coolant flow. For example, as shown in FIGS. 1A through 2, the fuel cell control system 108 may maintain a readiness state of a fuel cell system 110 associated with a nuclear reactor system 104 within a set of readiness parameters, the readiness parameters a function of the time required for a fuel element, such as a fuel pin assembly or a collection of fuel pin assemblies, of the nuclear reactor system to reach a specified temperature upon loss of coolant flow.

Figure 9:
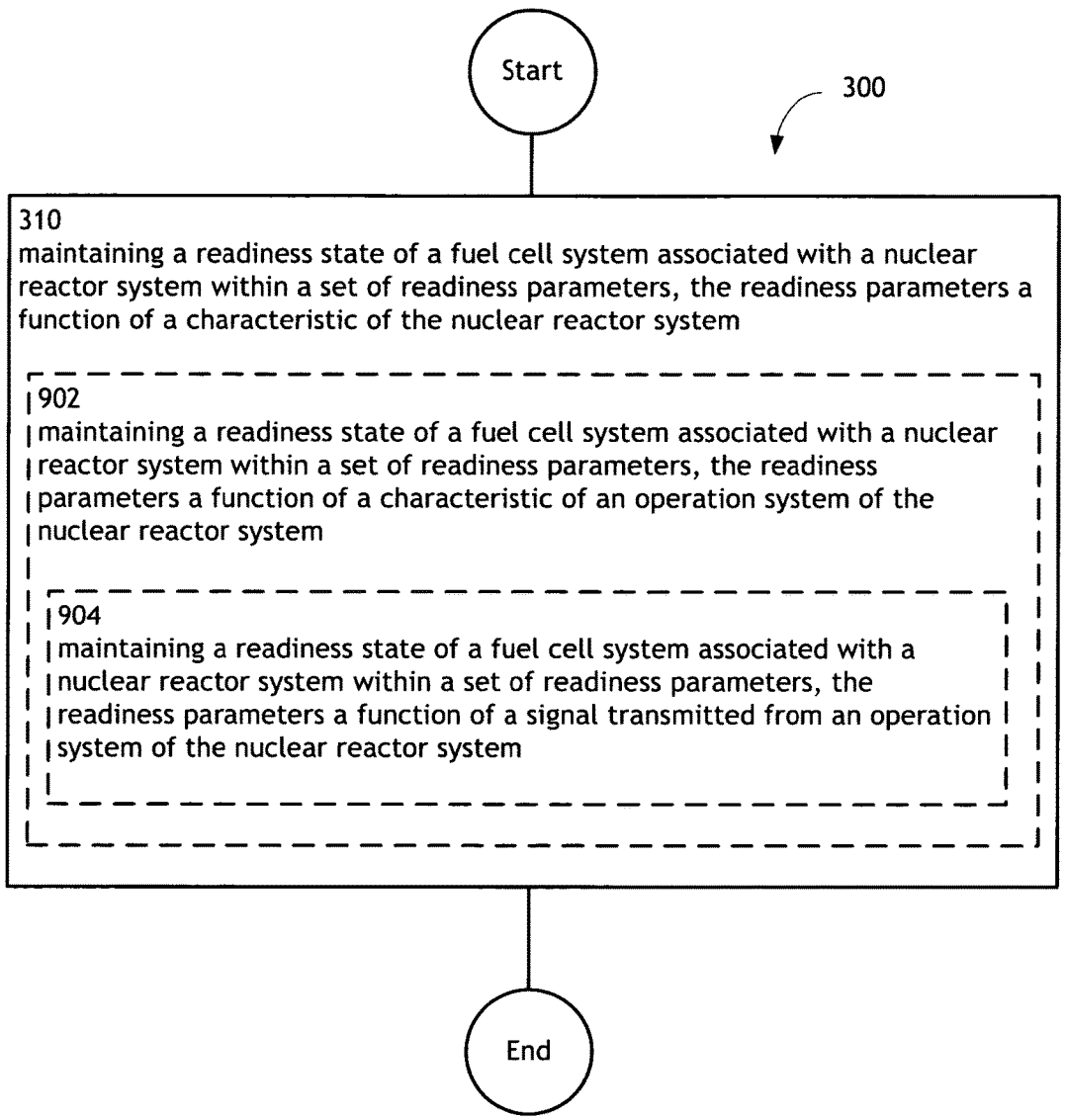
Figure 10:
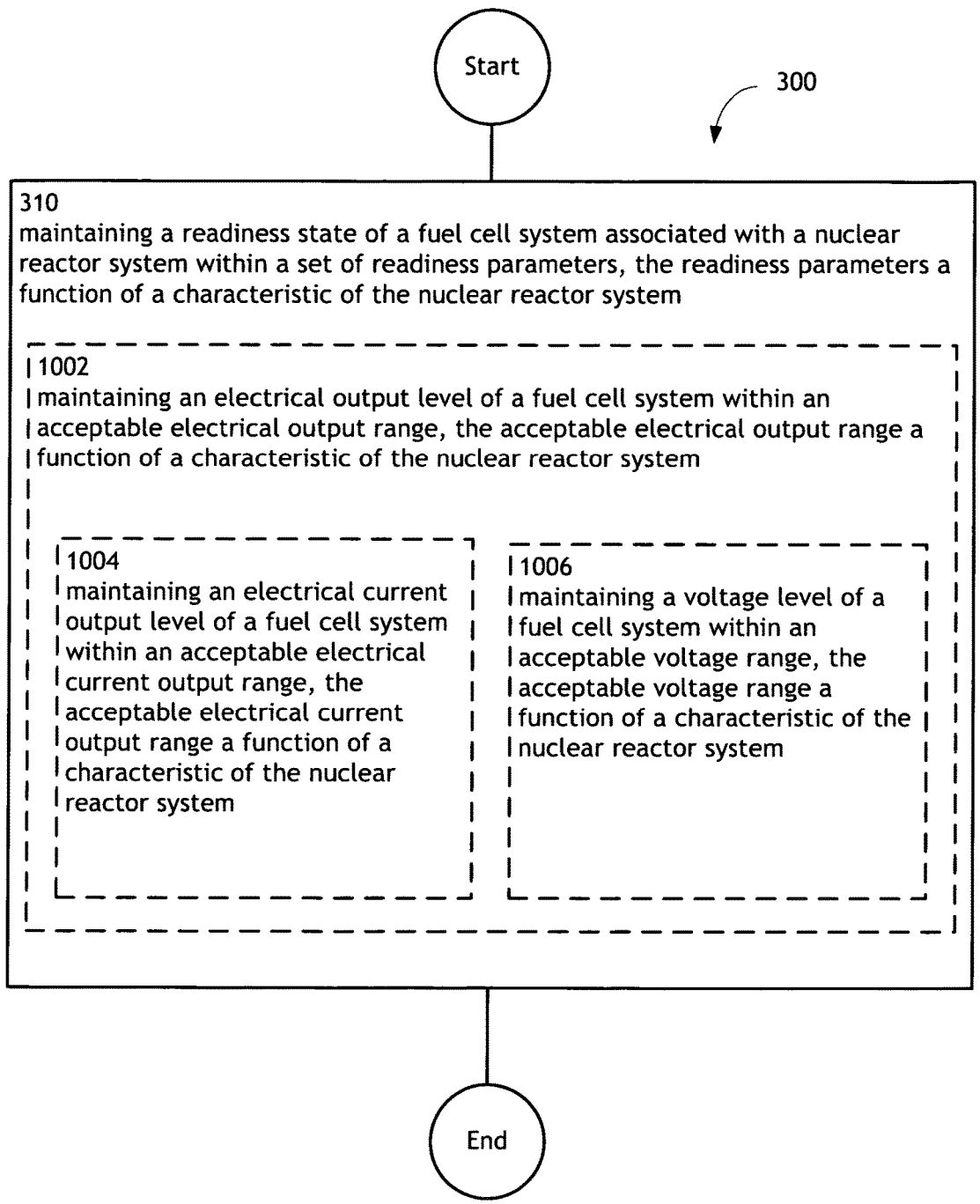

FIG. 9 illustrates alternative embodiments of the example operational flow 300 of FIG. 3. FIG. 9 illustrates example embodiments where the maintaining operation 310 may include at least one additional operation. Additional operations may include an operation 902, and/or an operation 904.

The operation 902 illustrates maintaining a readiness state of a fuel cell system associated with a nuclear reactor system within a set of readiness parameters, the readiness parameters a function of a characteristic of an operation system of the nuclear reactor system. For example, as shown in FIGS. 1A through 2, the fuel cell control system 108 may maintain a readiness state of a fuel cell system 110 associated with a nuclear reactor system 104 within a set of readiness parameters, the readiness parameters a function of a characteristic of an operation system (e.g., safety system, coolant system, monitoring system or shutdown system) of the nuclear reactor system 104.

Further, the operation 904 illustrates maintaining a readiness state of a fuel cell system associated with a nuclear reactor system within a set of readiness parameters, the readiness parameters a function of a signal transmitted from an operation system of the nuclear reactor system. For example, as shown in FIGS. 1A through 2, the fuel cell control system 108 may maintain a readiness state of a fuel cell system 110 associated with a nuclear reactor system 104 within a set of readiness parameters, the readiness parameters a function of a signal (e.g., digital or analog signal) transmitted from an operation system (e.g., safety system, coolant system, monitoring system or shutdown system) of the nuclear reactor system 104.

Figure 10:
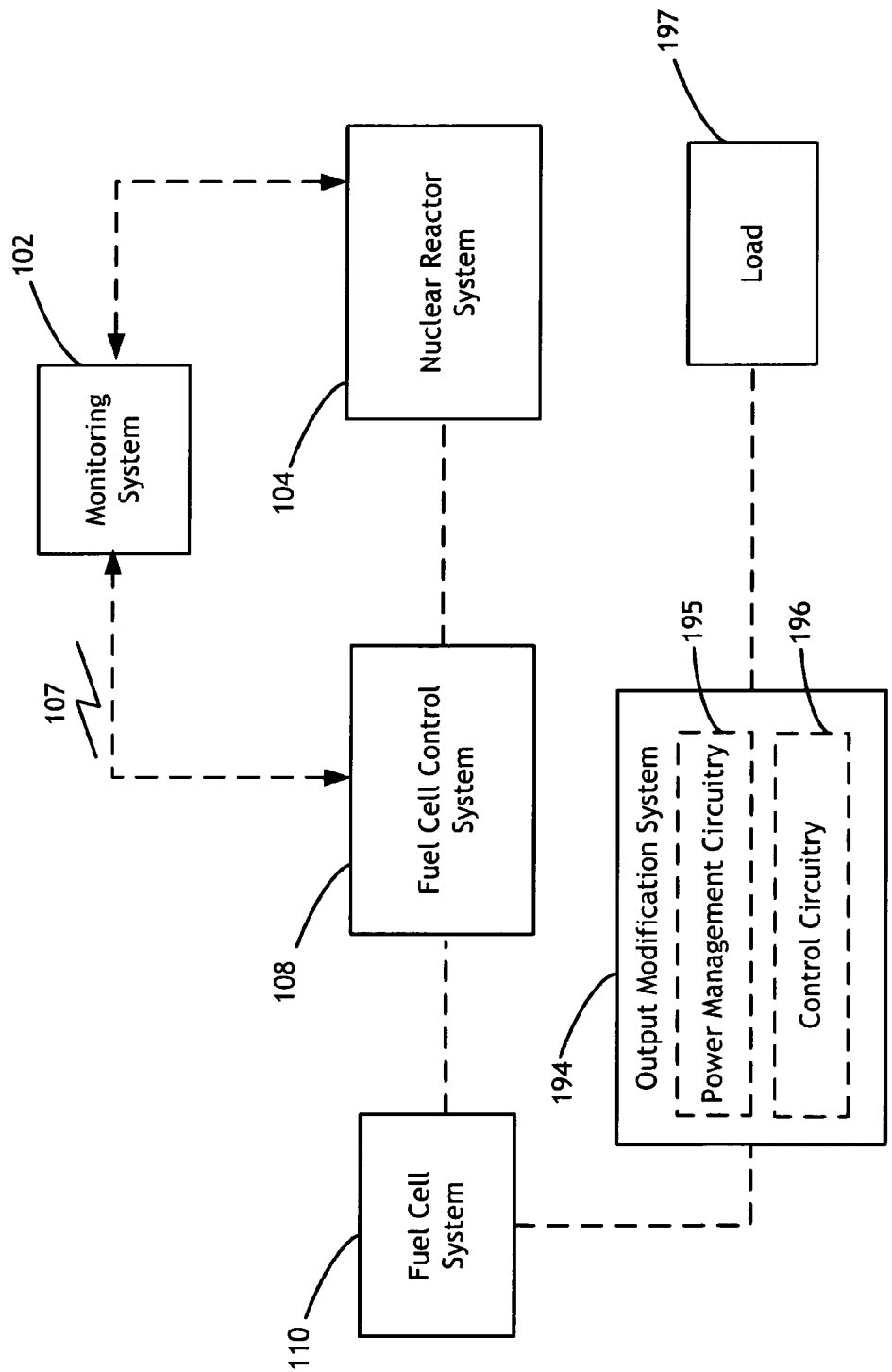
FIGS. 4A through 14 are high-level flowcharts depicting alternate implementations of FIG. 3.

FIG. 10 illustrates alternative embodiments of the example operational flow 300 of FIG. 3. FIG. 10 illustrates example embodiments where the maintaining operation 310 may include at least one additional operation. Additional operations may include an operation 1002, an operation 1004, and/or an operation 1006.

The operation 1002 illustrates maintaining an electrical output level of a fuel cell system within an acceptable electrical output range, the acceptable electrical output range a function of a characteristic of the nuclear reactor system. For example, as shown in FIGS. 1A through 2, the fuel cell control system 108 may maintain an electrical output level of a fuel cell system 110 associated with a nuclear reactor system 104 within acceptable electrical output range, the acceptable electrical output range a function of a characteristic of the nuclear reactor system. For instance, the fuel cell control system 108 may transfer thermal energy (via the heat transfer system) to the fuel cell system 110 in order to heat one or more of the fuel cells of the fuel cell system 110 so as to maintain the electrical output level of the fuel cell system within in an acceptable output range.

Further, the operation 1004 illustrates maintaining an electrical current output level of a fuel cell system within an acceptable electrical current output range, the acceptable electrical current output range a function of a characteristic of the nuclear reactor system. For example, as shown in FIGS. 1A through 2, the fuel cell control system 108 may maintain an electrical current output level of a fuel cell system 110 associated with a nuclear reactor system 104 within acceptable electrical current output range, the acceptable electrical current output range a function of a characteristic of the nuclear reactor system 104. For instance, the configuration control system 116 of the fuel cell control system 108 may reconfigure (e.g., decouple parallel coupled fuel cells and recouple them in a serial configuration or vice-versa) the electrical coupling configuration of two or more fuel cells of the fuel cell system 110 in order to maintain the electrical current output level of the fuel cell system within in an acceptable output range.

Further, the operation 1006 illustrates maintaining a voltage level of a fuel cell system within an acceptable voltage range, the acceptable voltage range a function of a characteristic of the nuclear reactor system. For example, as shown in FIGS. 1A through 2, the fuel cell control system 108 may maintain an electrical voltage output level of a fuel cell system 110 associated with a nuclear reactor system 104 within acceptable electrical voltage output range, the acceptable electrical voltage output range a function of a characteristic of the nuclear reactor system 104. For instance, the configuration control system 116 of the fuel cell control system 108 may reconfigure (e.g., decouple parallel coupled fuel cells and recouple them in a serial configuration or vice-versa) the electrical coupling configuration of two or more fuel cells of the fuel cell system 110 in order to maintain the electrical voltage output level of the fuel cell system within in an acceptable output range.

Figure 11:
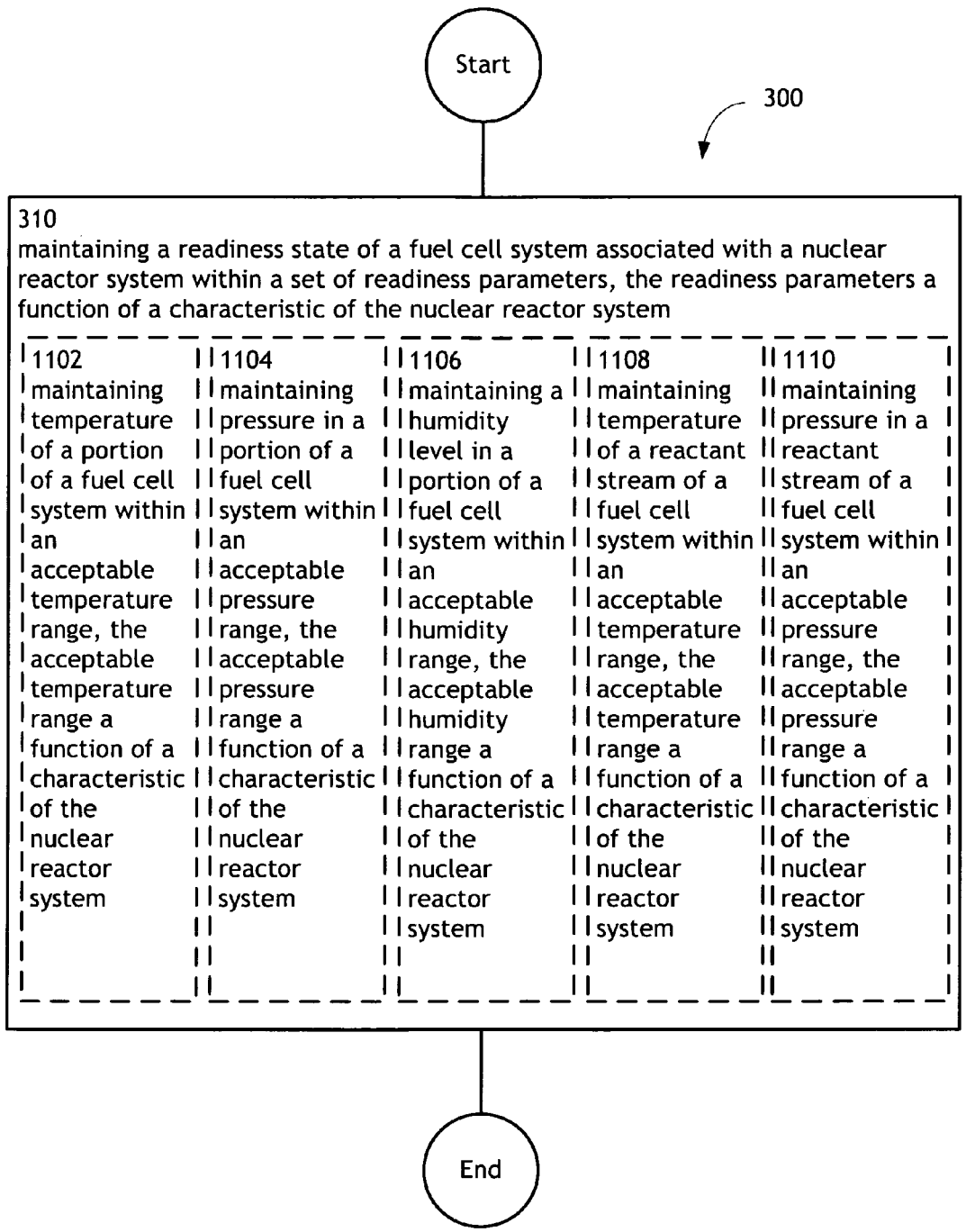

FIG. 11 illustrates alternative embodiments of the example operational flow 300 of FIG. 3. FIG. 11 illustrates example embodiments where the maintaining operation 310 may include at least one additional operation. Additional operations may include an operation 1102, an operation 1104, an operation 1106, an operation 1108 and/or an operation 1110.

The operation 1102 illustrates maintaining temperature of a portion of a fuel cell system within an acceptable temperature range, the acceptable temperature range a function of a characteristic of the nuclear reactor system. For example, as shown in FIGS. 1A through 2, the fuel cell control system 108 may maintain a temperature of a portion of a fuel cell system 110 associated with a nuclear reactor system 104 within acceptable temperature range, the acceptable temperature range a function of a characteristic of the nuclear reactor system 104. For instance, the energy transfer system 112 of the fuel cell control system 108 may transfer energy (e.g., thermal or electrical) from an energy source 103 to the fuel cell system 110 in order to heat or cool one or more of the fuel cells of the fuel cell system 110 so as to maintain the temperature of the fuel cell system 110 within in an acceptable temperature range.

The operation 1104 illustrates maintaining pressure in a portion of a fuel cell system within an acceptable pressure range, the acceptable pressure range a function of a characteristic of the nuclear reactor system. For example, as shown in FIGS. 1A through 2, the fuel cell control system 108 may maintain a pressure in a portion of a fuel cell system 110 associated with a nuclear reactor system 104 within acceptable pressure range, the acceptable pressure range a function of a characteristic of the nuclear reactor system 104. For instance, the energy transfer system 112 of the fuel cell control system 108 may transfer energy (e.g., thermal or electrical) from an energy source 103 to the fuel cell system 110 in order to maintain the pressure of the fuel cell system 110 within in an acceptable pressure range.

The operation 1106 illustrates maintaining a humidity level in a portion of a fuel cell system within an acceptable humidity range, the acceptable humidity range a function of a characteristic of the nuclear reactor system. For example, as shown in FIGS. 1A through 2, the fuel cell control system 108 may maintain a humidity level in a portion of a fuel cell system 110 associated with a nuclear reactor system 104 within acceptable humidity range, the acceptable humidity range a function of a characteristic of the nuclear reactor system 104. For instance, the energy transfer system 112 of the fuel cell control system 108 may transfer energy (e.g., thermal or electrical) from an energy source 103 to the humidity control system of the fuel cell system 110 in order to maintain the humidity level of the fuel cell system 110 within in an acceptable humidity range.

The operation 1108 illustrates maintaining temperature of a reactant stream of a fuel cell system within an acceptable temperature range, the acceptable temperature range a function of a characteristic of the nuclear reactor system. For example, as shown in FIGS. 1A through 2, the fuel cell control system 108 may maintain a temperature of a reactant stream (e.g., fuel stream or oxidant stream) of a fuel cell system 110 associated with a nuclear reactor system 104 within acceptable temperature range, the acceptable temperature range a function of a characteristic of the nuclear reactor system 104. For instance, the energy transfer system 112 of the fuel cell control system 108 may transfer energy (e.g., thermal or electrical) from an energy source 103 to the reactant conditioning system of the fuel cell system 110 in order to heat or cool one or more of the reactants of the fuel cell system 110 so as to maintain the temperature of one or both of the reactant streams of the fuel cell system 110 within in an acceptable temperature range.

The operation 1110 illustrates maintaining pressure in a reactant stream of a fuel cell system within an acceptable pressure range, the acceptable pressure range a function of a characteristic of the nuclear reactor system. For example, as shown in FIGS. 1A through 2, the fuel cell control system 108 may maintain pressure of a reactant stream (e.g., fuel stream or oxidant stream) of a fuel cell system 110 associated with a nuclear reactor system 104 within an acceptable pressure range, the acceptable pressure range a function of a characteristic of the nuclear reactor system 104. For instance, the reactant control system 114 of the fuel cell control system 108 may control reactant valves and/or pumps of the fuel cell system 110 in order to increase or decrease the flow of one or more of the reactant streams of the fuel cell system 110 so as to maintain the pressure of one or both of the reactant streams of the fuel cell system 110 within in an acceptable pressure range.

Figure 12:
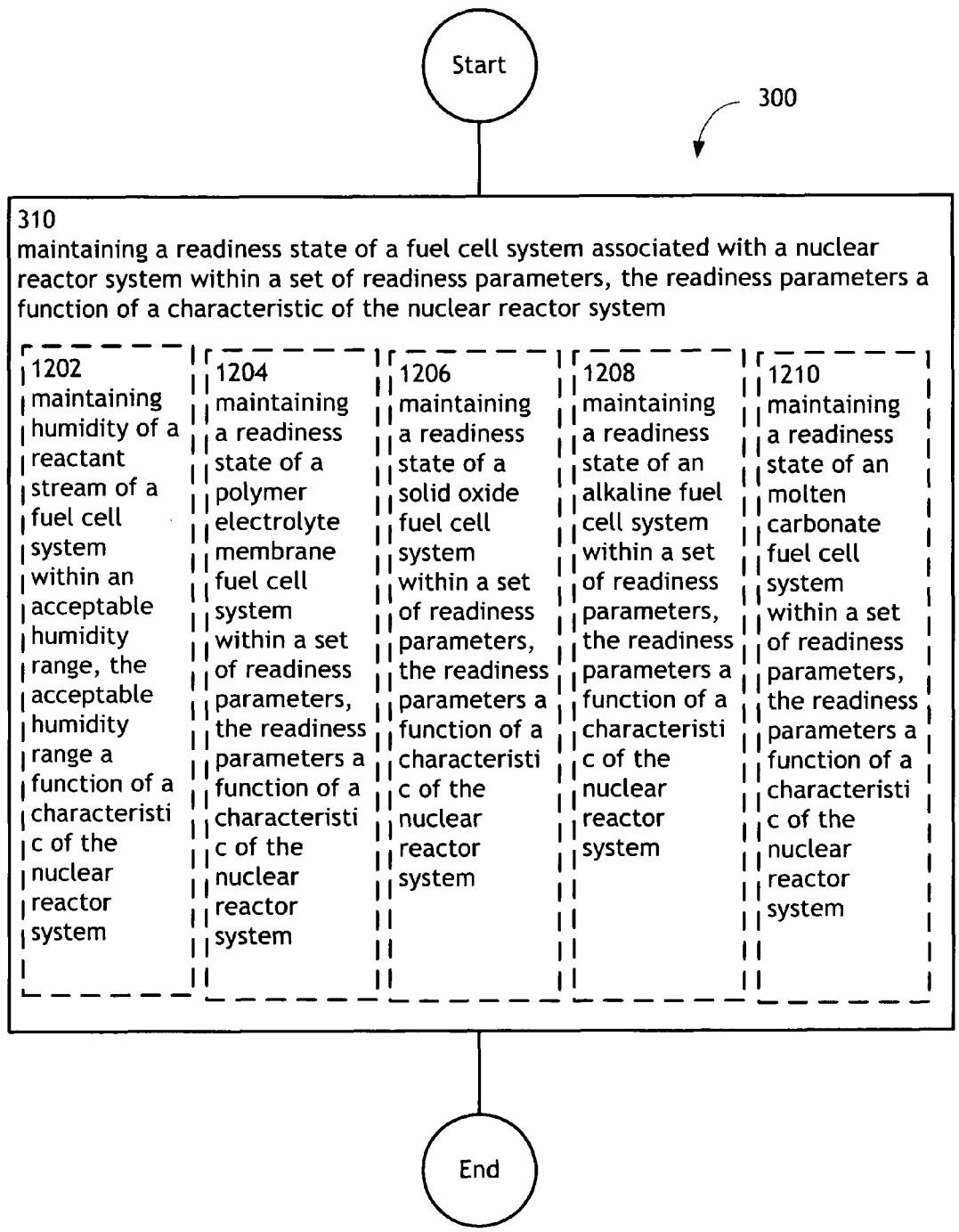

FIG. 12 illustrates alternative embodiments of the example operational flow 300 of FIG. 3. FIG. 12 illustrates example embodiments where the maintaining operation 310 may include at least one additional operation. Additional operations may include an operation 1202, an operation 1204, an operation 1206, an operation 1208, and/or an operation 1210.

The operation 1202 illustrates maintaining humidity of a reactant stream of a fuel cell system within an acceptable humidity range, the acceptable humidity range a function of a characteristic of the nuclear reactor system. For example, as shown in FIGS. 1A through 2, the fuel cell control system 108 may maintain a humidity level of a reactant stream (e.g., fuel stream or oxidant stream) of a fuel cell system 110 associated with a nuclear reactor system 104 within acceptable humidity range, the acceptable humidity range a function of a characteristic of the nuclear reactor system 104. For instance, the energy transfer system 112 of the fuel cell control system 108 may transfer energy (e.g., thermal or electrical) from an energy source 103 to the reactant conditioning system, such as a humidifier, of the fuel cell system 110 in order to maintain the humidity level of one or both of the reactant streams of the fuel cell system 110 within in an acceptable humidity range.

The operation 1204 illustrates maintaining a readiness state of a polymer electrolyte membrane fuel cell system within a set of readiness parameters, the readiness parameters a function of a characteristic of the nuclear reactor system. For example, as shown in FIGS. 1A through 2, a fuel cell control system 108 may maintain a readiness state of a polymer electrolyte membrane fuel cell system 182 within a set of readiness parameters, wherein the readiness parameters are a function of one or more characteristics of the nuclear reactor system 104.

The operation 1206 illustrates maintaining a readiness state of a solid oxide fuel cell system within a set of readiness parameters, the readiness parameters a function of a characteristic of the nuclear reactor system. For example, as shown in FIGS. 1A through 2, a fuel cell control system 108 may maintain a readiness state of a solid oxide fuel cell system 183 within a set of readiness parameters, wherein the readiness parameters are a function of one or more characteristics of the nuclear reactor system 104.

The operation 1208 illustrates maintaining a readiness state of an alkaline fuel cell system within a set of readiness parameters, the readiness parameters a function of a characteristic of the nuclear reactor system For example, as shown in FIGS. 1A through 2, a fuel cell control system 108 may maintain a readiness state of an alkaline fuel cell system 184 within a set of readiness parameters, wherein the readiness parameters are a function of one or more characteristics of the nuclear reactor system 104.

The operation 1210 illustrates maintaining a readiness state of a molten carbonate fuel cell system within a set of readiness parameters, the readiness parameters a function of a characteristic of the nuclear reactor system. For example, as shown in FIGS. 1A through 2, a fuel cell control system 108 may maintain a readiness state of a molten carbonate fuel cell system 185 within a set of readiness parameters, wherein the readiness parameters are a function of one or more characteristics of the nuclear reactor system 104.

Figure 13:
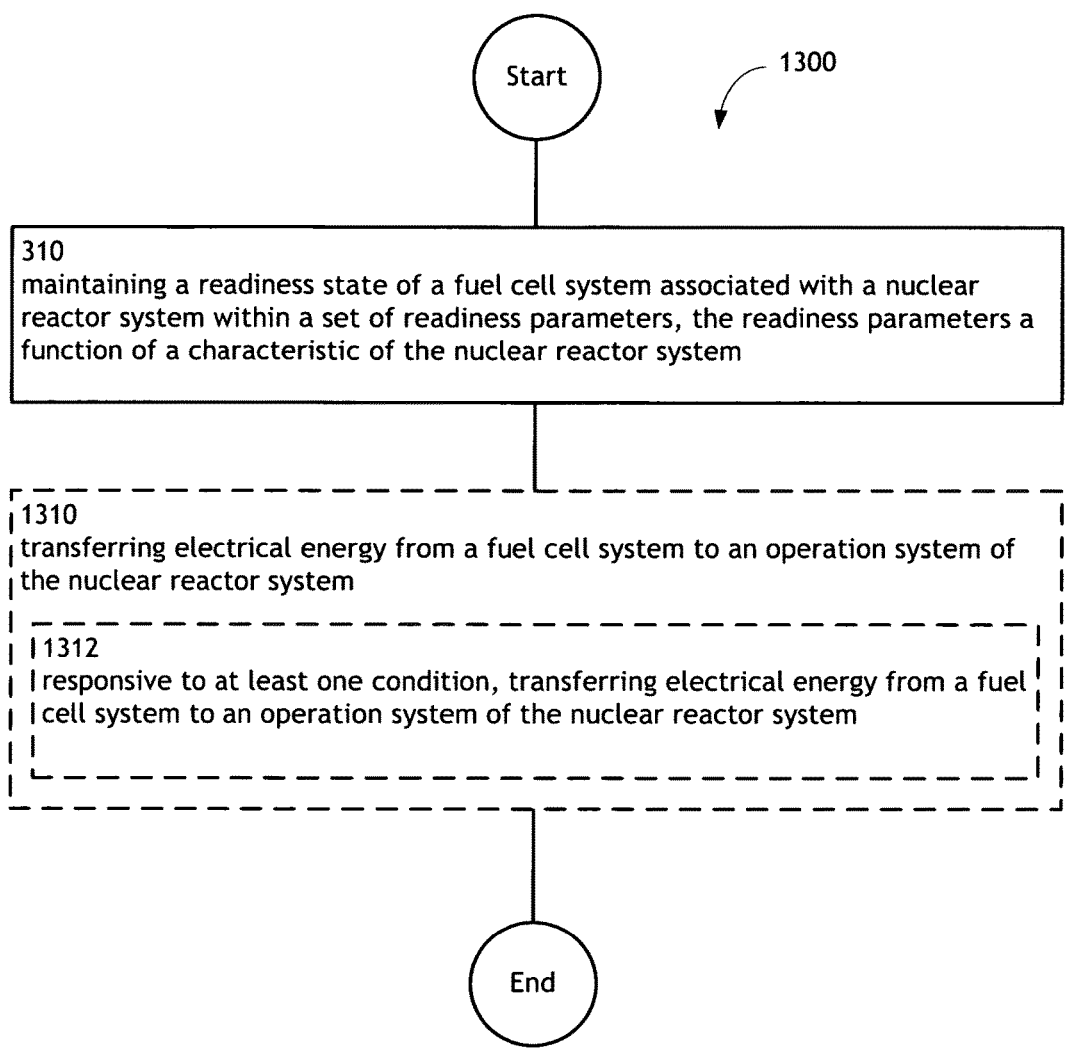

FIG. 13 illustrates an operational flow 1300 representing example operations related to maintaining a readiness state in a fuel cell backup system of a nuclear reactor system. FIG. 13 illustrates an example embodiment where the example operational flow 300 of FIG. 3 may include at least one additional operation. Additional operations may include an operation 1310, and/or an operation 1312.

After a start operation and a maintaining operation 310, the operational flow 1300 moves to a transferring operation 1310. Operation 1310 illustrates transferring electrical energy from a fuel cell system to an operation system of the nuclear reactor system. For example, as shown in FIGS. 1A through 2, an energy supply system 191 may transfer electrical energy from the electrical output of the fuel cell system 110 to an operation system (e.g., coolant system or shutdown system) of the nuclear reactor system.

The operation 1312 illustrates, responsive to at least one condition, transferring electrical energy from a fuel cell system to an operation system of the nuclear reactor system. For example, as shown in FIGS. 1A through 2, an energy supply system 191 may transfer electrical energy from the electrical output of the fuel cell system 110 to an operation system (e.g., coolant system or shutdown system) of the nuclear reactor system in response to a condition, such as a signal from an operation system of the nuclear reactor system 104, or a shutdown event of the nuclear reactor system 104.

Figure 14:
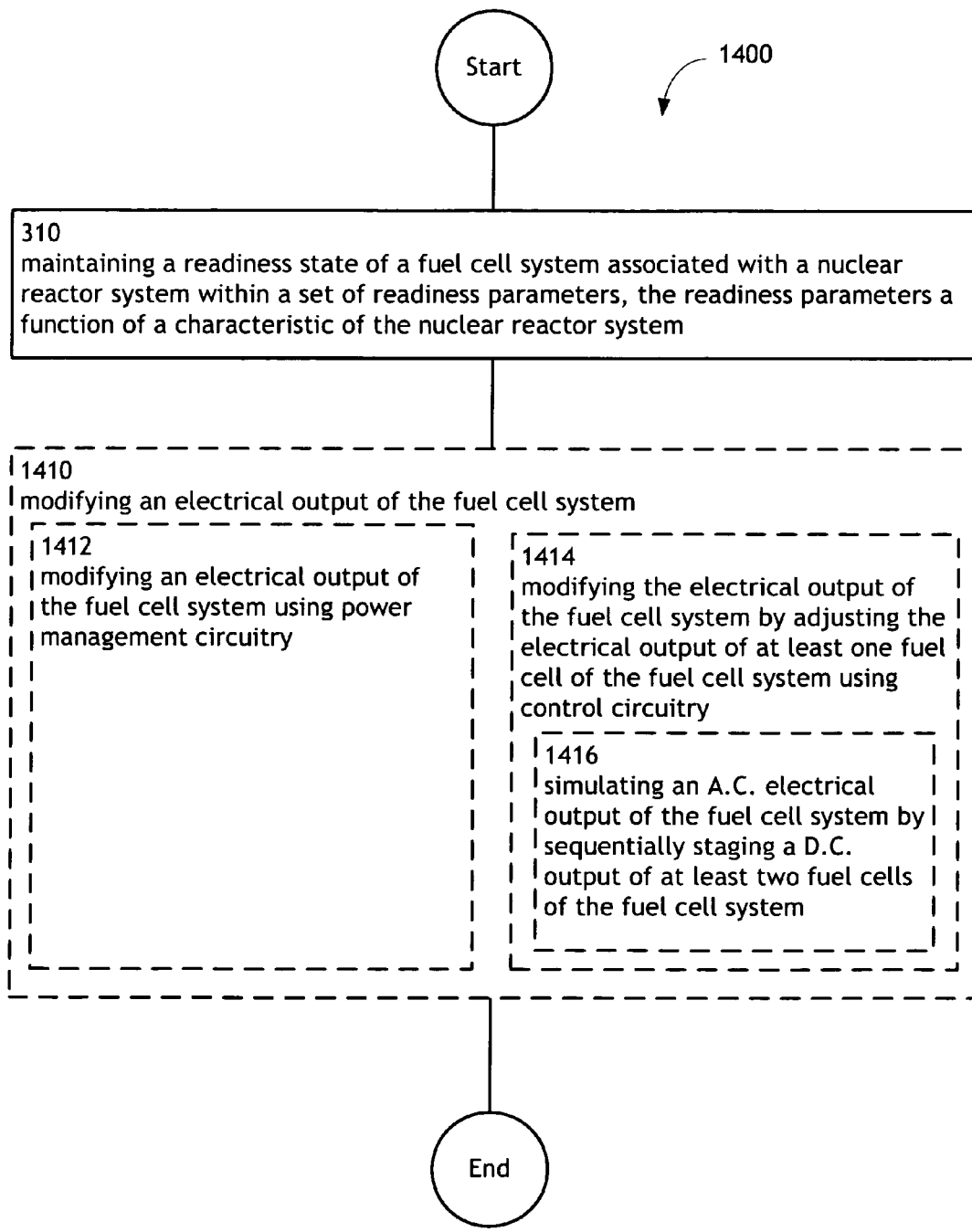
Figure 25:
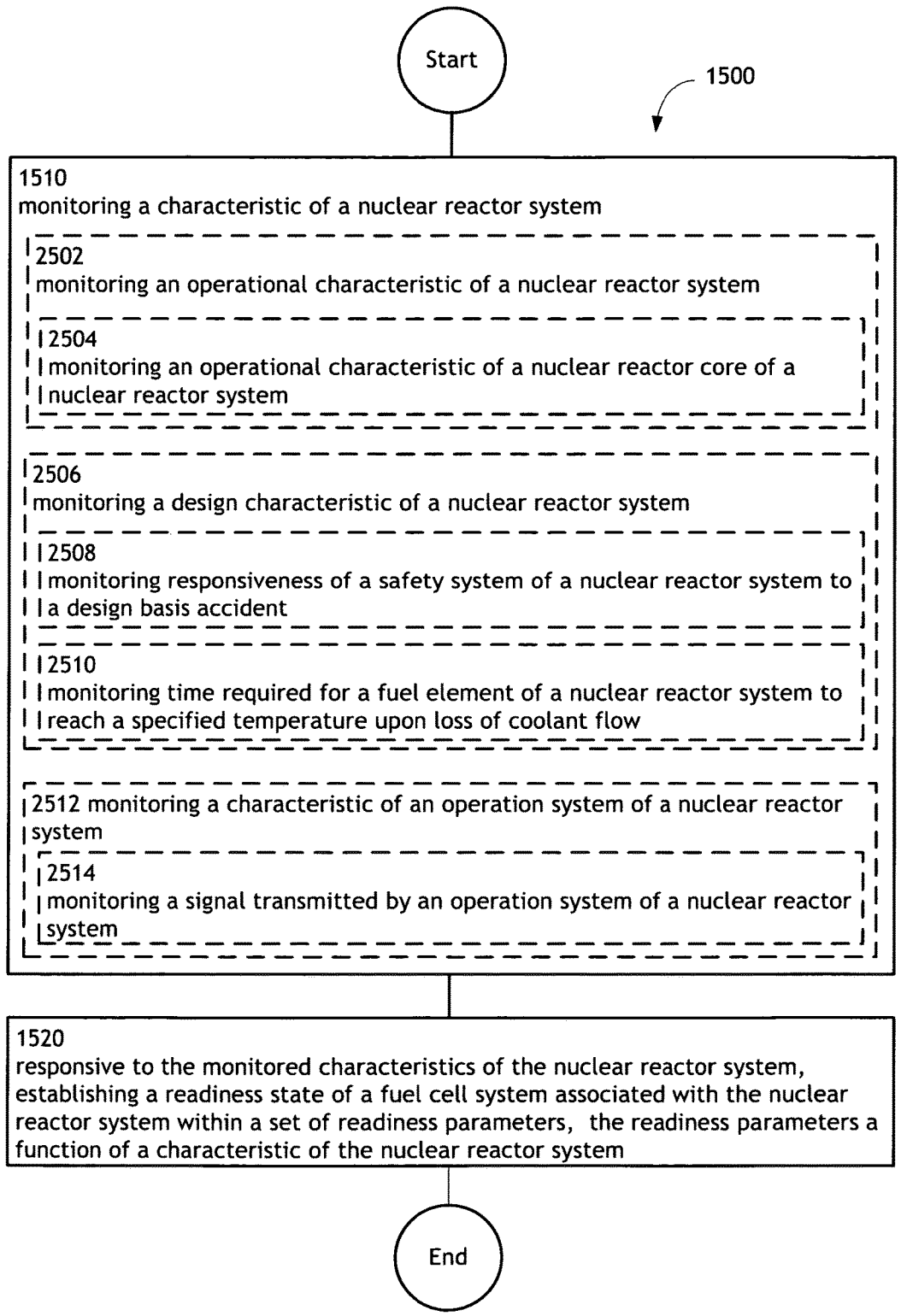

FIG. 14 illustrates an operational flow 1400 representing example operations related to maintaining a readiness state in a fuel cell backup system of a nuclear reactor system. FIG. 25 illustrates an example embodiment where the example operational flow 300 of FIG. 3 may include at least one additional operation. Additional operations may include an operation 1410, an operation 1412, an operation 1414, and/or an operation 1416.

After a start operation and a maintaining operation 310, the operational flow 1400 moves to a modifying operation 1410. Operation 1410 illustrates modifying an electrical output of the fuel cell system. For example, as shown in FIGS. 1A through 2, the output modification system 194 may modify the characteristics of the electrical output of the fuel cell system 110.

The operation 1412 illustrates modifying an electrical output of the fuel cell system using power management circuitry. For example, as shown in FIGS. 1A through 2, power management circuitry 195 (e.g., voltage regulation circuitry) may modify the characteristics of the electrical output of the fuel cell system 110.

The operation 1414 illustrates modifying the electrical output of the fuel cell system by adjusting the electrical output of at least one fuel cell of the fuel cell system using control circuitry. For example, as shown in FIGS. 1A through 2, control circuitry 196 may modify the characteristics of the electrical output of the fuel cell system 110 by adjusting the electrical output of one or more fuel cells of the fuel cell system.

Further, the operation 1416 illustrates simulating an A.C. electrical output of the fuel cell system by sequentially staging a D.C. output of at least two fuel cells of the fuel cell system. For example, as shown in FIGS. 1A through 2, control circuitry 196 may include solid state switches configured to simulate an A.C. electrical output of the fuel cell system 110 by sequentially staging the D.C. electrical outputs of two or more fuel cells of the fuel cell system 110.

Figure 15:
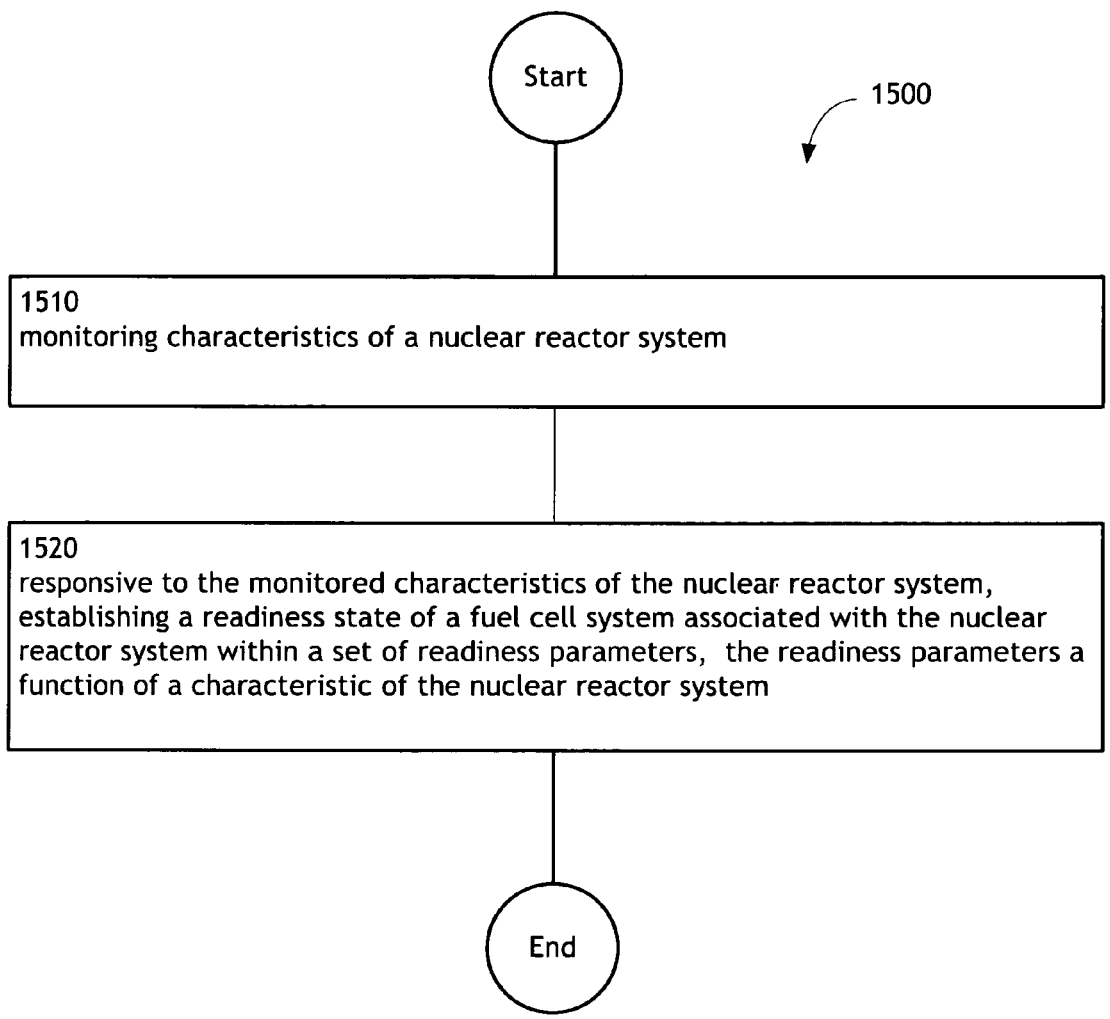
FIG. 15 is a high-level flowchart of a method for establishing a readiness state in a fuel cell backup system of a nuclear reactor system.

FIG. 15 illustrates an operational flow 1500 representing example operations related to establishing a readiness state in a fuel cell backup system of a nuclear reactor system. In FIG. 15 and in following figures that include various examples of operational flows, discussion and explanation may be provided with respect to the above-described examples of FIGS. 1 through 2, and/or with respect to other examples and contexts. However, it should be understood that the operational flows may be executed in a number of other environments and contexts, and/or in modified versions of FIGS. 1A through 2. Also, although the various operational flows are presented in the sequence(s) illustrated, it should be understood that the various operations may be performed in other orders than those which are illustrated, or may be performed concurrently.

After a start operation, the operational flow 1500 moves to a monitoring operation 1510. The monitoring operation 1510 depicts monitoring characteristics of a nuclear reactor system. For example, as shown in FIGS. 1A through 2, a monitoring system 102 may monitor one or more characteristics (e.g., operation characteristics of the nuclear reactor, design characteristics of the nuclear reactor, or operational characteristics of an operation system of the nuclear reactor).

Then, the establishing operation 1520 depicts, responsive to the monitored characteristics of the nuclear reactor system, establishing a readiness state of a fuel cell system associated with the nuclear reactor system within a set of readiness parameters, the readiness parameters a function of a characteristic of the nuclear reactor system. For example, as shown in FIGS. 1A through 2, in response to a signal 107 (e.g., digital or analog signal transmitted wirelessly or by wireline) transmitted by the monitoring system 102, a fuel cell control system 108 (e.g., energy transfer system 112, reactant control system 114, or configuration control system 116) may establish a readiness state of a fuel cell system 110 within a set of readiness parameters, wherein the readiness parameters are a function of one or more of the characteristics of the nuclear reactor system 104. By way of another example, in response to the signal 107 transmitted by the monitoring system 102, a fuel cell module 109 of a fuel cell control system 108 may transmit an instruction signal 113 to an energy transfer system 112 of the fuel cell control system 108 in order to maintain a readiness state of a fuel cell system 110 within a set of readiness parameters.

Figure 16A:
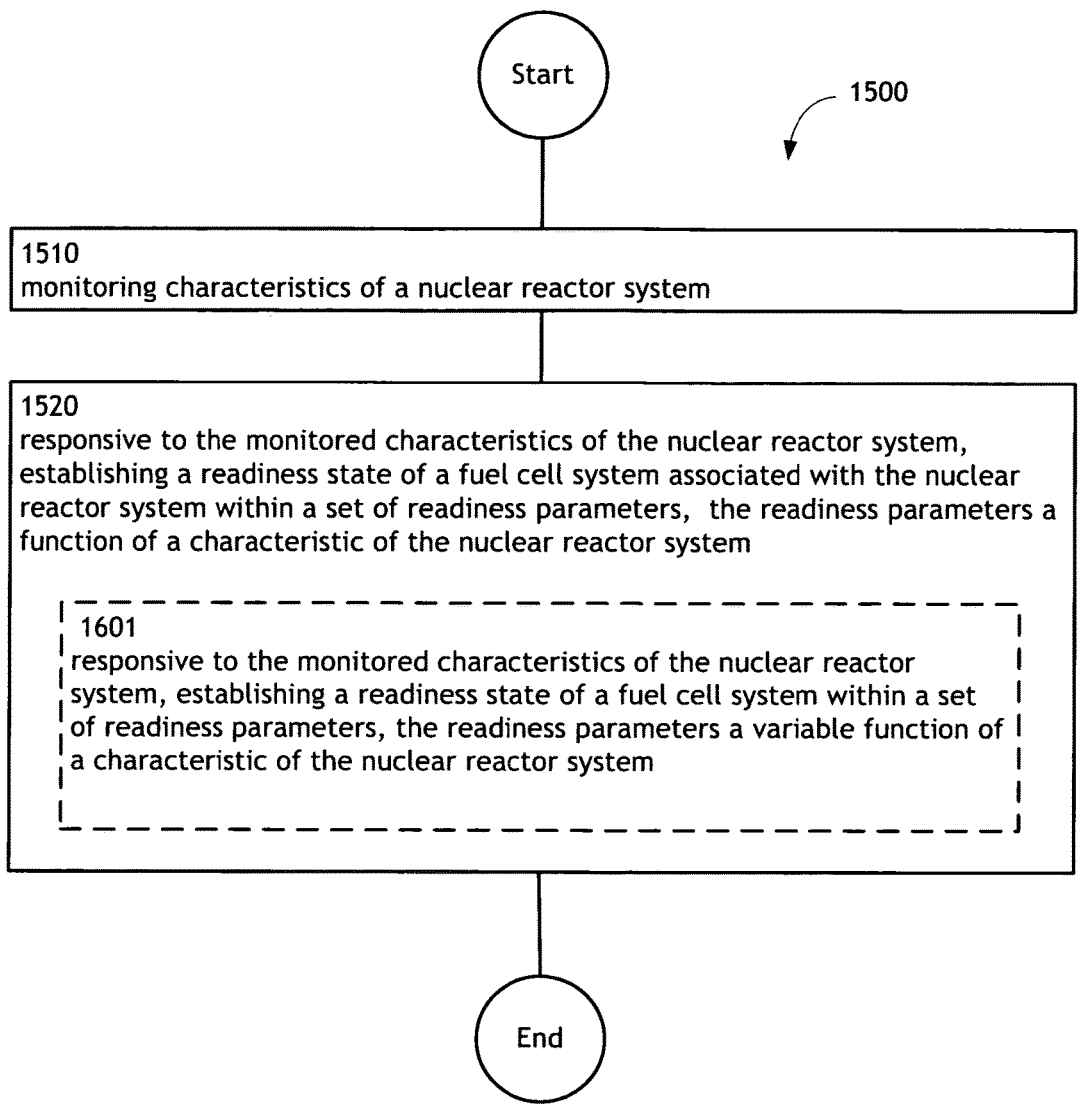
FIGS. 16A through 28 are high-level flowcharts depicting alternate implementations of FIG. 15.

FIG. 16A illustrates alternative embodiments of the example operational flow 1500 of FIG. 15. FIG. 16A illustrates example embodiments where the establishing operation 1520 may include at least one additional operation. Additional operations may include an operation 1601.

The operation 1601 illustrates, responsive to the monitored characteristics of the nuclear reactor system, establishing a readiness state of a fuel cell system associated with the nuclear reactor system within a set of readiness parameters, the readiness parameters a variable function of a characteristic of the nuclear reactor system. For example, as shown in FIGS. 1A through 2, in response to the signal 107 transmitted by the monitoring system 102, a fuel cell control system 108 may establish a readiness state within a set of readiness parameters which are a variable function of a characteristic of the nuclear reactor system 104.

Figure 16B:
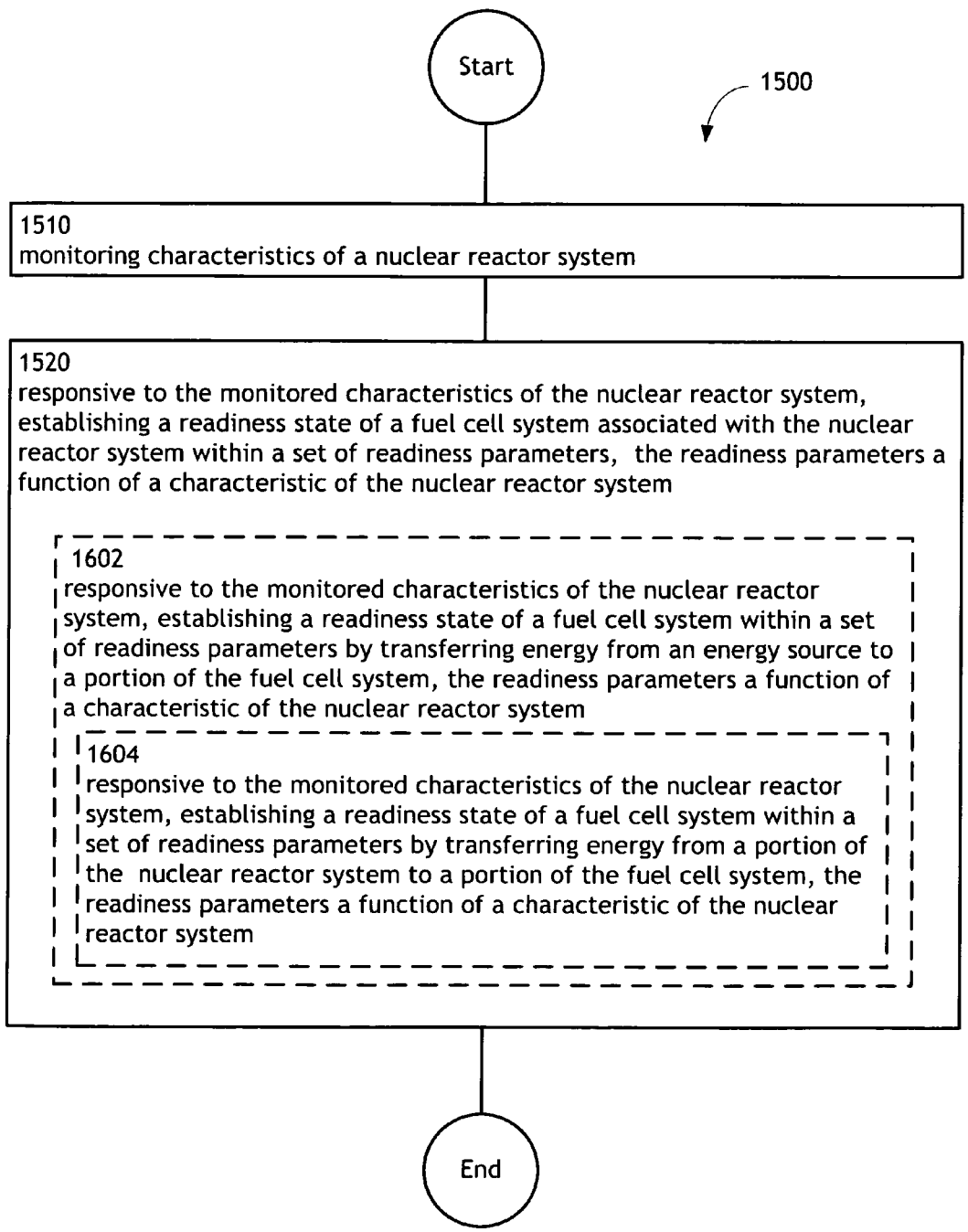

FIG. 16B illustrates alternative embodiments of the example operational flow 1500 of FIG. 15. FIG. 16 illustrates example embodiments where the establishing operation 1520 may include at least one additional operation. Additional operations may include an operation 1602, and/or an operation 1604.

The operation 1602 illustrates, responsive to the monitored characteristics of the nuclear reactor system, establishing a readiness state of a fuel cell system within a set of readiness parameters by transferring energy from an energy source to a portion of the fuel cell system, the readiness parameters a function of a characteristic of the nuclear reactor system. For example, as shown in FIGS. 1A through 2, in response to the signal 107 transmitted by the monitoring system 102, an energy transfer system 112 of a fuel cell control system 108 may establish a readiness state within a set of readiness parameters by transferring energy (e.g., thermal or electrical) from an energy source 103 to a portion of the fuel cell system 110.

Further, the operation 1604 illustrates, responsive to the monitored characteristics of the nuclear reactor system, establishing a readiness state of a fuel cell system within a set of readiness parameters by transferring energy from a portion of the nuclear reactor system to a portion of the fuel cell system, the readiness parameters a function of a characteristic of the nuclear reactor system. For example, as shown in FIGS. 1A through 2, in response to the signal 107 transmitted by the monitoring system 102, an energy transfer system 112 of a fuel cell control system 108 may establish a readiness state within a set of readiness parameters by transferring energy (e.g., thermal or electrical) from a portion of the nuclear reactor system 104 (e.g., portion of the coolant system of the nuclear reactor system 104) to a portion of the fuel cell system 110.

Figure 17:
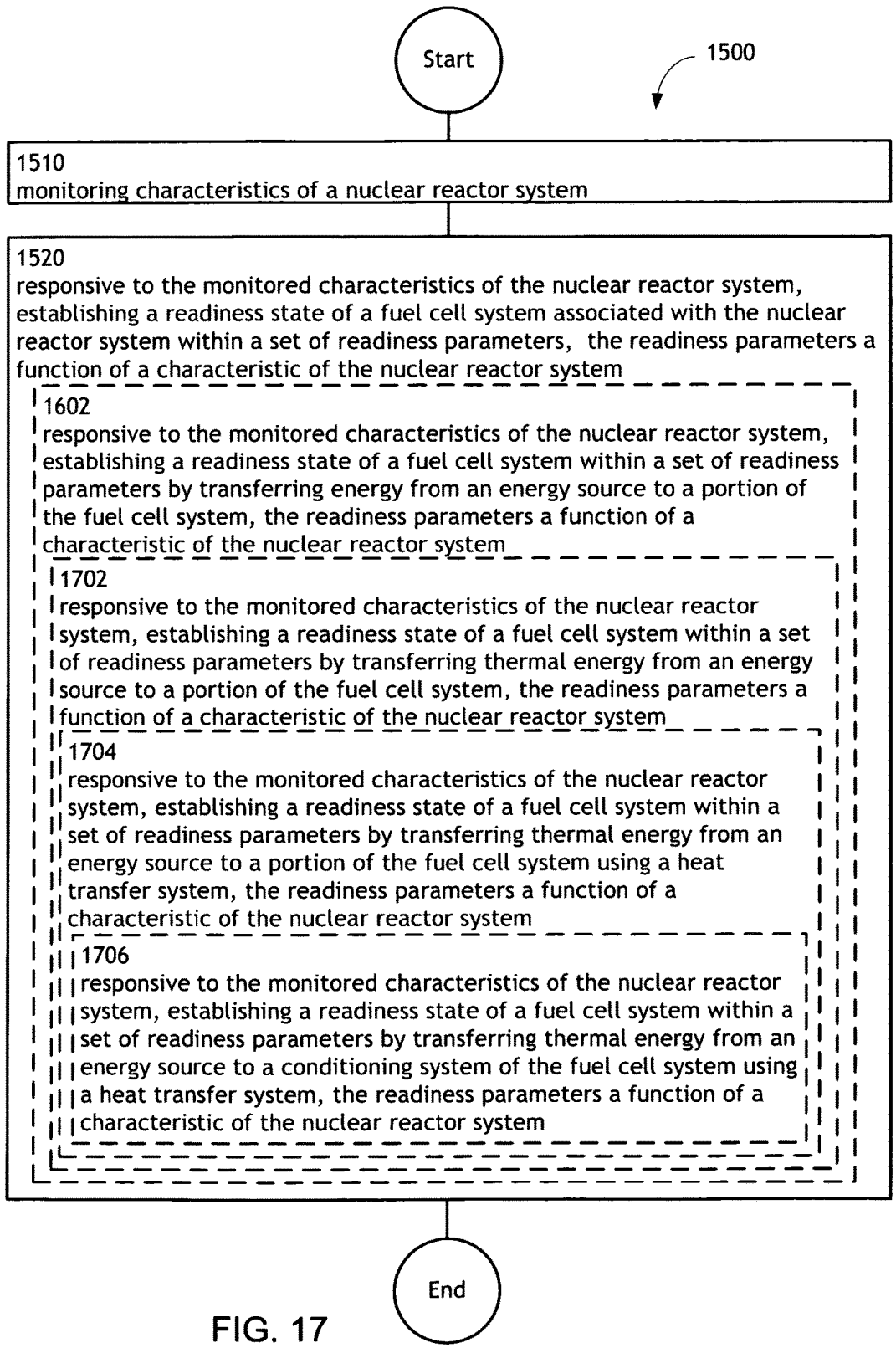

FIG. 17 illustrates alternative embodiments of the example operational flow 1500 of FIG. 15. FIG. 17 illustrates example embodiments where the establishing operation 1520 may include at least one additional operation. Additional operations may include an operation 1702, an operation 1704, and/or an operation 1706.

Further, the operation 1702 illustrates, responsive to the monitored characteristics of the nuclear reactor system, establishing a readiness state of a fuel cell system within a set of readiness parameters by transferring thermal energy from an energy source to a portion of the fuel cell system, the readiness parameters a function of a characteristic of the nuclear reactor system. For example, as shown in FIGS. 1A through 2, in response to the signal 107 transmitted from the monitoring system 102, a energy transfer system 112 of a fuel cell control system 108 may establish a readiness state within a set of readiness parameters by transferring thermal energy from an energy source 103 to a portion of the fuel cell system 110 (e.g., bipolar plates of one or more fuel cells).

Further, the operation 1704 illustrates, responsive to the monitored characteristics of the nuclear reactor system, establishing a readiness state of a fuel cell system within a set of readiness parameters by transferring thermal energy from an energy source to a portion of the fuel cell system using a heat transfer system, the readiness parameters a function of a characteristic of the nuclear reactor system. For example, as shown in FIGS. 1A through 2, in response to the signal 107 transmitted by the monitoring system 107, a heat transfer system 146 of a fuel cell control system 108 may establish a readiness state within a set of readiness parameters by transferring thermal energy from an energy source 103 to a portion of the fuel cell system 110 (e.g., condition system or a portion of one or more fuel cells).

Further, the operation 1706 illustrates, responsive to the monitored characteristics of the nuclear reactor system, establishing a readiness state of a fuel cell system within a set of readiness parameters by transferring thermal energy from an energy source to a conditioning system of the fuel cell system using a heat transfer system, the readiness parameters a function of a characteristic of the nuclear reactor system. For example, as shown in FIGS. 1A through 2, in response to the signal 107 transmitted by the monitoring system 102, a heat transfer system 146 of a fuel cell control system 108 may establish a readiness state within a set of readiness parameters by transferring thermal energy from an energy source 103 to a humidity control system 142 of the fuel cell system 110.

Figure 18:
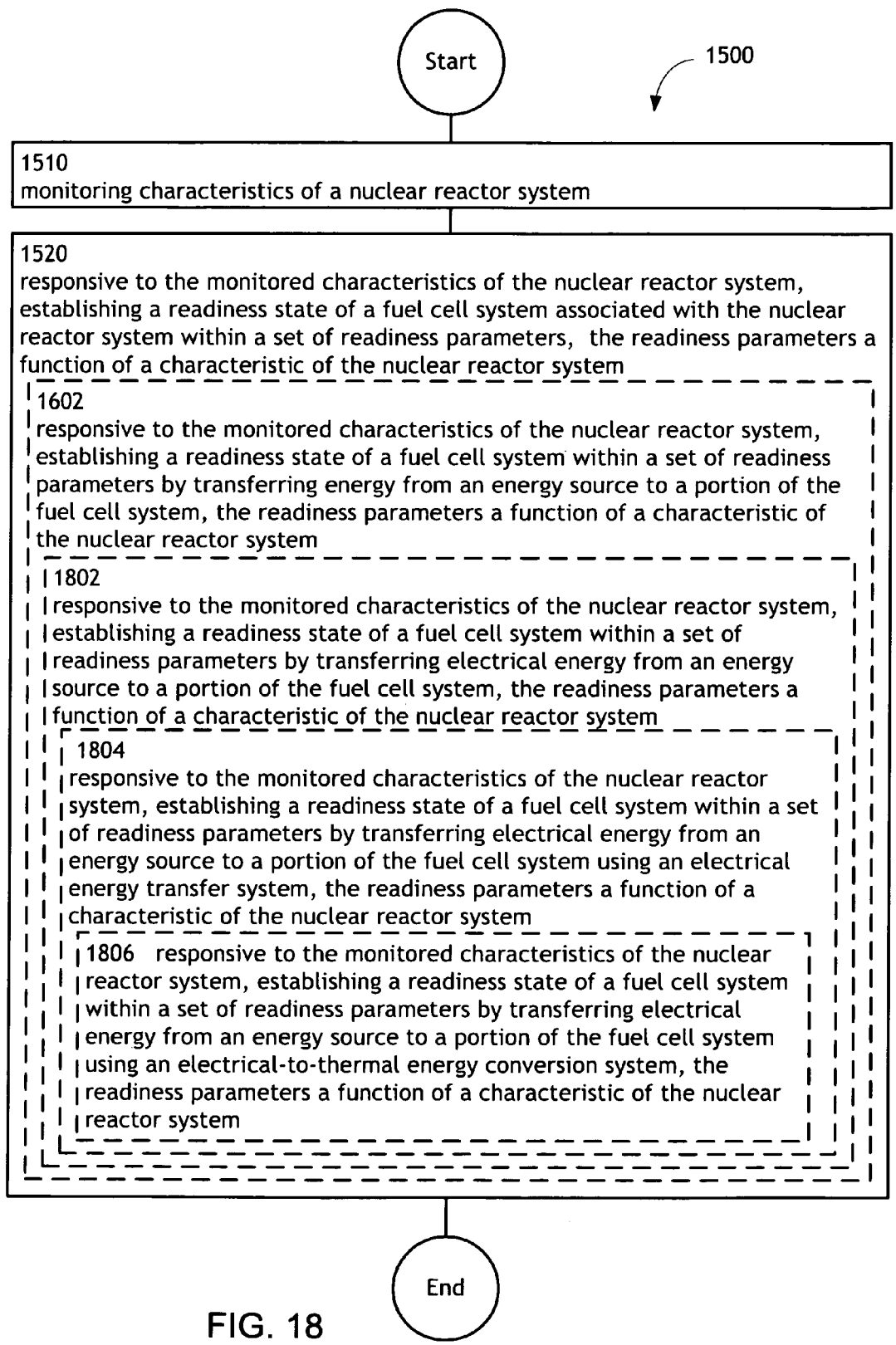

FIG. 18 illustrates alternative embodiments of the example operational flow 1500 of FIG. 15. FIG. 18 illustrates example embodiments where the establishing operation 1520 may include at least one additional operation. Additional operations may include an operation 1802, an operation 1804, and/or an operation 1806.

Further, the operation 1802 illustrates, responsive to the monitored characteristics of the nuclear reactor system, establishing a readiness state of a fuel cell system within a set of readiness parameters by transferring electrical energy from an energy source to a portion of the fuel cell system, the readiness parameters a function of a characteristic of the nuclear reactor system. For example, as shown in FIGS. 1A through 2, in response to the signal 107 from the monitoring system 102, an energy transfer system 112 of a fuel cell control system 108 may establish a readiness state within a set of readiness parameters by transferring electrical energy from an energy source 103 to a temperature control system 144 of the fuel cell system 110.

Further, the operation 1804 illustrates, responsive to the monitored characteristics of the nuclear reactor system, establishing a readiness state of a fuel cell system within a set of readiness parameters by transferring electrical energy from an energy source to a portion of the fuel cell system using an electrical energy transfer system, the readiness parameters a function of a characteristic of the nuclear reactor system. For example, as shown in FIGS. 1A through 2, an electrical energy transfer system 148 of a fuel cell control system 108 may establish a readiness state within a set of readiness parameters by transferring electrical energy from an energy source 103 to a temperature control system 144 of the fuel cell system 110.

Further, the operation 1806 illustrates, responsive to the monitored characteristics of the nuclear reactor system, establishing a readiness state of a fuel cell system within a set of readiness parameters by transferring electrical energy from an energy source to a portion of the fuel cell system using an electrical-to-thermal energy conversion system, the readiness parameters a function of a characteristic of the nuclear reactor system. For example, as shown in FIGS. 1A through 2, in response to the signal 107 transmitted by the monitoring system 102, an electrical-to-thermal conversion system 150 of a fuel cell control system 108 may establish a readiness state within a set of readiness parameters by transferring electrical energy from an energy source 103 to a portion (e.g., one or more fuel cells) of the fuel cell system 110.

Figure 19:
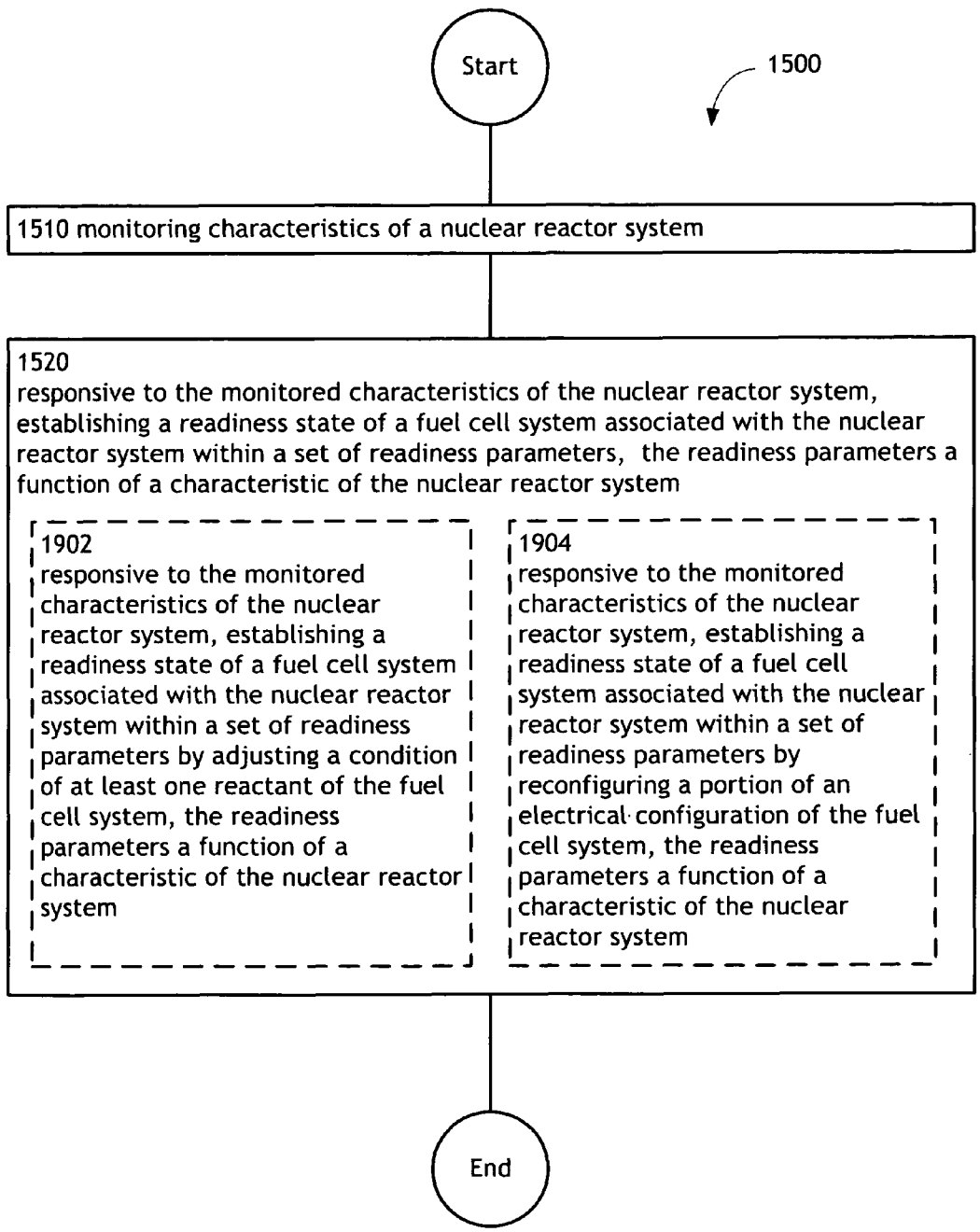

FIG. 19 illustrates alternative embodiments of the example operational flow 1500 of FIG. 15. FIG. 19 illustrates example embodiments where the establishing operation 1520 may include at least one additional operation. Additional operations may include an operation 1902 and/or an operation 1906.

The operation 1902 illustrates, responsive to the monitored characteristics of the nuclear reactor system, establishing a readiness state of a fuel cell system associated with the nuclear reactor system within a set of readiness parameters by adjusting a condition of at least one reactant of the fuel cell system, the readiness parameters a function of a characteristic of the nuclear reactor system. For example, as shown in FIGS. 1A through 2, in response to the signal 107 transmitted by the monitoring system 102, the reactant control system 114 of the fuel cell control system 108 may establish a readiness state of a fuel cell system associated with a nuclear reactor system 104 within a set of readiness parameters by adjusting a condition (e.g., pressure of reactant gas or flow rate of reactant gas) of at least one reactant (e.g., fuel or oxidant) of the fuel cell system 110. Further, the reactant pump control system 156 of the reactant control system 114 of the fuel cell control system 108 may establish a readiness state of a fuel cell system 110 associated with a nuclear reactor system 104 within a set of readiness parameters by adjusting a condition of at least one reactant of the fuel cell system 110.

The operation 1904 illustrates, responsive to the monitored characteristics of the nuclear reactor system, establishing a readiness state of a fuel cell system associated with the nuclear reactor system within a set of readiness parameters by reconfiguring a portion of an electrical configuration of the fuel cell system, the readiness parameters a function of a characteristic of the nuclear reactor system. For example, as shown in FIGS. 1A through 2, in response to the signal 107 transmitted by the monitoring system 102, the configuration control system 116 (e.g., switching circuitry) of the fuel cell control system 108 may establish a readiness state of a fuel cell system 110 associated with a nuclear reactor system 104 within a set of readiness parameters by reconfiguring an electrical configuration (e.g., circuit arrangement) of the fuel cell system 110.

Figure 20:
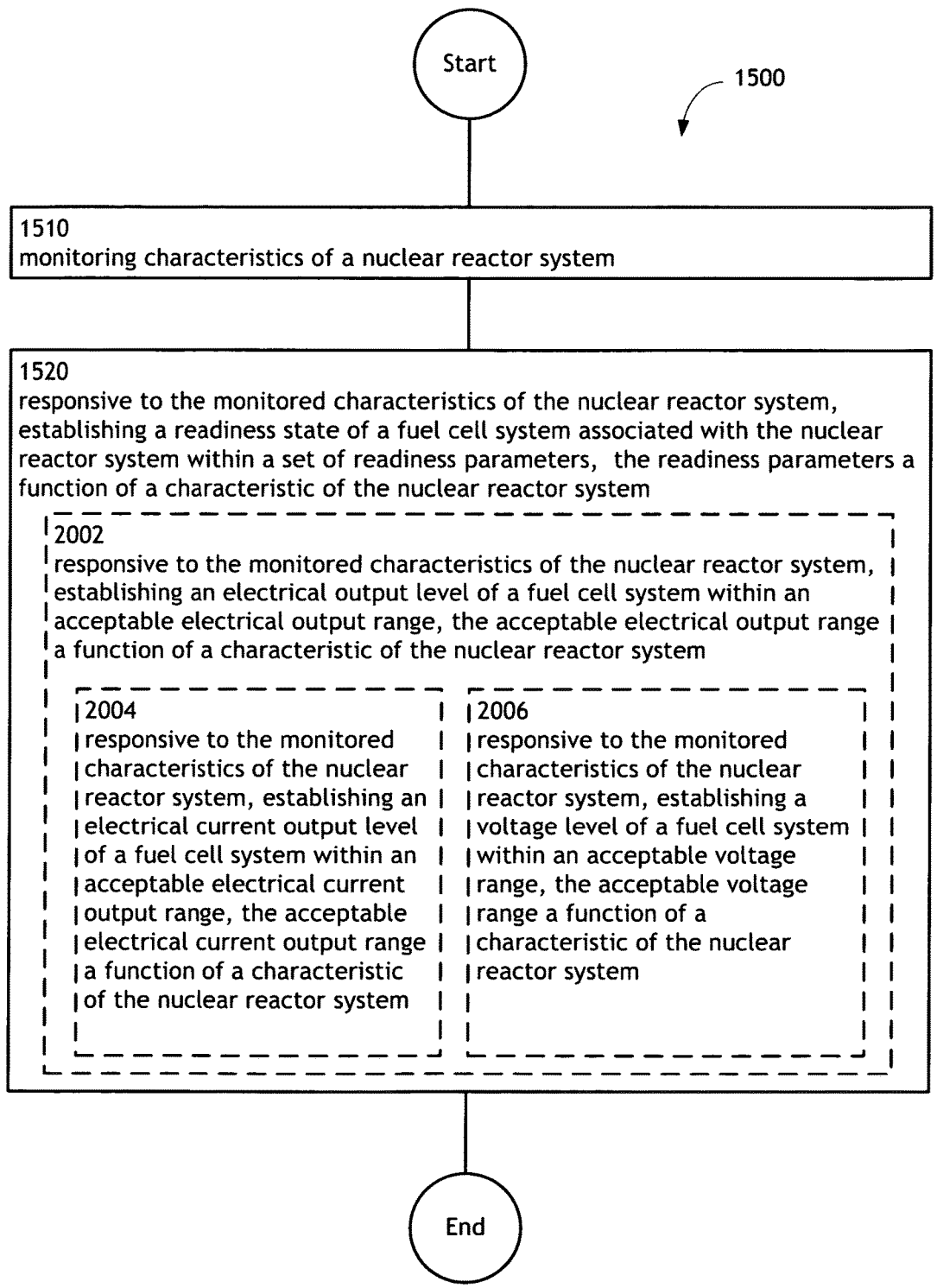

FIG. 20 illustrates alternative embodiments of the example operational flow 1500 of FIG. 15. FIG. 20 illustrates example embodiments where the establishing operation 1520 may include at least one additional operation. Additional operations may include an operation 2002, an operation 2004, and/or an operation 2006.

The operation 2002 illustrates, responsive to the monitored characteristics of the nuclear reactor system, establishing an electrical output level of a fuel cell system within an acceptable electrical output range, the acceptable electrical output range a function of a characteristic of the nuclear reactor system. For example, as shown in FIGS. 1A through 2, in response to the signal 107 transmitted by the monitoring system 102, the fuel cell control system 108 may establish an electrical output level of a fuel cell system 110 associated with a nuclear reactor system 104 within acceptable electrical output range, the acceptable electrical output range a function of a characteristic of the nuclear reactor system 104. For instance, the fuel cell control system 108 may transfer thermal energy (via the heat transfer system) to the fuel cell system 110 in order to heat one or more of the fuel cells of the fuel cell system 110 so as to establish an electrical output level of the fuel cell system 110 within in an acceptable output range.

Further, the operation 2004 illustrates, responsive to the monitored characteristics of the nuclear reactor system, establishing an electrical current output level of a fuel cell system within an acceptable electrical current output range, the acceptable electrical current output range a function of a characteristic of the nuclear reactor system. For example, as shown in FIGS. 1A through 2, in response to the signal 107 transmitted by the monitoring system 102, the fuel cell control system 108 may establish an electrical current output level of a fuel cell system 110 associated with a nuclear reactor system 104 within an acceptable electrical current output range, the acceptable electrical current output range a function of a characteristic of the nuclear reactor system 104. For instance, the configuration control system 116 of the fuel cell control system 108 may reconfigure (e.g., decouple parallel coupled fuel cells and recouple them in a serial configuration or vice-versa) the electrical coupling configuration of two or more fuel cells of the fuel cell system 110 in order to establish an electrical current output level of the fuel cell system within in an acceptable output range.

Further, the operation 2006 illustrates, responsive to the monitored characteristics of the nuclear reactor system, establishing a voltage level of a fuel cell system within an acceptable voltage range, the acceptable voltage range a function of a characteristic of the nuclear reactor system. For example, as shown in FIGS. 1A through 2, in response to the signal 107 transmitted from the monitoring system 102, the fuel cell control system 108 may establish an electrical voltage output level of a fuel cell system 110 associated with a nuclear reactor system 104 within acceptable electrical voltage output range, the acceptable electrical voltage output range a function of a characteristic of the nuclear reactor system 104. For instance, the configuration control system 116 of the fuel cell control system 108 may reconfigure (e.g., decouple parallel coupled fuel cells and recouple them in a serial configuration or vice-versa) the electrical coupling configuration of two or more fuel cells of the fuel cell system 110 in order to establish an electrical voltage output level of the fuel cell system 110 within in an acceptable output range.

Figure 21:
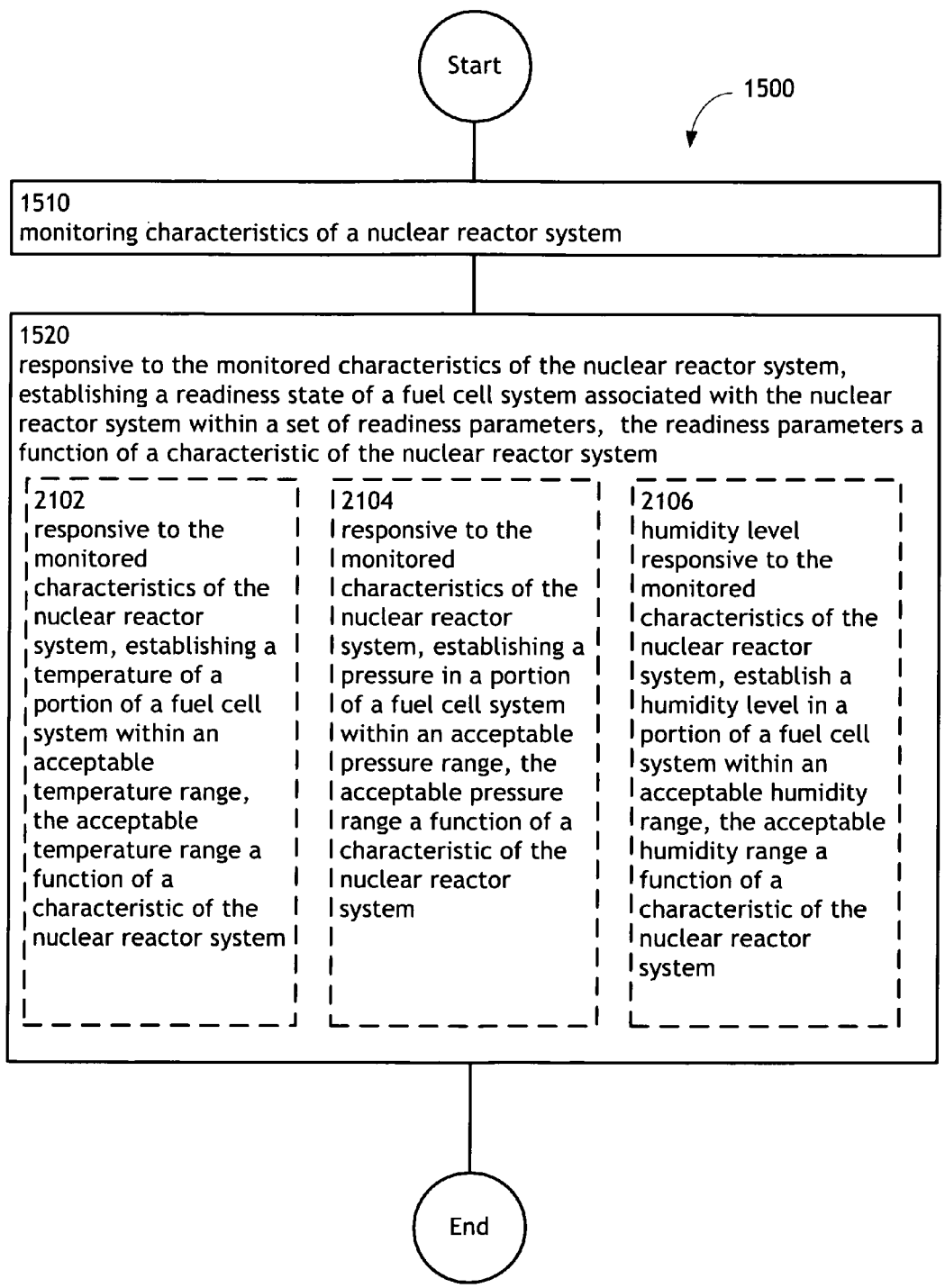

FIG. 21 illustrates alternative embodiments of the example operational flow 1500 of FIG. 15. FIG. 21 illustrates example embodiments where the establishing operation 1520 may include at least one additional operation. Additional operations may include an operation 2102, an operation 2104, and/or an operation 2106.

The operation 2102 illustrates, responsive to the monitored characteristics of the nuclear reactor system, establishing a temperature of a portion of a fuel cell system within an acceptable temperature range, the acceptable temperature range a function of a characteristic of the nuclear reactor system. For example, as shown in FIGS. 1A through 2, in response to the signal 107 transmitted from the monitoring system 102, the fuel cell control system 108 may establish a temperature in a portion of a fuel cell system 110 associated with a nuclear reactor system 104 within acceptable temperature range, the acceptable temperature range a function of a characteristic of the nuclear reactor system 104. For instance, the energy transfer system 112 of the fuel cell control system 108 may transfer energy (e.g., thermal or electrical) from an energy source 103 to the fuel cell system 110 in order to heat or cool one or more of the fuel cells of the fuel cell system 110 so as to establish a temperature of the fuel cell system 110 within in an acceptable temperature range.

The operation 2104 illustrates, responsive to the monitored characteristics of the nuclear reactor system, establishing a pressure in a portion of a fuel cell system within an acceptable pressure range, the acceptable pressure range a function of a characteristic of the nuclear reactor system. For example, as shown in FIGS. 1A through 2, in response to the signal 107 transmitted from the monitoring system 102, the fuel cell control system 108 may establish a pressure in a portion of a fuel cell system 110 associated with a nuclear reactor system 104 within acceptable pressure range, the acceptable pressure range a function of a characteristic of the nuclear reactor system 104. For instance, the energy transfer system 112 of the fuel cell control system 108 may transfer energy (e.g., thermal or electrical) from an energy source 103 to the fuel cell system 110 in order to establish a pressure in the fuel cell system 110 within in an acceptable pressure range.

The operation 2106 illustrates, responsive to the monitored characteristics of the nuclear reactor system, establishing a humidity level in a fuel cell system within an acceptable humidity range, the acceptable humidity range a function of a characteristic of the nuclear reactor system. For example, as shown in FIGS. 1A through 2, in response to the signal 107 transmitted by the monitoring system 102, the fuel cell control system 108 may establish a humidity level in a portion of a fuel cell system 110 associated with a nuclear reactor system 104 within acceptable humidity range, the acceptable humidity range a function of a characteristic of the nuclear reactor system 104. For instance, the energy transfer system 112 of the fuel cell control system 108 may transfer energy (e.g., thermal or electrical) from an energy source 103 to the humidity control system of the fuel cell system 110 in order to establish a humidity level in the fuel cell system 110 within in an acceptable humidity range.

Figure 22:
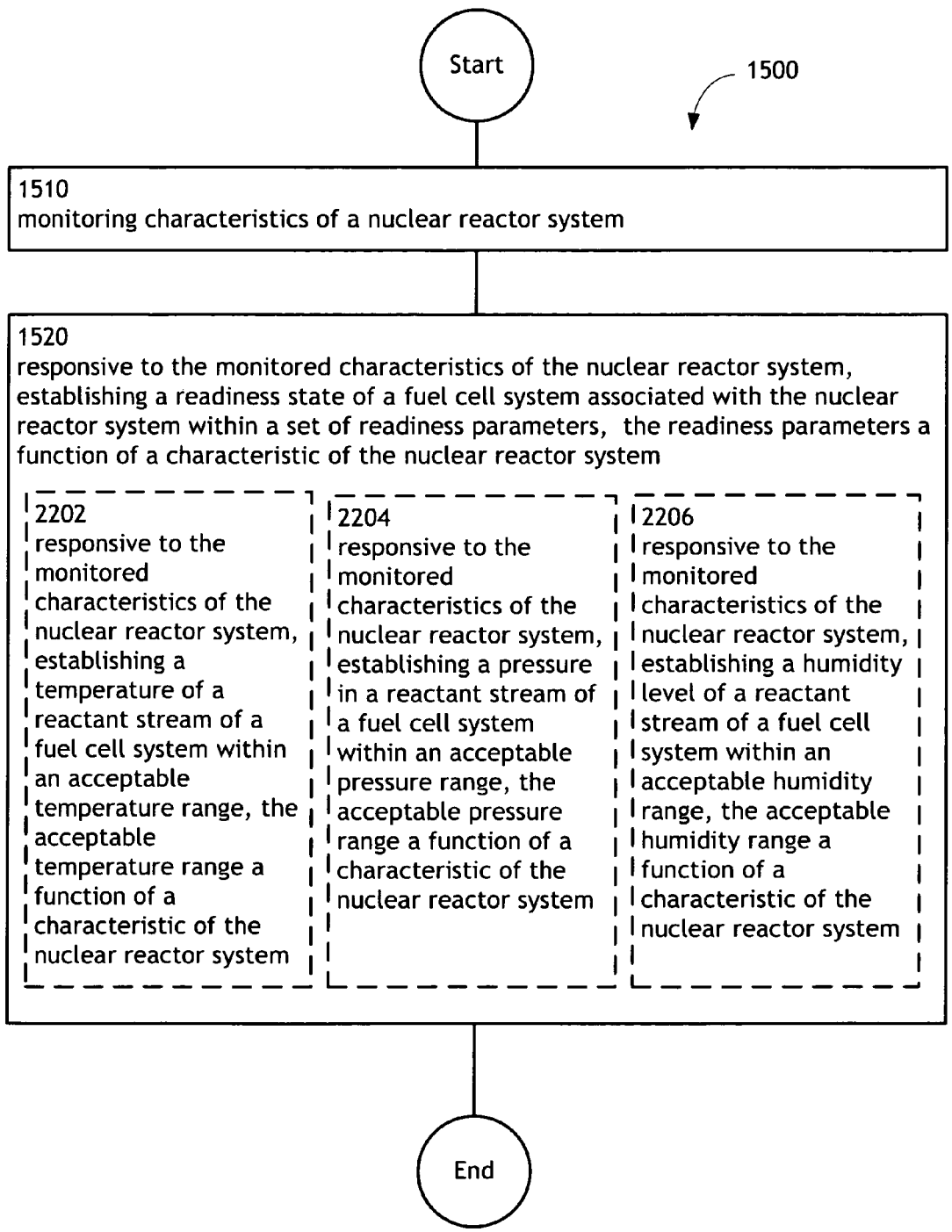

FIG. 22 illustrates alternative embodiments of the example operational flow 1500 of FIG. 15. FIG. 21 illustrates example embodiments where the establishing operation 1520 may include at least one additional operation. Additional operations may include an operation 2202, an operation 2204, and/or an operation 2206.

The operation 2202 illustrates, responsive to the monitored characteristics of the nuclear reactor system, establishing a temperature of a reactant stream of a fuel cell system within an acceptable temperature range, the acceptable temperature range a function of a characteristic of the nuclear reactor system. For example, as shown in FIGS. 1A through 2, in response to the signal 107 transmitted by the monitoring system 102, the fuel cell control system 108 may establish a temperature of a reactant stream (e.g., fuel stream or oxidant stream) of a fuel cell system 110 associated with a nuclear reactor system 104 within acceptable temperature range, the acceptable temperature range a function of a characteristic of the nuclear reactor system 104. For instance, the energy transfer system 112 of the fuel cell control system 108 may transfer energy (e.g., thermal or electrical) from an energy source 103 to the reactant conditioning system of the fuel cell system 110 in order to heat or cool one or more of the reactants of the fuel cell system 110 so as to establish a temperature of one or both of the reactant streams of the fuel cell system 110 within in an acceptable temperature range.

The operation 2204 illustrates, responsive to the monitored characteristics of the nuclear reactor system, establishing a pressure in a reactant stream of a fuel cell system within an acceptable pressure range, the acceptable pressure range a function of a characteristic of the nuclear reactor system. For example, as shown in FIGS. 1A through 2, in response to the signal 107 transmitted by the monitoring system 102, the fuel cell control system 108 may establish a pressure in a reactant stream (e.g., fuel stream or oxidant stream) of a fuel cell system 110 associated with a nuclear reactor system 104 within an acceptable pressure range, the acceptable pressure range a function of a characteristic of the nuclear reactor system 104. For instance, the reactant control system 114 of the fuel cell control system 108 may control reactant valves and/or pumps of the fuel cell system 110 in order to increase or decrease the flow of one or more of the reactant streams of the fuel cell system 110 so as to establish a pressure of one or both of the reactant streams of the fuel cell system 110 within in an acceptable pressure range.

The operation 2206 illustrates, responsive to the monitored characteristics of the nuclear reactor system, establishing a humidity level of a reactant stream of a fuel cell system within an acceptable humidity range, the acceptable humidity range a function of a characteristic of the nuclear reactor system. For example, as shown in FIGS. 1A through 2, in response to the signal 107 transmitted by the monitoring system 102, the fuel cell control system 108 may establish a humidity level of a reactant stream (e.g., fuel stream or oxidant stream) of a fuel cell system 110 associated with a nuclear reactor system 104 within acceptable humidity range, the acceptable humidity range a function of a characteristic of the nuclear reactor system 104. For instance, the energy transfer system 112 of the fuel cell control system 108 may transfer energy (e.g., thermal or electrical) from an energy source 103 to the reactant conditioning system, such as a humidifier, of the fuel cell system 110 in order to establish a humidity level of one or both of the reactant streams of the fuel cell system 110 within in an acceptable humidity range.

Figure 23:
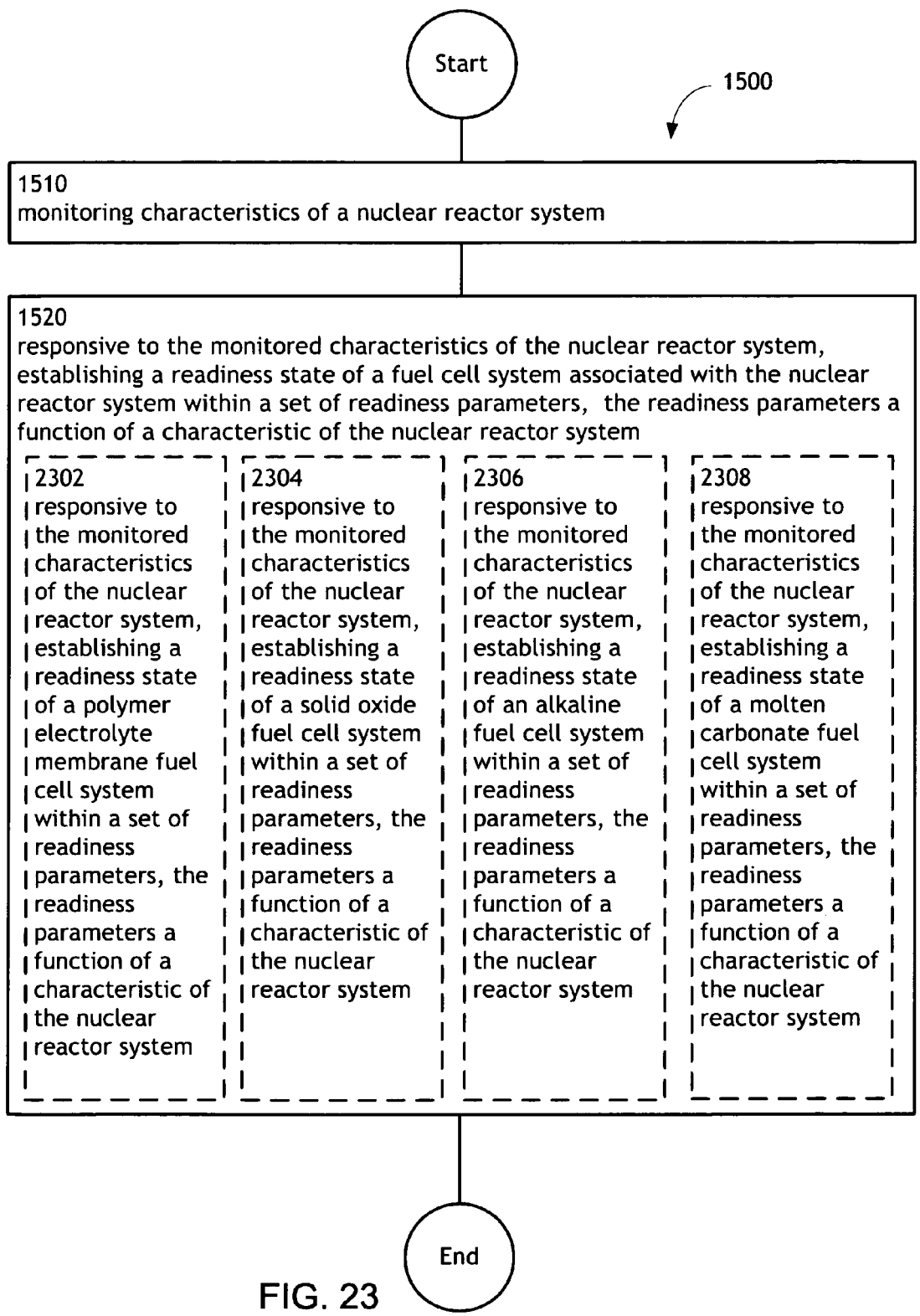

FIG. 23 illustrates alternative embodiments of the example operational flow 1500 of FIG. 15. FIG. 23 illustrates example embodiments where the establishing operation 1520 may include at least one additional operation. Additional operations may include an operation 2302, an operation 2304, an operation 2306, and/or an operation 2308.

The operation 2302 illustrates, responsive to the monitored characteristics of the nuclear reactor system, establishing a readiness state of a polymer electrolyte membrane fuel cell system within a set of readiness parameters, the readiness parameters a function of a characteristic of the nuclear reactor system. For example, as shown in FIGS. 1A through 2, in response to the signal 107 from the monitoring system 102, a fuel cell control system 108 may establish a readiness state of a polymer electrolyte membrane fuel cell system 182 within a set of readiness parameters, wherein the readiness parameters are a function of one or more characteristics of the nuclear reactor system 104.

The operation 2304 illustrates, responsive to the monitored characteristics of the nuclear reactor system, establishing a readiness state of a solid oxide fuel cell system within a set of readiness parameters, the readiness parameters a function of a characteristic of the nuclear reactor system. For example, as shown in FIGS. 1A through 2, in response to the signal 107 from the monitoring system 102, a fuel cell control system 108 may establish a readiness state of a solid oxide fuel cell system 183 within a set of readiness parameters, wherein the readiness parameters are a function of one or more characteristics of the nuclear reactor system 104.

The operation 2306 illustrates, responsive to the monitored characteristics of the nuclear reactor system, establishing a readiness state of an alkaline fuel cell system within a set of readiness parameters, the readiness parameters a function of a characteristic of the nuclear reactor system. For example, as shown in FIGS. 1A through 2, in response to the signal 107 from the monitoring system 102, a fuel cell control system 108 may establish a readiness state of an alkaline fuel cell system 184 within a set of readiness parameters, wherein the readiness parameters are a function of one or more characteristics of the nuclear reactor system 104.

The operation 2308 illustrates, responsive to the monitored characteristics of the nuclear reactor system, establishing a readiness state of a molten carbonate fuel cell system within a set of readiness parameters, the readiness parameters a function of a characteristic of the nuclear reactor system. For example, as shown in FIGS. 1A through 2, in response to the signal 107 from the monitoring system 102, a fuel cell control system 108 may establish a readiness state of a molten carbonate fuel cell system 185 within a set of readiness parameters, wherein the readiness parameters are a function of one or more characteristics of the nuclear reactor system 104.

Figure 24:
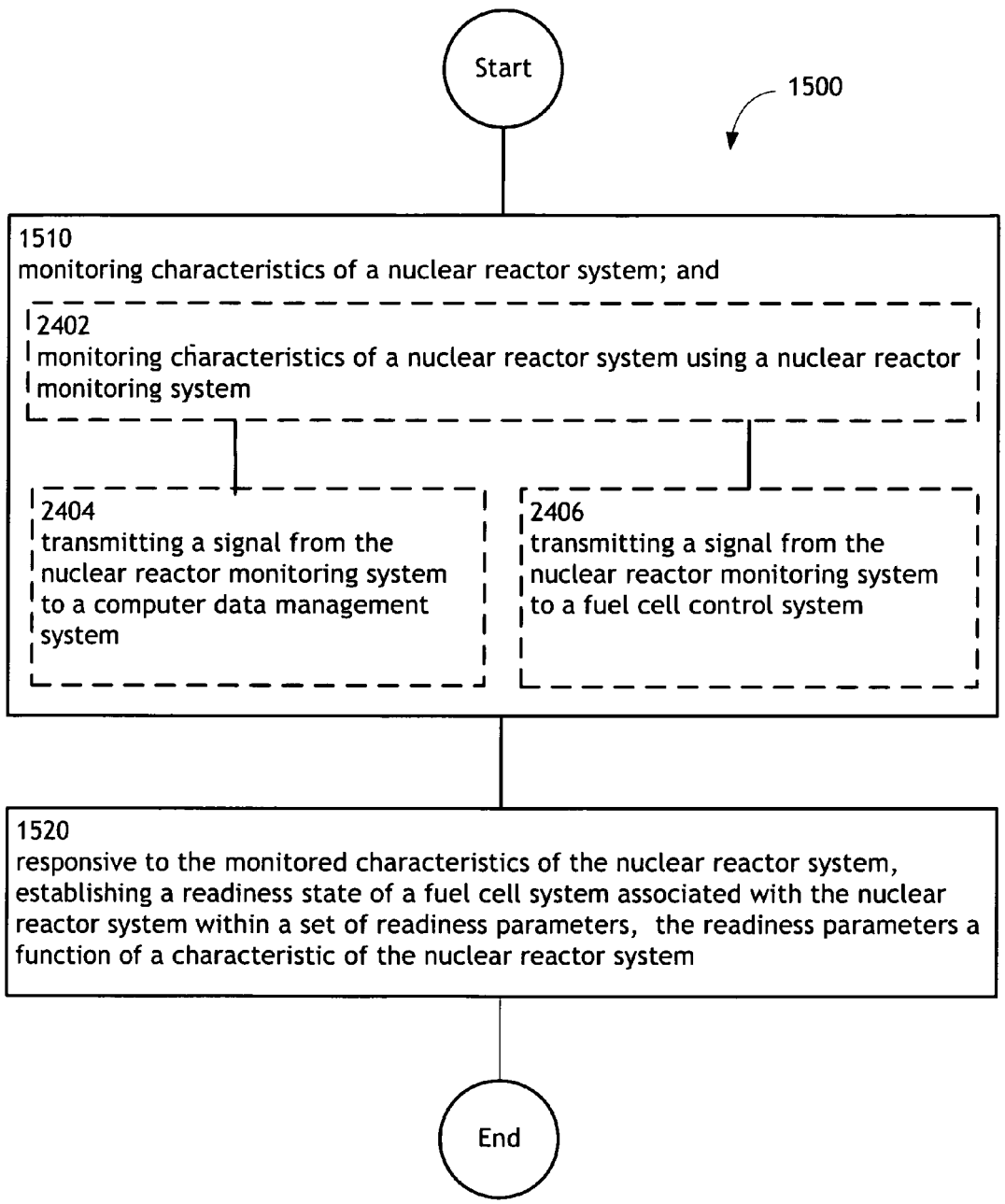

FIG. 24 illustrates alternative embodiments of the example operational flow 1500 of FIG. 15. FIG. 24 illustrates example embodiments where the monitoring operation 1510 may include at least one additional operation. Additional operations may include an operation 2402, an operation 2404, and/or an operation 2406.

The operation 2402 illustrates monitoring characteristics of a nuclear reactor system using a nuclear reactor monitoring system. For example, as shown in FIGS. 1A through 2, the monitoring system 102 may monitor one or more characteristics, such as an operation characteristic or a design characteristic, of the nuclear reactor system 104.

Further, the operation 2404 illustrates transmitting a signal from the nuclear reactor monitoring system to a computer data management system. For example, as shown in FIGS. 1A through 2, upon monitoring a characteristic of the nuclear reactor system 104, the monitoring system 102 may transmit a signal indicative of the monitored characteristic to a computer data management system (e.g., a computer system configured to archive and analyze monitored characteristic data).

Further, the operation 2406 illustrates transmitting a signal from the nuclear reactor monitoring system to a fuel cell control system. For example, as shown in FIGS. 1A through 2, upon monitoring a characteristic of the nuclear reactor system 104, the monitoring system 102 may transmit a signal indicative of the monitored characteristic to the fuel cell control system 108. For instance, the monitoring system 102 may transmit a signal indicative of the monitored characteristic to the fuel cell control module 109 of the fuel cell control system 108.

FIG. 25 illustrates alternative embodiments of the example operational flow 1500 of FIG. 15. FIG. 25 illustrates example embodiments where the monitoring operation 1510 may include at least one additional operation. Additional operations may include an operation 2502, an operation 2504, an operation 2506, an operation 2508, and operation 2510, and operation 2512, and/or an operation 2514.

The operation 2502 illustrates monitoring an operational characteristic of a nuclear reactor system. For example, as shown in FIGS. 1A through 2, a monitoring system 178 configured to monitor an operational characteristic of the nuclear reactor system may monitor one or more operational characteristics of the nuclear reactor system 104, such as temperature or pressure of a portion (e.g., coolant fluid of a coolant loop) of the nuclear reactor system 104.

Further, the operation 2504 illustrates monitoring an operational characteristic of the nuclear reactor core nuclear reactor system. For example, as shown in FIGS. 1A through 2, a monitoring system 178 configured to monitor an operational characteristic of the nuclear reactor system may monitor one or more operational characteristics of the nuclear reactor core of the nuclear reactor system 104, such as temperature, pressure, or void fraction of the nuclear reactor core.

The operation 2506 illustrates monitoring a design characteristic of a nuclear reactor system. For example, as shown in FIGS. 1A through 2, a monitoring system 179 configured to monitor a design characteristic of the nuclear reactor system may monitor one or more design characteristics of the nuclear reactor system 104.

Further, the operation 2508 illustrates monitoring the responsiveness of a safety system of a nuclear reactor system to a design basis accident. For example, as shown in FIGS. 1A through 2, a monitoring system 179 configured to monitor a design characteristic of the nuclear reactor system may monitor the responsiveness of a safety system of a nuclear reactor system to a design basis accident, such as guillotine break.

Further, the operation 2510 illustrates monitoring the responsiveness of a safety system of a nuclear reactor system to a design basis accident. For example, as shown in FIGS. 1A through 2, a monitoring system 179 configured to monitor a design characteristic of the nuclear reactor system may monitor the time required for a fuel element, such as a fuel pin assembly or a collection of fuel pin assemblies, of a nuclear reactor system to reach a specified temperature upon loss of coolant flow.

The operation 2512 illustrates monitoring a characteristic of an operation system of a nuclear reactor system. For example, as shown in FIGS. 1A through 2, a monitoring system 180 configured to monitor a characteristic of an operation system of the nuclear reactor system may monitor one or more characteristics of an operation system (e.g., coolant system, safety system, shutdown system, or warning system) of the nuclear reactor system 104.

Further, the operation 2514 illustrates monitoring a signal transmitted by an operation system of a nuclear reactor system. For example, as shown in FIGS. 1A through 2, a monitoring system 180 configured to monitor a characteristic of an operation system of the nuclear reactor system may monitor one or more signals transmitted from an operation system (e.g., coolant system, safety system, shutdown system, or warning system) of the nuclear reactor system 104. For instance, the monitoring system 180 configured to monitor a characteristic of an operation system of the nuclear reactor system may monitor a digital signal transmitted by a safety system of the nuclear reactor system 104.

Figure 26:
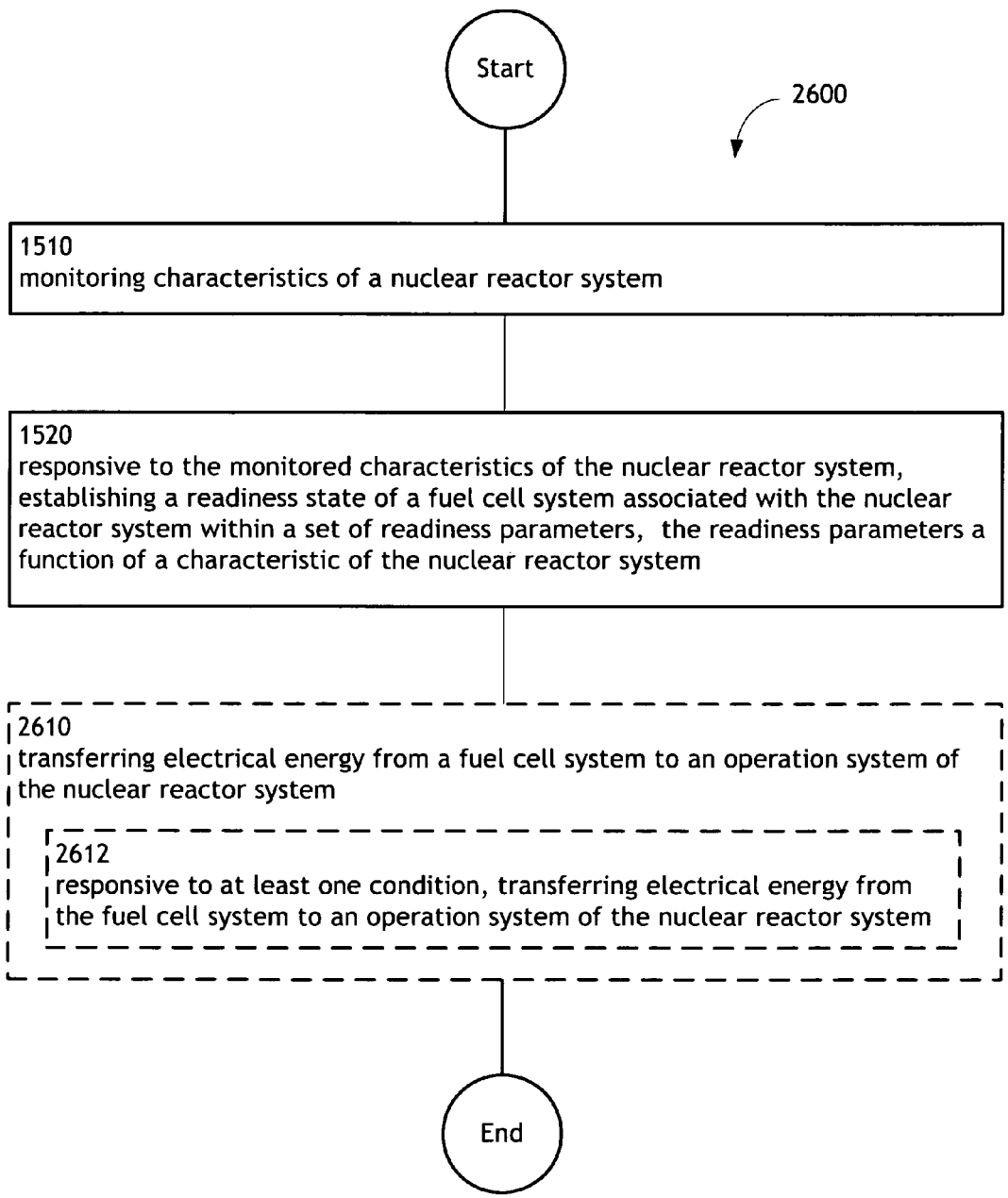

FIG. 26 illustrates an operational flow 2600 representing example operations related to establishing a readiness state in a fuel cell backup system of a nuclear reactor system. FIG. 26 illustrates an example embodiment where the example operational flow 1500 of FIG. 15 may include at least one additional operation. Additional operations may include an operation 2610, and/or an operation 2612.

After a start operation, a monitoring operation 1510, and an establishing operation 1520, the operational flow 2600 moves to a transferring operation 2610. The transferring operation 2610 illustrates transferring electrical energy from a fuel cell system to an operation system of the nuclear reactor system. For example, as shown in FIGS. 1A through 2, an energy supply system 191 may transfer electrical energy from the electrical output of the fuel cell system 110 to an operation system (e.g., coolant system or shutdown system) of the nuclear reactor system 104

The operation 2612 illustrates, responsive to at least one condition, transferring electrical energy from the fuel cell system to an operation system of the nuclear reactor system. For example, as shown in FIGS. 1A through 2, an energy supply system 191 may transfer electrical energy from the electrical output of the fuel cell system 110 to an operation system (e.g., coolant system or shutdown system) of the nuclear reactor system in response to a condition, such as a signal from an operation system of the nuclear reactor system 104, or a shutdown event of the nuclear reactor system 104.

Figure 27:
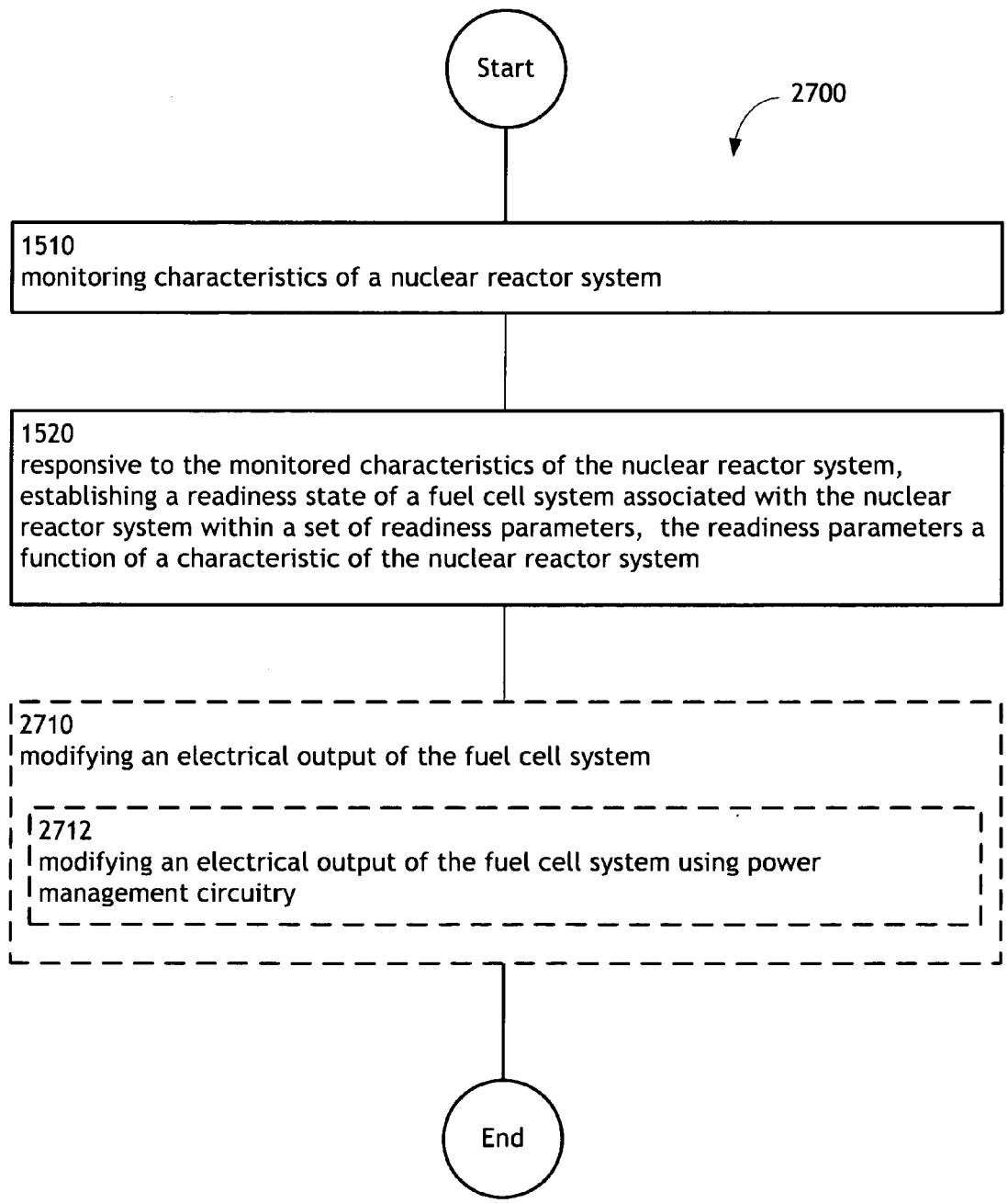

FIG. 27 illustrates an operational flow 2700 representing example operations related to establishing a readiness state in a fuel cell backup system of a nuclear reactor system. FIG. 27 illustrates an example embodiment where the example operational flow 1500 of FIG. 15 may include at least one additional operation. Additional operations may include an operation 2710 and/or operation 2712.

After a start operation, a monitoring operation 1510, and an establishing operation 1520, the operational flow 2700 moves to a modifying operation 2710. The modifying operation 2710 illustrates modifying an electrical output of the fuel cell system. For example, as shown in FIGS. 1A through 2, the output modification system 194 may modify the characteristics of the electrical output of the fuel cell system 110.

Further, the operation 2712 illustrates modifying an electrical output of the fuel cell system using power management circuitry. For example, as shown in FIGS. 1A through 2, power management circuitry 195 (e.g., voltage regulation circuitry) may modify the electrical characteristics of the electrical output of the fuel cell system 110.

Figure 28:
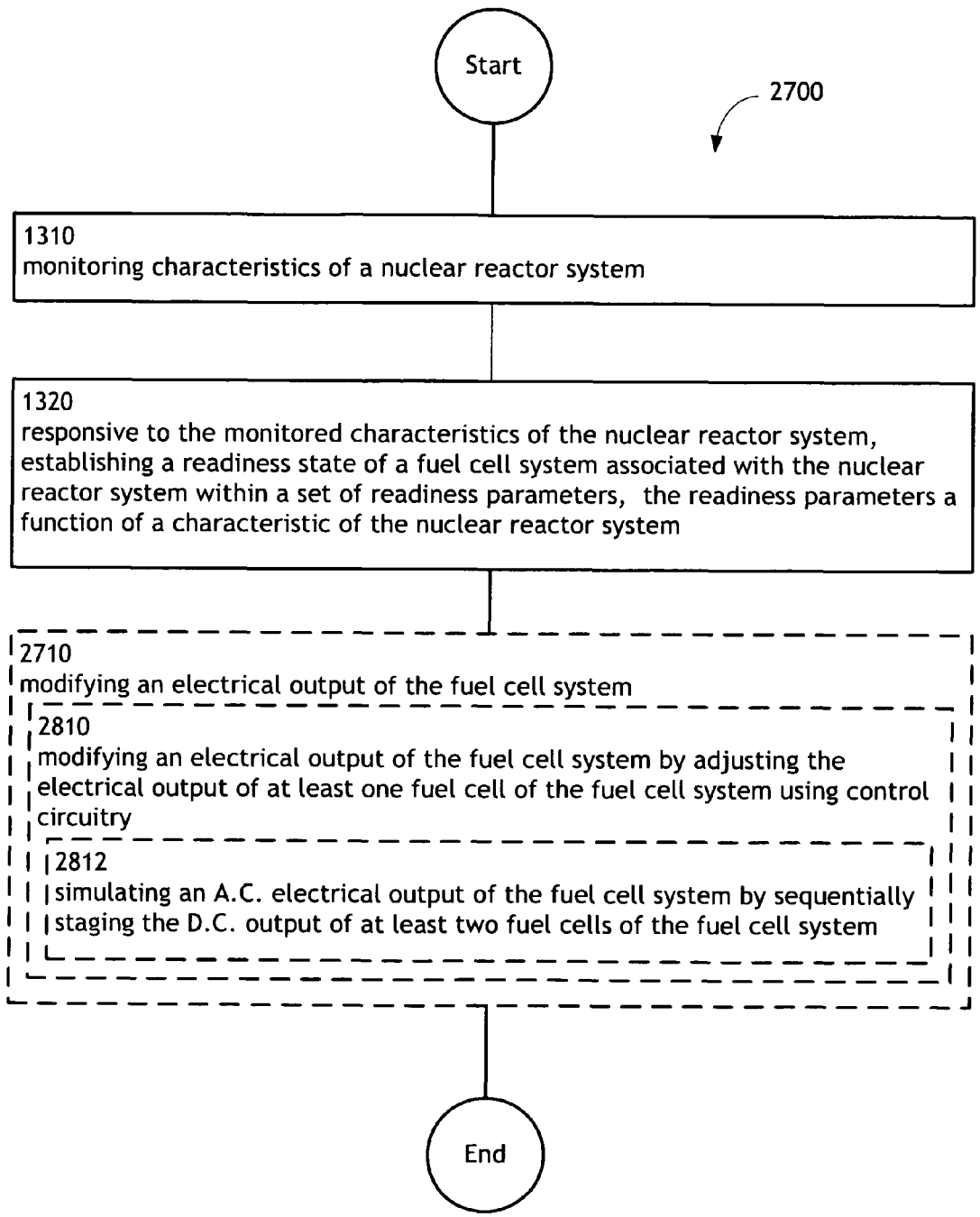

FIG. 28 illustrates alternative embodiments of the example operational flow 2700 of FIG. 27. FIG. 28 illustrates example embodiments where the modifying operation 2710 may include at least one additional operation. Additional operations may include an operation 2810, and/or an operation 2812.

The operation 2810 illustrates modifying an electrical output of the fuel cell system by adjusting the electrical output of at least one fuel cell of the fuel cell system using control circuitry. For example, as shown in FIGS. 1A through 2, control circuitry 196 may modify the characteristics of the electrical output of the fuel cell system 110 by adjusting the electrical output of one or more fuel cells of the fuel cell system.

Further, the operation 3012 illustrates simulating an A.C. electrical output of the fuel cell system by sequentially staging the D.C. output of at least two fuel cells of the fuel cell system. For example, as shown in FIGS. 1A through 2, control circuitry 196 may include solid state switches configured to simulate an A.C. electrical output of the fuel cell system 110 by sequentially staging the D.C. electrical outputs of two or more fuel cells of the fuel cell system 110.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An apparatus, comprising:
    a fuel cell associated with a nuclear reactor;
    a nuclear reactor monitoring system operably coupled to a core of the nuclear reactor and configured to monitor a temperature of the core nuclear reactor; and
    a fuel cell control system communicatively coupled to the nuclear reactor monitoring system,
    wherein the nuclear reactor monitoring system is further configured to transmit the monitored temperature of the core of the nuclear reactor to the fuel cell control system,
    wherein the fuel cell control system includes a heat transfer system, wherein the heat transfer system includes a heat supply loop, the heat supply loop in thermal communication with a waste heat rejection loop of the nuclear reactor and one or more bipolar plates of the fuel cell, wherein the heat transfer system is configured to selectively transfer thermal energy from the waste heat rejection loop of the nuclear reactor to the one or more bipolar plates of the fuel cell to establish a readiness state of the fuel cell within a set of readiness parameters in response to receipt of the monitored temperature of the core of the nuclear reactor from the nuclear reactor monitoring system by increasing the temperature of the fuel cell, wherein the readiness parameters are a function of the monitored temperature of the core of the nuclear reactor.

2. The apparatus of claim 1, wherein the readiness parameters are a variable function of the monitored temperature of the core of the nuclear reactor.

3. The apparatus of claim 1, wherein the fuel cell control system includes a reactant control system.

4. The apparatus of claim 3, wherein the reactant control system adjusts a condition of at least one reactant of the fuel cell.

5. The apparatus of claim 3, wherein the reactant control system includes a reactant supply control system, wherein the reactant supply control system adjusts a supply condition of at least one reactant of the fuel cell.

6. The apparatus of claim 3, wherein the reactant control system includes a reactant pump control system.

7. The apparatus of claim 3, wherein the reactant control system includes a reactant valve control system.

8. The apparatus of claim 1, wherein the fuel cell control system comprises:
    a fuel cell control system including a configuration control system, wherein the configuration control system establishes a readiness state of the fuel cell within a set of readiness parameters in response to the monitored temperature of the core of the nuclear reactor from the nuclear reactor monitoring system by adjusting an electrical coupling configuration of two or more fuel cells.

9. The apparatus of claim 8, wherein the configuration control system includes configuration control circuitry for adjusting an electrical coupling configuration of two or more fuel cells.

10. The apparatus of claim 9, wherein the configuration control system includes switching circuitry for adjusting an electrical coupling configuration of two or more fuel cells.

11. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish an electrical output level of the fuel cell within an acceptable electrical output range, in response to the monitored temperature of the core of the nuclear reactor from the nuclear reactor monitoring system, wherein the acceptable electrical output range is a function of the monitored temperature of the core of the nuclear reactor.

12. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a temperature of the fuel cell within an acceptable temperature range, in response to the monitored temperature of the core of the nuclear reactor from the nuclear reactor monitoring system, wherein the acceptable temperature range is a function of the monitored temperature of the core of the nuclear reactor.

13. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a pressure of the fuel cell within an acceptable pressure range, in response to the monitored temperature of the core of the nuclear reactor from the nuclear reactor monitoring system, wherein the acceptable pressure range is a function of the monitored temperature of the core of the nuclear reactor.

14. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a humidity of the fuel cell within an acceptable humidity range, in response to the monitored temperature of the core of the nuclear reactor from the nuclear reactor monitoring system, wherein the acceptable humidity range is a function of the monitored temperature of the core of the nuclear reactor.

15. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a reactant stream temperature of the fuel cell within an acceptable reactant stream temperature range, in response to the monitored temperature of the core of the nuclear reactor from the nuclear reactor monitoring system, wherein the acceptable reactant stream temperature range is a function of the monitored temperature of the core of the nuclear reactor.

16. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a pressure of a reactant stream of the fuel cell within an acceptable pressure range, in response to the monitored temperature of the core of the nuclear reactor from the nuclear reactor monitoring system, wherein the acceptable pressure range of the reactant stream is a function of the monitored temperature of the core of the nuclear reactor.

17. The apparatus of claim 1, wherein the heat supply loop in thermal communication with the waste heat rejection loop of the nuclear reactor and the one or more bipolar plates of the fuel cell selectively transfers thermal energy from the waste heat rejection loop of the nuclear reactor to the one or more bipolar plates of the fuel cell to establish a humidity level of a reactant stream of the fuel cell within an acceptable humidity range, in response to the monitored temperature of the core of the nuclear reactor from the nuclear reactor monitoring system, wherein the acceptable humidity range of the reactant stream range is a function of the monitored temperature of the core of the nuclear reactor.

18. The apparatus of claim 1, further comprising:
an electrical supply system, wherein the electrical supply energy transfers electrical energy from the fuel cell to an operation system of the nuclear reactor.

19. The apparatus of claim 1, further comprising:
an output modification system, wherein the output modification system modifies an electrical output of the fuel cell.

20. The apparatus of claim 19, wherein the output modification system comprises:
power management circuitry, wherein the power management circuitry modifies an electrical output of the fuel cell.

21. The apparatus of claim 19, wherein the output modification system comprises:
control circuitry, wherein the control circuitry modifies the electrical output of at least one fuel cell.

22. The apparatus of claim 21, wherein the control circuitry simulates an A.C. electrical output of the fuel cell by sequentially staging a D.C. output of at least two fuel cells.

23. The apparatus of claim 1, wherein the fuel cell comprises:
a polymer electrolyte membrane fuel cell.

24. The apparatus of claim 1, wherein the fuel cell comprises:
a solid oxide fuel cell.

25. The apparatus of claim 1, wherein the fuel cell comprises:
an alkaline fuel cell.

26. The apparatus of claim 1, wherein the fuel cell comprises:
a molten carbonate fuel cell.

* * * * *